United States Patent
Shukla et al.

(10) Patent No.: US 12,159,203 B1
(45) Date of Patent: Dec. 3, 2024

(54) CREATION AND EXECUTION OF PORTABLE SOFTWARE FOR EXECUTION ON ONE OR MORE REMOTE COMPUTERS

(71) Applicant: Automation Anywhere, Inc., San Jose, CA (US)

(72) Inventors: Mihir Shukla, San Jose, CA (US); Sridhar Gunapu, Santa Clara, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 1370 days.

(21) Appl. No.: 16/458,139

(22) Filed: Jun. 30, 2019

Related U.S. Application Data

(63) Continuation-in-part of application No. 16/371,074, filed on Mar. 31, 2019, now Pat. No. 10,733,540, and a continuation-in-part of application No. 15/675,180, filed on Aug. 11, 2017, now abandoned, which is a continuation-in-part of application No. 15/351,615, filed on Nov. 15, 2016, now abandoned, and a continuation-in-part of application No. 14/988,877, filed on Jan. 6, 2016, now Pat. No. 9,954,819, and a continuation of application No. 14/939,715, filed on Nov. 12, 2015, now Pat. No. 10,289,959, which is a continuation-in-part of application No. 14/834,773, (Continued)

(51) Int. Cl.
*G06N 20/00* (2019.01)
*G06N 3/08* (2023.01)
*G06N 5/04* (2023.01)

(52) U.S. Cl.
CPC ............... *G06N 20/00* (2019.01); *G06N 5/04* (2013.01); *G06N 3/08* (2013.01)

(58) Field of Classification Search
None
See application file for complete search history.

(56) References Cited

U.S. PATENT DOCUMENTS

| | | |
|---|---|---|
| 5,949,999 A | 9/1999 | Song et al. |
| 5,983,001 A | 11/1999 | Boughner et al. |

(Continued)

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Jerry O'Connor
*Assistant Examiner* — Matthew H Divelbiss

(57) ABSTRACT

A portable unit is created on a first computer to be executed on one or more remote computers. The portable unit includes an execution file having one or more tasks. Additionally, data relationships between applications are identified. Users can create adapters that enable application automation processes to allow customers to define compliance boundaries and to allow for automation of upgraded applications. The applications can be updated by collecting automation information and employing an artificial intelligence engine to generate updated automation criteria. Automation can be generated based on return on investment. A dashboard is automatically generated to permit viewing of indicators regarding automation tasks.

18 Claims, 43 Drawing Sheets

Related U.S. Application Data filed on Aug. 25, 2015, now Pat. No. 10,430,180, which is a continuation of application No. 13/925,522, filed on Jun. 24, 2013, now Pat. No. 9,462,042, which is a continuation-in-part of application No. 12/787,469, filed on May 26, 2010, now Pat. No. 8,504,803.

(60) Provisional application No. 62/409,444, filed on Oct. 18, 2016, provisional application No. 62/258,601, filed on Nov. 23, 2015, provisional application No. 62/160,655, filed on May 13, 2015, provisional application No. 62/130,068, filed on Mar. 9, 2015.

(56) References Cited

U.S. PATENT DOCUMENTS

| | | | |
|---|---|---|---|
| 6,133,917 A | 10/2000 | Feigner et al. | |
| 6,389,592 B1 | 5/2002 | Ayres et al. | |
| 6,427,234 B1 | 7/2002 | Chambers et al. | |
| 6,473,794 B1 | 10/2002 | Guheen et al. | |
| 6,496,979 B1 | 12/2002 | Chen et al. | |
| 6,640,244 B1 | 10/2003 | Bowman-Amuah | |
| 6,704,873 B1 | 3/2004 | Underwood | |
| 6,898,764 B2 | 5/2005 | Kemp | |
| 6,954,747 B1 | 10/2005 | Wang et al. | |
| 6,957,186 B1 | 10/2005 | Guheen et al. | |
| 7,091,898 B2 | 8/2006 | Arling et al. | |
| 7,246,128 B2 | 7/2007 | Jordahl | |
| 7,398,469 B2 | 7/2008 | Kisamore et al. | |
| 7,441,007 B1 | 10/2008 | Kirkpatrick et al. | |
| 7,533,096 B2 | 5/2009 | Rice et al. | |
| 7,568,109 B2 | 7/2009 | Powell et al. | |
| 7,571,427 B2 | 8/2009 | Wang et al. | |
| 7,765,525 B1 | 7/2010 | Davidson et al. | |
| 7,805,317 B2 | 9/2010 | Khan et al. | |
| 7,805,710 B2 | 9/2010 | North | |
| 7,810,070 B2 | 10/2010 | Nasuti et al. | |
| 7,846,023 B2 | 12/2010 | Evans et al. | |
| 8,028,269 B2 | 9/2011 | Bhatia et al. | |
| 8,056,092 B2 | 11/2011 | Allen et al. | |
| 8,095,910 B2 | 1/2012 | Nathan et al. | |
| 8,132,156 B2 | 3/2012 | Malcolm | |
| 8,209,738 B2 | 6/2012 | Nicol et al. | |
| 8,234,622 B2 | 7/2012 | Meijer et al. | |
| 8,245,215 B2 | 8/2012 | Extra | |
| 8,352,464 B2 | 1/2013 | Fotev | |
| 8,396,890 B2 | 3/2013 | Lim | |
| 8,438,558 B1 | 5/2013 | Adams | |
| 8,443,291 B2 | 5/2013 | Ku et al. | |
| 8,464,240 B2 | 6/2013 | Fritsch et al. | |
| 8,498,473 B2 | 7/2013 | Chong et al. | |
| 8,504,803 B2 | 8/2013 | Shukla | |
| 8,631,458 B1 | 1/2014 | Banerjee | |
| 8,682,083 B2 | 3/2014 | Kumar et al. | |
| 8,713,003 B2 | 4/2014 | Fotev | |
| 8,769,482 B2 | 7/2014 | Batey et al. | |
| 8,819,241 B1 | 8/2014 | Washburn | |
| 8,832,048 B2 | 9/2014 | Lim | |
| 8,874,685 B1 | 10/2014 | Hollis et al. | |
| 8,943,493 B2 | 1/2015 | Schneider | |
| 8,965,905 B2 | 2/2015 | Ashmore et al. | |
| 9,104,294 B2 | 8/2015 | Forstall et al. | |
| 9,213,625 B1 | 12/2015 | Schrage | |
| 9,278,284 B2 | 3/2016 | Ruppert et al. | |
| 9,444,844 B2 | 9/2016 | Edery et al. | |
| 9,462,042 B2 | 10/2016 | Shukla et al. | |
| 9,571,332 B2 | 2/2017 | Subramaniam et al. | |
| 9,621,584 B1 | 4/2017 | Schmidt et al. | |
| 9,946,233 B2 | 4/2018 | Brun et al. | |
| 2002/0129039 A1* | 9/2002 | Majewski | G06F 16/25 |
| 2003/0033590 A1 | 2/2003 | Leherbauer | |
| 2003/0101245 A1 | 5/2003 | Srinivasan et al. | |
| 2003/0159089 A1 | 8/2003 | DiJoseph | |
| 2004/0083472 A1 | 4/2004 | Rao et al. | |
| 2004/0172526 A1 | 9/2004 | Tann et al. | |
| 2004/0210885 A1 | 10/2004 | Wang et al. | |
| 2004/0243994 A1 | 12/2004 | Nasu | |
| 2005/0033777 A1* | 2/2005 | Moraes | G06F 16/275 |
| 2005/0188357 A1 | 8/2005 | Derks et al. | |
| 2005/0204343 A1 | 9/2005 | Kisamore et al. | |
| 2005/0257214 A1 | 11/2005 | Moshir et al. | |
| 2006/0095276 A1 | 5/2006 | Axelrod et al. | |
| 2006/0150188 A1 | 7/2006 | Roman et al. | |
| 2007/0101291 A1 | 5/2007 | Forstall et al. | |
| 2007/0112574 A1 | 5/2007 | Greene | |
| 2007/0156677 A1 | 7/2007 | Szabo | |
| 2008/0005086 A1 | 1/2008 | Moore | |
| 2008/0027769 A1 | 1/2008 | Eder | |
| 2008/0028392 A1 | 1/2008 | Chen et al. | |
| 2008/0209392 A1 | 8/2008 | Able et al. | |
| 2008/0222454 A1 | 9/2008 | Kelso | |
| 2008/0263024 A1 | 10/2008 | Landschaft et al. | |
| 2009/0037509 A1 | 2/2009 | Parekh et al. | |
| 2009/0103769 A1 | 4/2009 | Milov et al. | |
| 2009/0172814 A1 | 7/2009 | Khosravi et al. | |
| 2009/0199160 A1 | 8/2009 | Vaitheeswaran et al. | |
| 2009/0217309 A1 | 8/2009 | Grechanik et al. | |
| 2009/0249297 A1 | 10/2009 | Doshi et al. | |
| 2009/0313229 A1 | 12/2009 | Fellenstein et al. | |
| 2009/0320002 A1 | 12/2009 | Peri-Glass et al. | |
| 2010/0023602 A1 | 1/2010 | Martone | |
| 2010/0023933 A1 | 1/2010 | Bryant et al. | |
| 2010/0100605 A1 | 4/2010 | Allen et al. | |
| 2010/0106671 A1 | 4/2010 | Li et al. | |
| 2010/0138015 A1 | 6/2010 | Colombo et al. | |
| 2010/0235433 A1 | 9/2010 | Ansari et al. | |
| 2011/0022578 A1 | 1/2011 | Fotev | |
| 2011/0055484 A1* | 3/2011 | Eichenberger | G06F 9/3834 712/216 |
| 2011/0145807 A1 | 6/2011 | Molinie et al. | |
| 2011/0197121 A1 | 8/2011 | Kletter | |
| 2011/0276568 A1 | 11/2011 | Fotev | |
| 2011/0276946 A1 | 11/2011 | Pletter | |
| 2011/0283189 A1 | 11/2011 | McCarty | |
| 2011/0302570 A1 | 12/2011 | Kurimilla et al. | |
| 2012/0042281 A1 | 2/2012 | Green | |
| 2012/0124062 A1 | 5/2012 | Macbeth et al. | |
| 2012/0330940 A1 | 12/2012 | Caire et al. | |
| 2013/0173648 A1 | 7/2013 | Tan et al. | |
| 2013/0290318 A1 | 10/2013 | Shapira et al. | |
| 2014/0181705 A1 | 6/2014 | Hey et al. | |
| 2015/0082280 A1 | 3/2015 | Betak et al. | |
| 2015/0347284 A1 | 12/2015 | Hey et al. | |
| 2016/0019049 A1 | 1/2016 | Kakhandiki et al. | |
| 2016/0078368 A1 | 3/2016 | Kakhandiki et al. | |

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

Bergen et al., RPC automation: making legacy code relevant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2008).

Tom Yeh, Tsung-Hsiang Chang, and Robert C. Miller, Sikuli: Using GUI Screenshots for Search and Automation, Oct. 4-7, 2009, 10 pages.

Yu et al., Deploying and managing Web services: issues, solutions, and directions, 36 pages (Year: 2008).

Zhifang et al., Test automation on mobile device, May 2010, 7 pages.

* cited by examiner

FIG. 2C

CREATION AND EXECUTION OF PORTABLE SOFTWARE FOR EXECUTION ON ONE OR MORE REMOTE COMPUTERS

RELATED APPLICATIONS

This application is a continuation-in-part of and claims the priority benefit under 35 U.S.C. § 120 of the following pending U.S. patent applications, the entire disclosures of which are hereby incorporated by reference herein:

U.S. patent application Ser. No. 15/675,180 filed on Aug. 11, 2017 entitled System and Method for Data Profile Driven Analytics (the '180 application);

U.S. patent application Ser. No. 15/351,615, entitled ROI Based Automation Recommendation and Execution, filed Nov. 15, 2016 (the '615 application); which claims priority from provisional application Ser. No. 62/409,444, entitled System and Method for Data Profile Driven analytics, filed Oct. 18, 2016, and from provisional application Ser. No. 62/258,601, entitled ROI Based Automation Recommendation And Execution, filed Nov. 23, 2015; and U.S. patent application Ser. No. 14/834,773, entitled System And Method For Resilient Automation, filed Aug. 25, 2015 ('the '773 application).

The aforementioned three pending patent applications each claim priority to a number of additional prior patent applications, and such priority claims as set forth in the aforementioned three pending patent applications is provided in the below three paragraphs.

The aforementioned '180 application is a continuation-in-part of and claims the priority benefit under 35 U.S.C. § 120 of U.S. patent application Ser. No. 15/351,615, entitled ROI Based Automation Recommendation and Execution, filed Nov. 15, 2016; and 35 U.S.C. 120 for U.S. patent application Ser. No. 62/409,444, entitled System and Method for Data Profile Driven Analytics, filed Oct. 18, 2016; and 35 U.S.C. 120 for U.S. patent application Ser. No. 14/988,877, entitled System And Method For Compliance Based Automation, filed Jan. 6, 2016; and 35 U.S.C. 120 for U.S. patent application Ser. No. 62/258,601, entitled ROI Based Automation Recommendation And Execution, filed Nov. 23, 2015; and the priority benefit under 35 U.S.C. 120 for U.S. patent application Ser. No. 14/939,715, entitled Artificial Intelligence & Knowledge Based Automation Enhancement, filed, Nov. 12, 2015; and the priority benefit under 35 U.S.C. 120, Ser. No. 62/160,655, entitled System And Method For Compliance Based Automation, filed May 13, 2015; and 35 U.S.C. 120 for U.S. patent application Ser. No. 62/130,068 entitled System And Method For Upgrade Resilient Automation, filed Mar. 9, 2015; and Ser. No. 14/834,773, entitled System And Method For Resilient Automation, filed Aug. 25, 2015; and under 35 U.S.C. 120 for U.S. Pat. No. 9,462,042 entitled System And Method For Enabling Application Discovery By Automation Needs, issued Oct. 4, 2016; and under 35 U.S.C. 120 for U.S. Pat. No. 8,504,803 System and Method For Creating and Executing Portable Software, and which incorporated by reference the entire disclosures of the patent applications set forth in this paragraph.

The aforementioned '615 application is a continuation-in-part of and claims the priority benefit under 35 U.S.C. § 119 for U.S. patent application Ser. No. 62/409,444 entitled System And Method For Data Profile Driven Analytics, filed Oct. 18, 2016; and 35 U.S.C. § 119 for U.S. patent application Ser. No. 62/258,601 entitled ROI Based Automation Recommendation And Execution, filed Nov. 23, 2015, and the priority benefit under 35 U.S.C. 120 for U.S. patent application Ser. No. 14/939,715, entitled Artificial Intelligence & Knowledge Based Automation Enhancement, filed, Nov. 12, 2015 and the priority benefit under 35 U.S.C. 120, Ser. No. 62/160,655, entitled System And Method For Compliance Based Automation, filed May 13, 2015; and 35 U.S.C. 120 for U.S. patent application Ser. No. 62/130,068 entitled System And Method For Upgrade Resilient Automation, filed Mar. 9, 2015; and Ser. No. 14/834,773, entitled System And Method For Resilient Automation, filed Aug. 25, 2015; and under 35 U.S.C. 120 for U.S. Pat. No. 9,462,042 entitled System And Method For Enabling Application Discovery By Automation Needs, issued Oct. 4, 2016; and under 35 U.S.C. 120 for U.S. Pat. No. 8,504,803 System and Method For Creating and Executing Portable Software, which incorporated by reference the entire disclosures of the patent applications set forth in this paragraph.

The aforementioned '773 application is a continuation-in-part of and claims the priority benefit under 35 U.S.C. § 119 (e) for provisional application 62/130,068, filed, Mar. 9, 2015, entitled System and Method for Upgrade Resilient Automation, and under 35 USC § 120 for U.S. patent application Ser. No. 13/925,522, filed Jun. 24, 2013, entitled System and Method For Enabling Application Discovery by Automation Needs, and the priority benefit under 35 USC § 120 for U.S. Pat. No. 8,504,803, filed May 26, 2010 System and Method For Creating and Executing Portable Software, which incorporated by reference the entire disclosures of the patent applications set forth in this paragraph.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates generally to the field of data processing systems and more particularly to computerized task automation.

BACKGROUND

End users of Web task, legacy applications or Windows (Windows is a registered trade mark of Microsoft Corporation, Redmond Wash.) based operating systems create few automated processes, that is a series of steps that a user desires to execute on a computer (often at pre-defined time or with a click of a button or a mouse). These software processes could be of any type and for any purpose, e.g., business, IT, or requirements to validate software behavior, etc. In some instances, the user desires to create a task, assign properties to the task and to run the task on a local or a remote computer. Prior art technologies require a user to install a resident application or operating system modification to software on each remote computer it desires to run such a process, which is often found to be time consuming, expensive and impractical for a large number of users.

Automation Anywhere, found at www.automationanywhere.com, fulfils a need to create software processes locally and run on the local machine or at remote locations. Such activities are motivated for example by requirements to test large numbers of remote sites following implementation of a change in existing software, routinely monitor a remote computer from a central location, whereby the remote location on a scheduled basis runs certain software jobs and reports back to the central location, remotely generating reports and feeding them back to the central location and performing repetitive tasks such as scanning email messages for specific content. Such applications may even extend to applications for entering data into a variety of systems such as inventory or health care systems, checking inventory and reordering, reminding individuals of their upcoming appointments, installing new operating systems via patch on remote computers, monitoring data centers, or underperforming hardware, automating a QA process. For example, QA software specialists often discover problems with software, but the developers subsequently cannot reproduce the problem in their computing environments. Although current technology can create the failed test case and export it as an executable the bug attached, this technology is found lacking for more complex routines that may require loop nesting and the provision of variable fields in commands that are either unknown or not established until run time. Therefore, a major shortcoming of a software process created on one computer and for purposes of running it on another computer is the lack of features that allow simple usability and reliable portability. It is helpful to establish a quick, reliable and low-cost portability system that satisfactorily enables dropping and dragging of tasks coupled with portability to furnish solutions to remote execution of locally created processes. Thre is also a need to improve on the usability of such systems.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIGS. 2A-2D show browsers for creating and porting one or more portable software execution file in accordance with an embodiment of the present invention.

DETAILED DESCRIPTION

Figure 1:
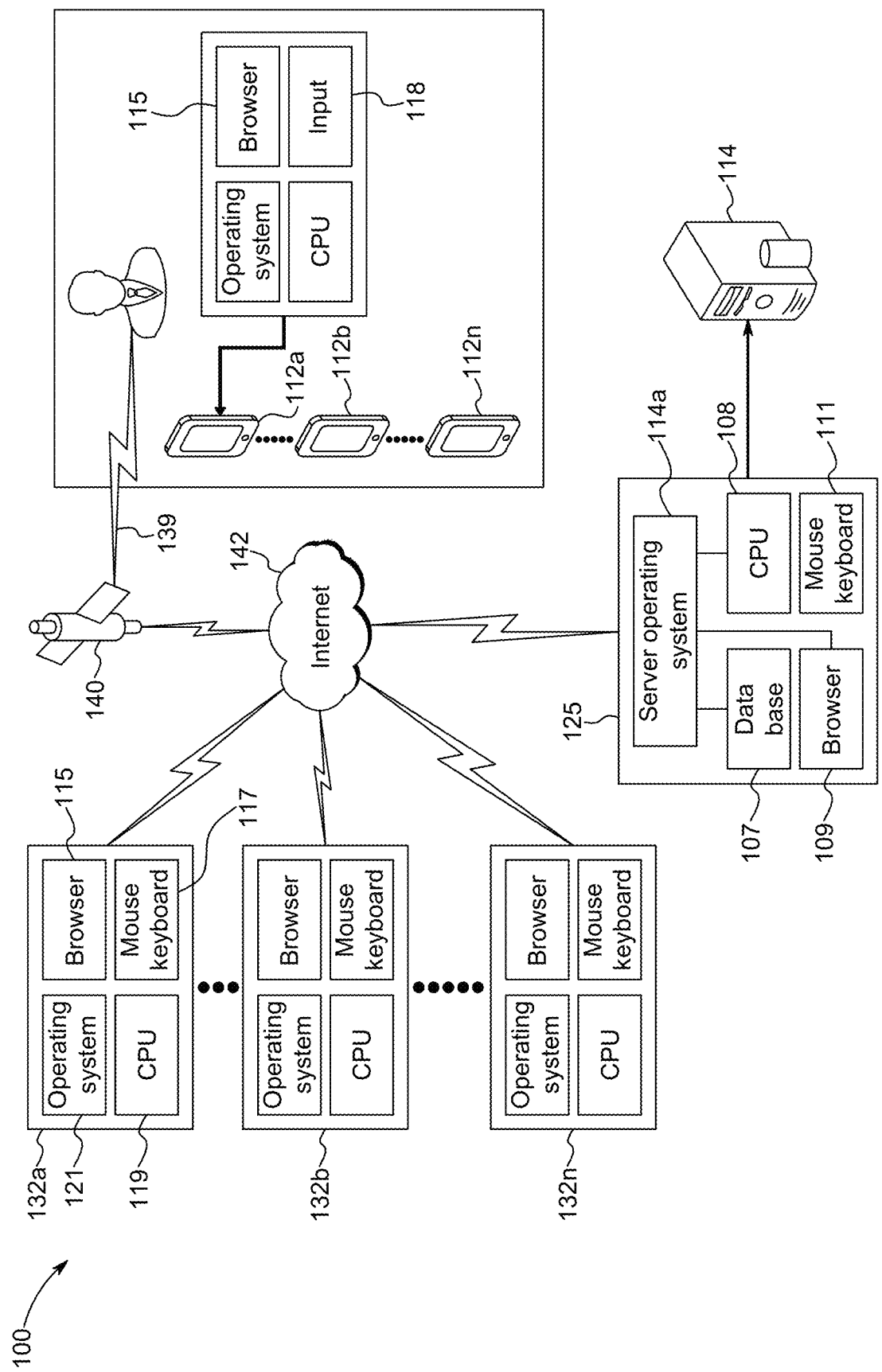
FIG. 1 shows a system for creating and porting one or more portable software execution file in accordance with an embodiment of the present invention.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

An embodiment described herein principally in connection with FIGS. 1-7 takes the form of a computer method for creating a portable unit on a first computer to be executed on one or more remote computers including the steps of: creating an execution file having one or more tasks for deployment, the tasks having command line arguments executable as variables by the remote computers, assembled into a single execution file, validating the tasks and organizing nested tasks, the organizing step including collecting nested task information for each task and accounting for all dependencies to ensure that files, tasks, and environments for running on one or more remote computers are present in the portable unit, the step of creating an execution file further including, reading the task file, scanning for event dependencies and embedding files and links needed for remote execution of the execution file, storing the dependencies in a dependency file, scanning for security, and verifying the task file for proper formatting.

Another embodiment described herein principally in connection with FIGS. 1-7 takes the form of computer software embodied on a computer readable medium for creating a portable unit on a first computer to be executed on one or more remote computers including code for: creating an execution file having one or more tasks for deployment, the tasks having command line arguments executable as variables by the remote computers, assembled into a single execution file, validating the tasks and organizing nested tasks, the organizing including collecting nested task information for each task and accounting for all dependencies to ensure that files, tasks, and environments for running on one or more remote computers are present in the portable unit, creating an execution file further including, reading the task file, scanning for event dependencies and embedding files and links needed for remote execution of the execution file, storing the dependencies in a dependency file, scanning for security, verifying the task file for proper formatting.

Another embodiment disclosed herein principally in connection with FIGS. 1-7 takes the form of a computer system for creating a portable unit on a first computer to be executed on one or more remote computers including: a one or more processors, a memory, a communications link and one or more databases containing: an execution file having one or more tasks for deployment, the tasks having command line arguments executable as variables by the remote computers, assembled into a single execution file, the one or more processors configured to: (a) validate the tasks, (b) collect nested task information and organize nested tasks, (d) account for all dependencies to ensure that files, tasks, and environments for running on one or more remote computers are present in the portable unit. Furthermore, the one or more processors are configured to (a) create an execution file further configured to: (b) read the task file, scan for event dependencies and (c) embed files and links needed for remote execution of the execution file, (d) store the dependencies in a dependency file, (e) scan for security, (f) verify the task file for proper formatting and transmit the portable unit file.

FIG. 1 represents a system 100 where a user can create software processes in one environment that can be ported to remotely situated computers, such as to a production environment, partner's site, or customer's site. In such instances present technology takes a designed test case and executes it in another environment, but there is a constant need to improve the system to ensure its usability by relatively non skilled computer users. System 100 includes software for creating, porting and running one or more portable software execution files. System 100 further includes at least one central processing computer 114 which typically serves as, or couples to, a computer server/operating system 114a, an Internet 142 presence, a plurality of remote computers 132a-132n and, by way of example, optional satellite communications 139, 140 and further by way of example to a plurality of mobile PDA 112a-112n. FIG. 1 more specifically depicts the computer system 100 and the central computer 114 that includes the server/operating system 114a that is associated with a database 107, CPU 108, and software application for creating the portable software execution files utilizing a browser 109 and a mouse/keyboard 111. Once the portable software execution files are created, they are ported via server operating system 114a to the plurality of remote computers 132a-132n or mobile PDA 112a-112n. The server/operating system computer 114a includes at least one controller or central processing unit (CPU or processor) 108, at least one communication port 125 or hub, at least one random access memory (RAM), at least one read-only memory (ROM) and one or more databases or data storage devices such as database 107. All of these later elements are in communication with the CPU 108 to facilitate the operation of the server functionality.

The computer 114 may be configured in many different ways. For example, computer 114 may be a conventional standalone server computer or alternatively, the function of server may be distributed across multiple computing systems and architectures. Computer 114 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to communications port 125 that serves as a primary communication link with other servers, client or user computers, such as 132-132n and 112a-112n, and other related devices. The communications hub or port 125 may have minimal processing capability itself, serving primarily as a communications router. A variety of communications protocols may be part of the system, including but not limited to: Ethernet, SAP, SAS.TM., ATP, Bluetooth, GSM and TCP/IP.

Data storage device (not shown), within which systems, application and communications programs as well as database 107 may be stored, include a hard-magnetic disk drive, optical storage units, CD-ROM drives, or flash memory. Data storage device contains databases e.g., database 107 used in processing the task action list to be further described below and/or calculations in accordance with the present invention, including at least a command structure for application in the construction of tasks as will also later be described in detail. In one embodiment, database software creates and manages these databases. Creation and porting of the portable software and related calculations and/or algorithms of the present invention are stored in storage device and executed by the CPU 108. A controller (not shown) resident in the CPU comprises a processor (not shown), such as one or more conventional microprocessors and one or more supplementary co-processors such as math co-processors. The processor is in communication with a communication port 125 through which the processor communicates with other devices such as other servers, user terminals or devices and the Internet 142. The communication port 125 may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices. The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wireline medium or combination of the foregoing. The data storage device may store, for example, (i) a program (e.g., computer program code and/or a computer program product for creating, executing and porting the portable software) adapted to direct the processor in accordance with the present invention, and particularly in accordance with the processes described in detail hereinafter with regard to the creating, executing and porting the portable software; (ii) a database adapted to store information that may be utilized to store information required by the program for creating, executing and porting the portable software. The program for creating, executing and porting the portable software may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments disclosed herein are not limited to any specific combination of hardware and software.

The term "computer-readable medium" as used herein refers to any medium that provides or participates in providing instructions to the processor of the computing device (or any other processor of a device described herein) for execution and more particularly for creating, executing and porting the portable software. Such a medium may take many forms, including but not limited to, non-volatile media, volatile media, and transmission media. Non-volatile media include, for example, optical or magnetic disks, such as memory. Volatile media include dynamic random-access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for creating, executing and porting the portable software. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The computer 114 bus carries the data to main memory, from which the processor retrieves and executes the instructions. The instructions received by main memory may optionally be stored in memory either before or after execution by the processor. In addition, instructions may be received via communication port 125 as electrical, electromagnetic or optical signals, which are exemplary forms of wireless communications or data streams that carry various types of information.

The computer 114 of the present invention may also interact and/or control one or more user devices or terminals such as 132a-132n. The user device or terminal 132a-132n and the PDAs 112a-112n may include any one or a combination of a personal computer with a CPU 119, an mouse/keyboard 117 or input 118, as an input device, a computer display, a touch screen, LCD, voice recognition software, or other generally recognized input/output devices required to implement the above functionality. The program also may include program elements such as an operating system 121, a browser 115, a database management system and "device drivers" that allow the processor to interface with computer peripheral devices (e.g., a video display, a keyboard, a computer mouse, etc.).

Figure 2A:
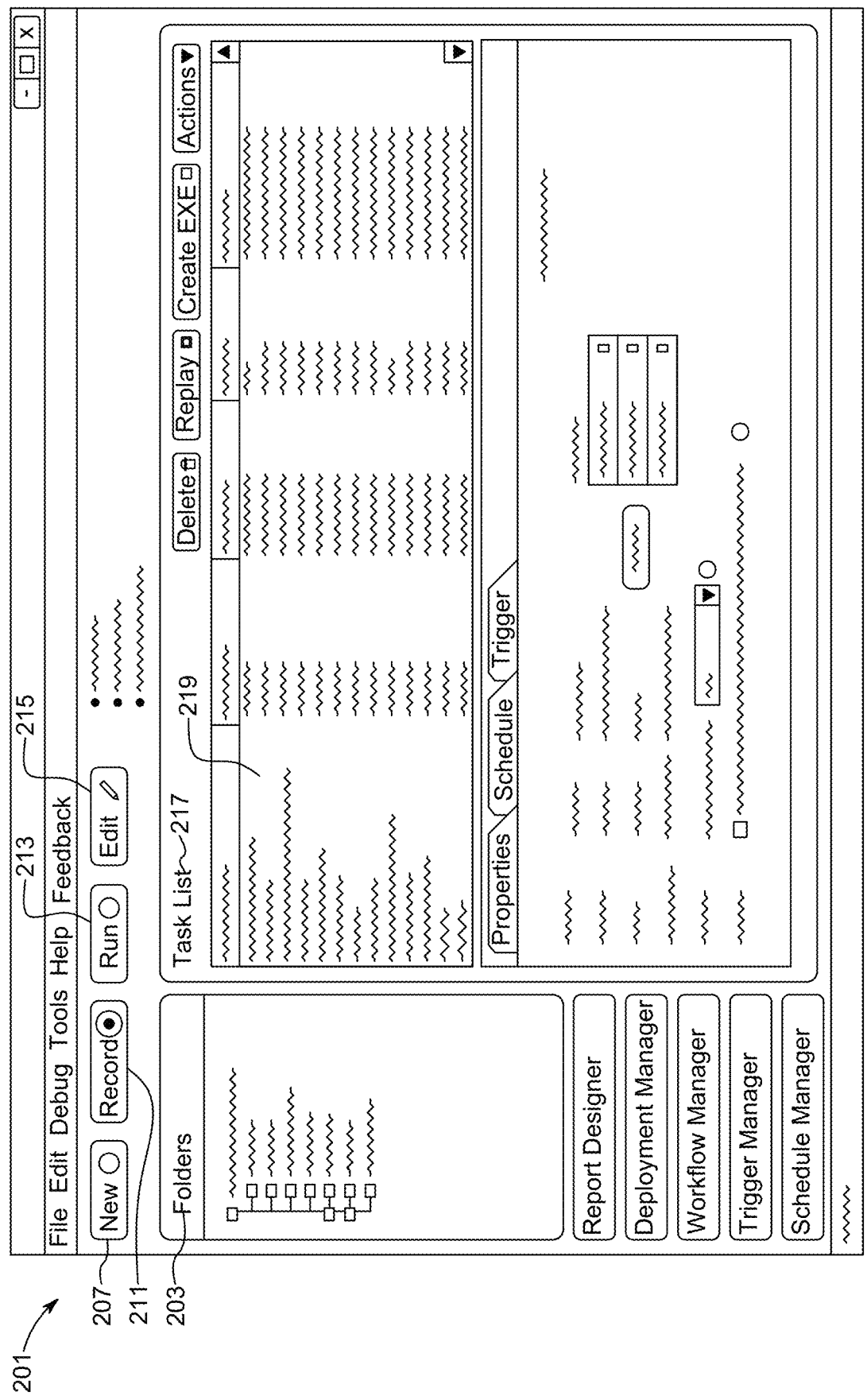

With reference to FIGS. 2A, 2B, 2C and 2D, and by way of example, a user of the system 100 may desire to create a task to be run at various times or repetitively on the local computer 114 or the remote computers 132a-132n. In the browser 109 a process as will be further described in connection with FIG. 4A and FIG. 4B, will permit the user to insert commands having single execution features or as part of a several line operation or one of several commands that may operate as part of a larger loop or nested loop. One embodiment of the invention is a portable unit 450 (FIG. 4B) that includes at least one new task file with task with commands referred to as an EXE 452 execution file (FIG. 4B). The commands create a task list incorporated as a series of tasks to be run by the EXE 452 execution file at a remote site. By way of example, a user selects from a menu of tasks an option such as 'Each email message on server' in order to read all emails that come from an email identification as defined. When the task is later executed this option will read each email one after the other. The process will also allow the user to click on Edit 215 function or to open Email Automation form, as indicated in FIG. 2C, where the Email Automation form lists all the details of the Email Server and also various optional functions to perform. For the purposes of this task, the user may select 'Get All Messages' and then save the command. The user then sets the condition for checking the emails. It identifies the action as to where to send the standard specific reply to anyone who by way of example may have purchased different products. The process will then upon execution check if condition in all email messages that arrive. For example, a pre-defined system variable referred to as $Email message$ indicates to the system to inspect the entire body of the email message. The user essentially defines a string that it wants to locate from within the message. The Send Mail command to send emails. If the $Email message$ variable is found in the email message, then a standard email will be sent. Sender email addresses are stored in the $Email From$ system variable that fetches the email address from the 'From' field. Having set up the task, the user then may run the task, locally. In accordance with an embodiment of the invention a user may also send the task off as a portable unit having an execution file referred to as an EXE 452 file for remote execution. In either instance in the present example, emails will be sent to the specific customers according the products purchased.

More particularly with reference to FIG. 2A, a suitable computer program code may be provided for performing numerous functions such as displaying a start page 201 on the browser 109, to create a new task using point and click functionality as will be further described below, and as appropriate, to record 211 key strokes defining the new task, to run 213 the new task 207 and to edit 215 the new task, within the context of a task action list 217. The task action list 217 shows numerous tasks 219 that for illustration have been previously created. All tasks 217 can be organized into folders 203. The computer program code required to create a browser with the above functions (and the other functions described herein) can be developed by a person of ordinary skill in the art of programming and is not described in detail herein.

Figure 2B:
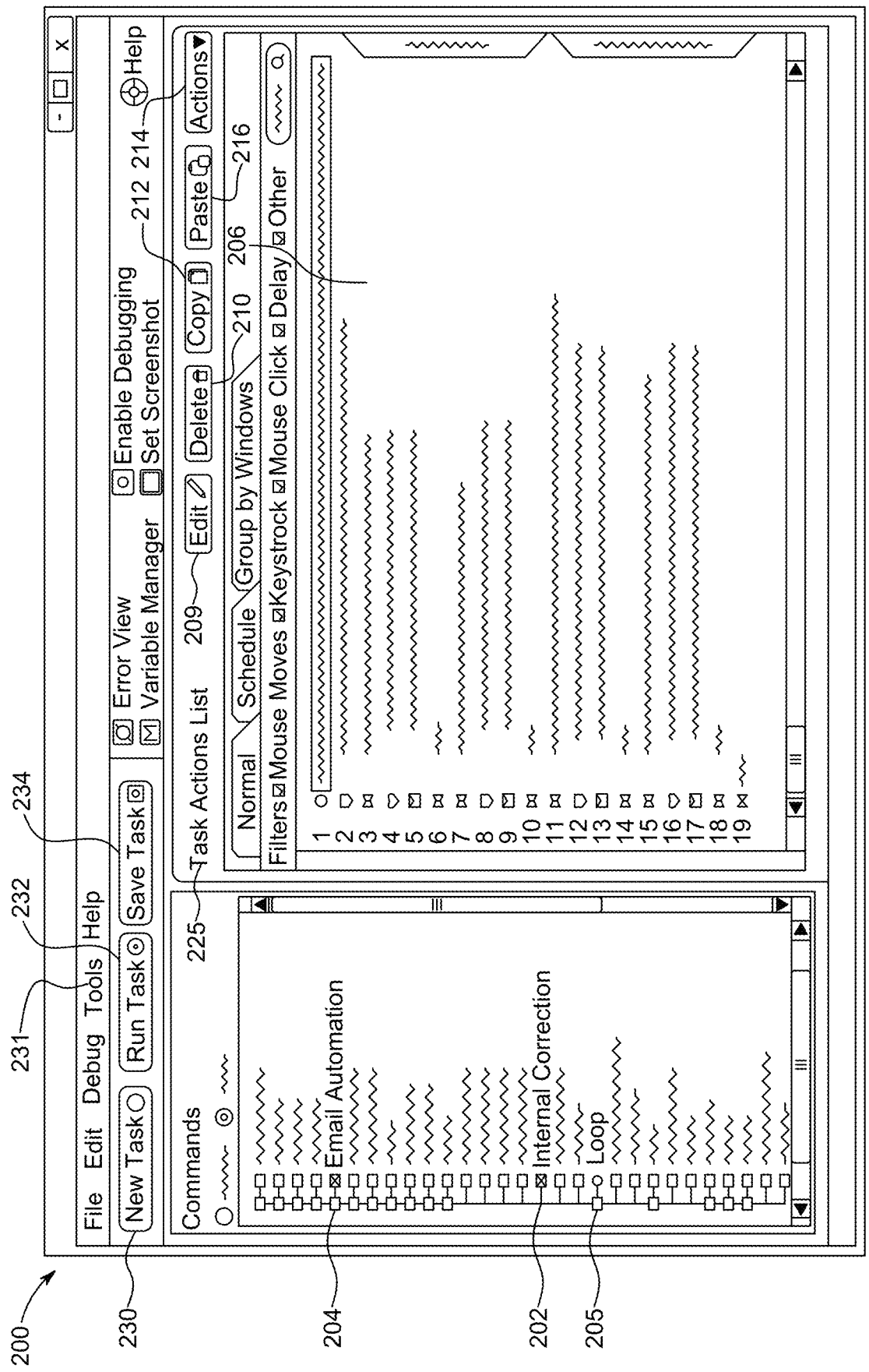
Figure 2C:
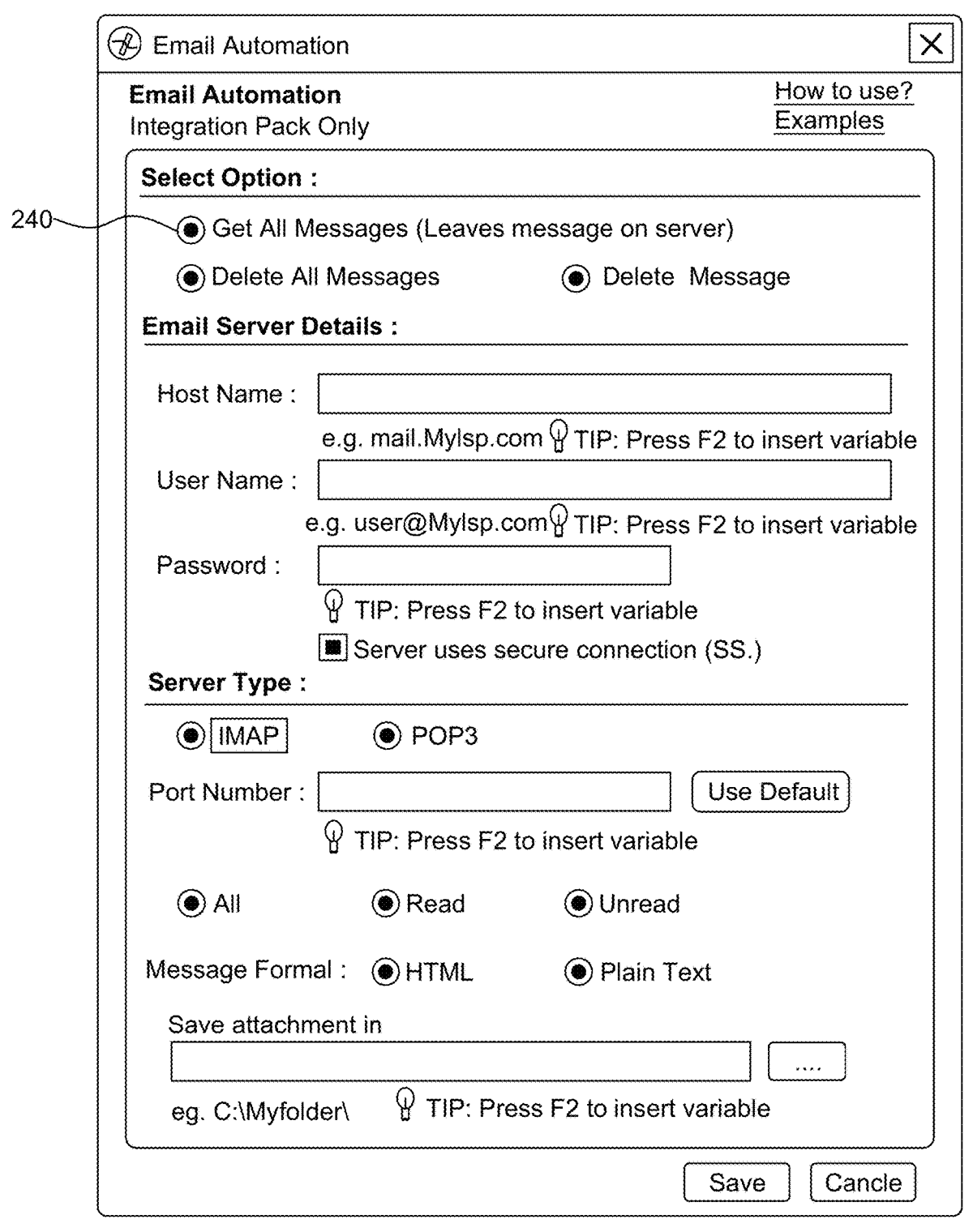

As shown in FIG. 2B suitable computer program code is provided for performing numerous functions such as displaying a task editor 200 on the browser 109, creating a new task to be ported, dragging commands into a task action list, and as appropriate, undoing, editing, deleting, copying and pasting commands within the context of the task action list. The computer program code required to implement the above functions (and the other functions described herein) can be developed by a person of ordinary skill in the art of programming and is not described in detail herein. The task editor 200 contains two windows a task action window 206 and a command window 204. The task editor includes commands that are inserted into the take action window 206. In the prior art there are over 300 commands 202 to choose from in such systems. To each of the commands 202 added as tasks, the system 100 permits adjusting playback delays, inserting new actions or keystrokes, removing mouse moves, optimizing tasks, and creating new tasks. Commands 202 such as Clipboard, Database, Excel and Insert Mouse are but a few of the library of commands found.

FIG. 2B illustrates an example of an environment in which the invention works. Here, by way of example, a user desires to automate email processing whereby, if an email contains an order of a particular product of a hypothetical product line, a confirmation email is sent with a standard message. Therefore, emails are sent to specific senders according the product those purchase by them. The user begins by creating a new task 230 via Tools 231 and utilizing the mouse 111 (FIG. 1) clicks on the function Task Editor (not shown). Browser 109, shown in screen display 200 shows the command window 204 where the Loop command 205 is located. The Loop 205 command will provide a list of options to choose from such as by way of example and not limitation, Start Loop commands: (e.g., (a) Loop For N times: Loops the actions between the Start Loop and End Loop commands the number of times a user specifies; (b) If a user wants to repeat the action 10 times, it places the actions between Start Loop and End Loop commands and specifies 10; and (c) Loop For List variable: where a user does not know how many times a task needs to loop, it may have a list variable with many values in it. If for example the value is 10, then using this command the user can repeat the actions within the Start Loop/End Loop block as many times as there are items in the list variable. Once the user determines the proper Loop Start command then that command is dragged and dropped into the Test Actions List 225 in the task action display window 206. The user selects the option 'Each email message on server' to read all emails that come from an email identification as defined in this example as dummyseller@tetlysolutions.com. This option will read each email one after the other. The user then uses the mouse to click on Edit 209 to open Email Automation, the form illustrated in FIG. 2C which lists all the details of the Email Server as well as various functions to perform. For the purposes of this exemplar, the user selects 'Get All Messages' 240. Again, referring to the Test Actions List 225 window 206, an 'IF condition' is inserted for checking the emails. The variable called $Email message$ contains the body of the message whereby the user defines a string that it wants to find from within the message. In this case if the email message includes the words 'Automation Anywhere' then Enter Send Mail command sends emails satisfying the condition with the subject: "Thanks for ordering "Automation Anywhere." If the $Email message$ variable contains the specific word, then a standard email will be sent. In reply to anyone who has purchased the different products, the 'If conditions' are altered accordingly as illustrated in the various email messages that include "Launch-n-Go, Workspace Macro Pro [Personal Use]". The sender email addresses are stored in the $Email From$ system variable that fetches the email address from the 'From field'. When the Task Action List 225 is complete then the user can save 234 and run test 234 to determine if the task as created works as intended. When the user runs this task, it loops through the emails and sends a standard reply to the emails that has order information for each designated product in the product line.

Figure 2D:
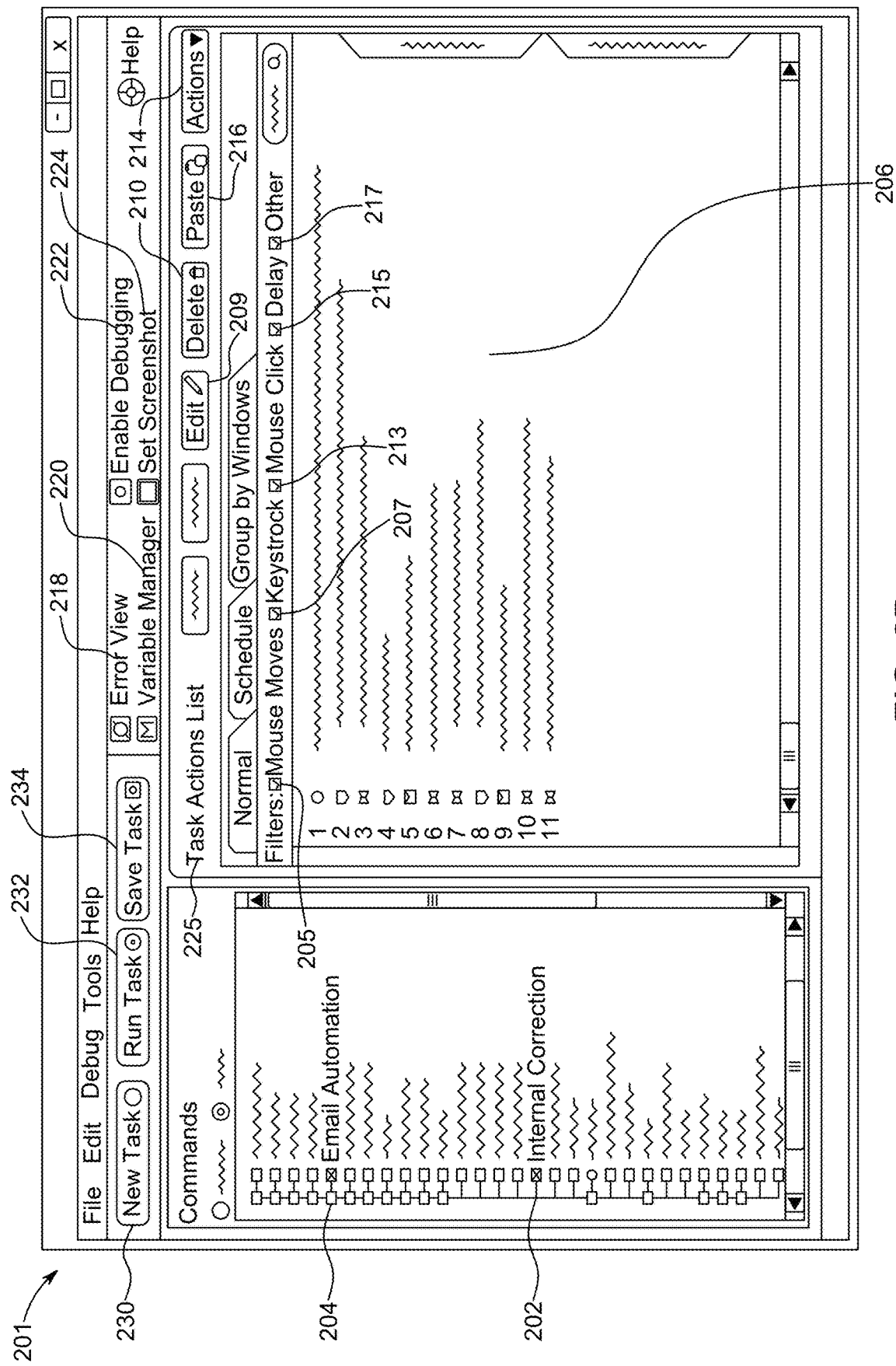

Referring now to FIG. 2D, once a task action list has been assembled from the commands 202 into the task action window 206, by way of example and not limitation, a user can select various actions regarding the command such as: Edit 209, Delete 210, Copy 212 and Paste 216 where the copied action is pasted below the cursor marked action. In addition to the basic functions as described, an action 214 permits viewing and editing enabled features corresponding to the selected action. Features include: bulk editing for editing multiple delay or keystroke actions; duplicating an action below the marked action; undoing and redoing an action; converting to variable; converting a keystroke to a variable; converting to prompt; converting a keystroke to a prompt message; converting to 'If Web Control Exists'; inserting an 'If condition'; insert 'If condition' for a selected block of task actions; insert error handling; insert error handling for a selected block of task actions; changing window title; setting a window title to multiple window titles; running from 'This Step'; running the task from a selected action onwards; enabling an action; disabling an action; moving up and moving down an action. In addition, a user may record mouse moves 207, mouse clicks 213, control or delay the execution of tasks 215, and other features 217 that may exist from time to time. The browser 109 also allows an error view 218, enabling debugging 222 and setting a screen shot 224. A variable manager 220 allows control over variables that will be loaded at run time as part of the EXE 452 execution. Those persons of ordinary skill in the art of programming will appreciate the forgoing list of actions and how they are utilized in connection with building a task list as described.

Figure 2E:
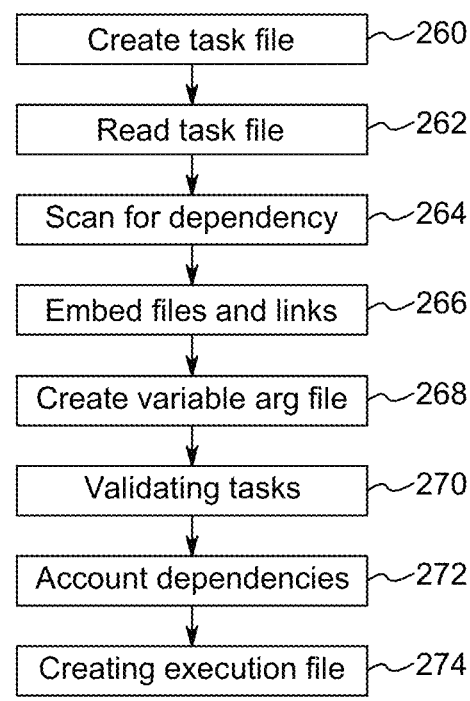
FIG. 2E shows a flow diagram of the creation of executable portable software execution files in accordance with an embodiment of the present invention.

One embodiment of the invention as shown in FIG. 2E is a computer method for creating a portable unit (FIG. 4B) on a first computer (FIG. 1, 114) to be executed on one or more remote computers (e.g., FIG. 1, 132a-132n) comprising the steps of: creating an execution file 274 having one or more tasks for deployment, by after creating a task file 260, reading the task file 262 and scanning for dependencies, 264. The scanning for dependencies deals with ascertaining nested tasks, variable arguments and ensures that the process embeds 266 the necessary files and links for execution of the execution file at the remote site. For example, the tasks may have command line arguments which are executable as variables by the remote computer. A variable argument file 268 is appended to an assembled into a single execution file (FIG. 4B, 252). The process validates the tasks 270 and organizes nested tasks, wherein the organizing step includes collecting nested task information for each task and accounting 272 for all dependencies to ensure that files, tasks, and environments for running on one or more remote computers are present in the portable unit that contains the execution file as developed in 274 and which is part of the portable unit as further discussed in connection with FIG. 4B.

Figure 3:
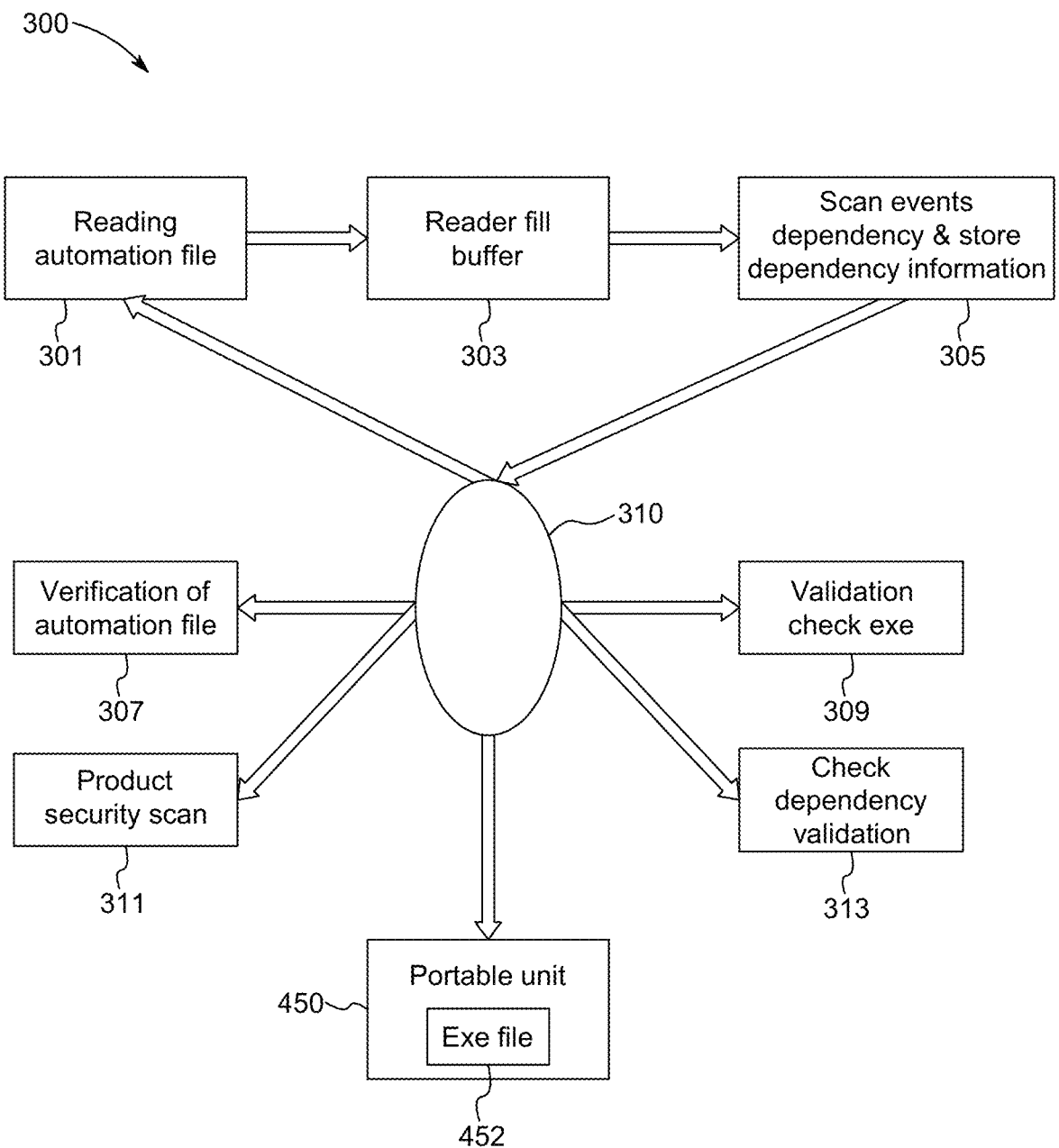
FIG. 3 shows a diagram for the creation of executable portable software execution files in accordance with an embodiment of the present invention.

FIG. 3 shows a diagram of the creation of executable portable unit software having an execution file therein in accordance with an embodiment. Once a user creates a task as for example illustrated in FIG. 2B-2D, the system 100 utilizing process 300 of FIG. 3 prepares the task to being executed or run. The process 300, running from for explanation purposes a virtual hub 310, performs the step of reading 301 the task file into a reader fill buffer 303 where the file undergoes scanning 305 for event dependencies and when it locates a dependency stores the dependency as a dependency file in a storage device for later running of the task.

During buffer filling 303 the process 300 scans each event and related dependency information, property information, each such piece of information necessary for running the final execution file. An event may be by way of example and not limitation, as found in one embodiment, specified as Run Script, Run Macro, Optical Character Recognition ("OCR"), Application Integration, Terminal Emulation, Email Automation, Send Email, Web Recorder, Microsoft Exchange Server, etc. Certain commands such as OCR require a specific dynamic library link ("DLL") to run properly at remote site machines. Process 300 inspects for their dependency and embeds those files needed as well as imbeds such DLLs in the portable unit as further described below. For example, Visual Basic Scripting Edition ("VBScript") an active scripting language, developed by Microsoft, which uses the component object model to access elements of the environment within which it is running (e.g. FileSystemObject used to create, read, update and delete files). A VBScript script must be executed within a host environment, which is embeddable in other programs, through technologies such as the Microsoft Script control (msscript.ocx). If the process 300 needs to run a VB Script, then utilizing the 'Run Script' command, process 300 embeds the proper environment in the portable unit 450 (also, see FIG. 4B) for it to run the VBScript on the remote machine.

Process 300 inserts a variety of smart tags in the file. Smart tags enable the system to recognize certain types of data in a document (for example, dates or names) and automatically make such text a smart tag, optionally visually indicated. Clicking on a smart tag results in a selection-based search command that then brings up in browser 109 a list of possible actions for that data type. An enhanced logic of file reading can read a presently created task file as well as files created using prior art systems. If during the process of reading 301 any error occurs, then process 300 displays an appropriate error message to the user via browser 109 (FIG. 1). Having created a dependency file, the process 300 performs the step of verifying 307 the task file for proper formatting and validating 309 the task file insofar as ensuring that there is no blank task attached. Process 300 checks that the file selected for "Create Exe" is a valid file including smart tags defined within the file. If any verification of the file fails, then process 300 guides user to specific error description via browser 109 messages and instructions. If during product security scanning 311 any error occur, then process 300 displays the appropriate product security message on the browser 109 (FIG. 1). In the check EXE 452 validation 309 block the process validates files before proceeding to the reading 301.

With further reference to FIG. 3, in one embodiment of the invention, the process 300 determines if there are nested task files. A nested task is one where the user can run a child task from somewhere inside a parent task and then when the child task is done, the control resumes to the parent task. A nested task is essentially a parent task or a caller task. During the step of validating 309 the process 300 collects nested task file information for each task. Then process 300 one by one scans all files using smart logic. The process 300 checks dependency validation as per task requirements collected during the scanning 305 process. Process 300 also scans all properties related information and checks its validity with respect to each action which exists inside the task underway. If a step in the task is not valid then the process will display in browser 109 (FIG. 1) an appropriate error is signaled, through which a user is guided to correct the task entry in error. During the validation, process 300 collects information and has software added to support options for attaching by way of example and not limitation, VBScript, or JavaScript, the small, lightweight, object-oriented, cross-platform scripting language, as well as to validate mainframe supports such as IBM Models TN3270 and TN5250.

Further process 300 steps perform scanning 311 product security for task calls to other tasks, which may in turn call other tasks and so on. The process 300 allows the creation of deployable single EXE 452 files that automatically account for all dependencies. Thereafter process 300 checks 313 the validation of the dependency list, i.e., to ensure that all the files/tasks/environments/needed to run the EXE 452 task files are present in the portable unit. In one optional embodiment of the invention, the portable unit 450 feature may only be available for certain subset tasks, so that the process 300 check 313 of the validation ensures that the user has the correct version. Process 300 check 313 of the validation also ensures that the user has the correct product release number for backward compatibility. Following a successful checking 313, a deployable EXE file can be created.

FIG. 2B illustrates an example of an environment in which an embodiment works. Here, by way of example, a user desires to automate email processing whereby, if an email contains an order of a particular product of a hypothetical product line, a confirmation email is sent with a standard message. Therefore, emails are sent to specific senders according the product those purchase by them. The user begins by creating a new task 230 via Tools 231 and utilizing the mouse 111 (FIG. 1) clicks on the function Task Editor (not shown). Browser 109, shown in screen display 200 shows the command window 204 where the Loop command 205 is located. The Loop 205 command will provide a list of options to choose from such as by way of example and not limitation, Start Loop commands: (e.g., (a) Loop For N times: Loops the actions between the Start Loop and End Loop commands the number of times a user specifies; (b) If a user wants to repeat the action 10 times, it places the actions between Start Loop and End Loop commands and specifies 10; and (c) Loop For List variable: where a user does not know how many times a task needs to loop, it may have a list variable with many values in it. If for example the value is 10, then using this command the user can repeat the actions within the Start Loop/End Loop block as many times as there are items in the list variable. Once the user determines the proper Loop Start command then that command is dragged and dropped into the Test Actions List 225 in the task action display window 206. The user selects the option 'Each email message on server' to read all emails that come from an email identification as defined in this example as dummyseller@tetlysolutions.com. This option will read each email one after the other. The user then uses the mouse to click on Edit 209 to open Email Automation, the form illustrated in FIG. 2C which lists all the details of the Email Server as well as various functions to perform. For the purposes of this exemplar, the user selects 'Get All Messages' 240. Again, referring to the Test Actions List 225 window 206, an 'IF condition' is inserted for checking the emails. The variable called $Email message$ contains the body of the message whereby the user defines a string that it wants to find from within the message. In this case if the email message includes the words 'Automation Anywhere' then Enter Send Mail command sends emails satisfying the condition with the subject: "Thanks for ordering "Automation Anywhere." If the $Email message$ variable contains the specific word, then a standard email will be sent. In reply to anyone who has purchased the different products, the 'If conditions' are altered accordingly as illustrated in the various email messages that include "Launch-n-Go, Workspace Macro Pro [Personal Use].degree." The sender email addresses are stored in the $Email From$ system variable that fetches the email address from the 'From field'. When the Task Action List 225 is complete then the user can save 234 and run task 232 to determine if the task as created works as intended. When the user runs this task, it loops through the emails and sends a standard reply to the emails that has order information for each designated product in the product line.

Figure 4A:
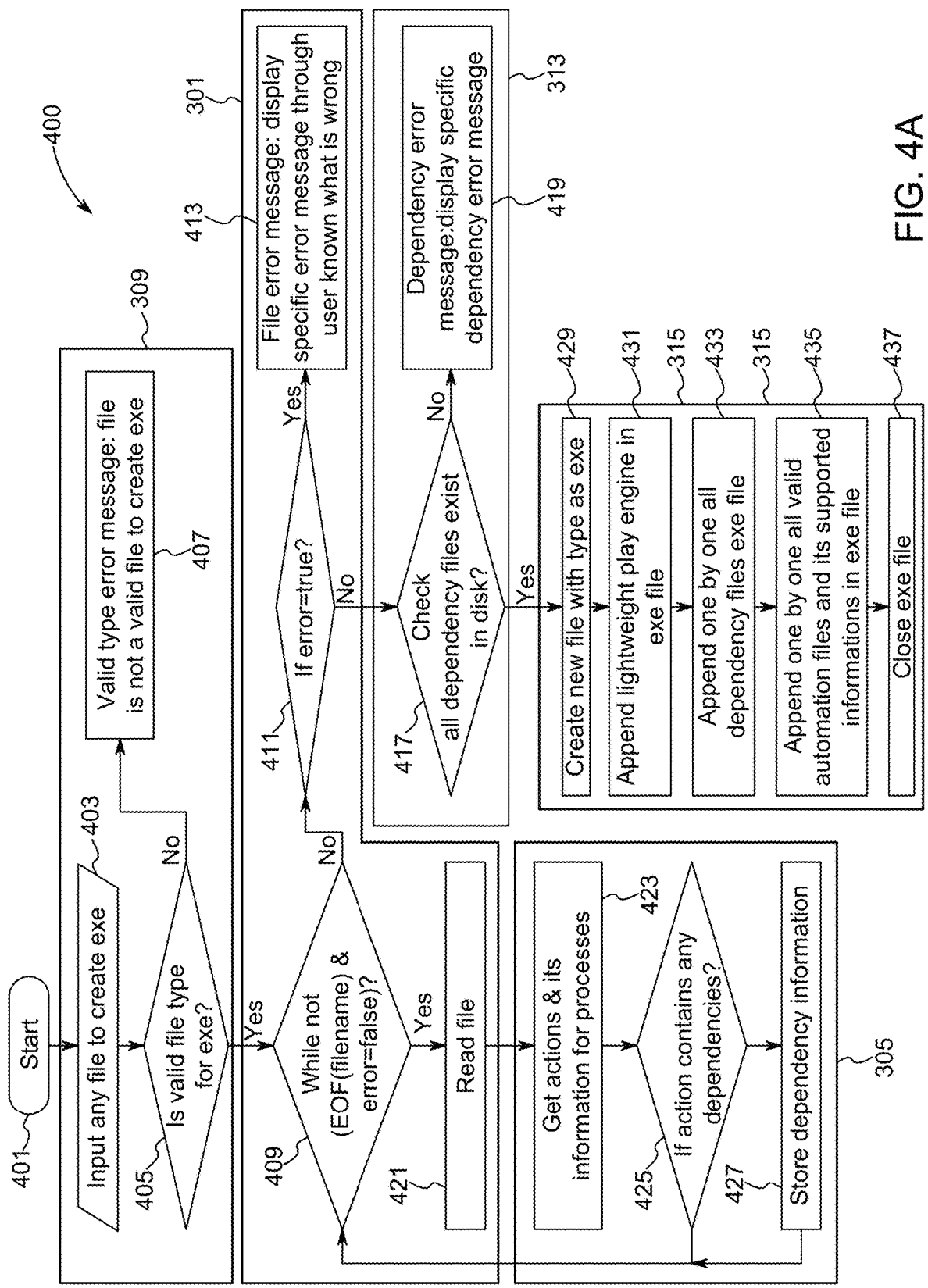
FIG. 4A shows a flow chart for the creation of executable portable software execution files in accordance with an embodiment of the present invention.
Figure 4B:
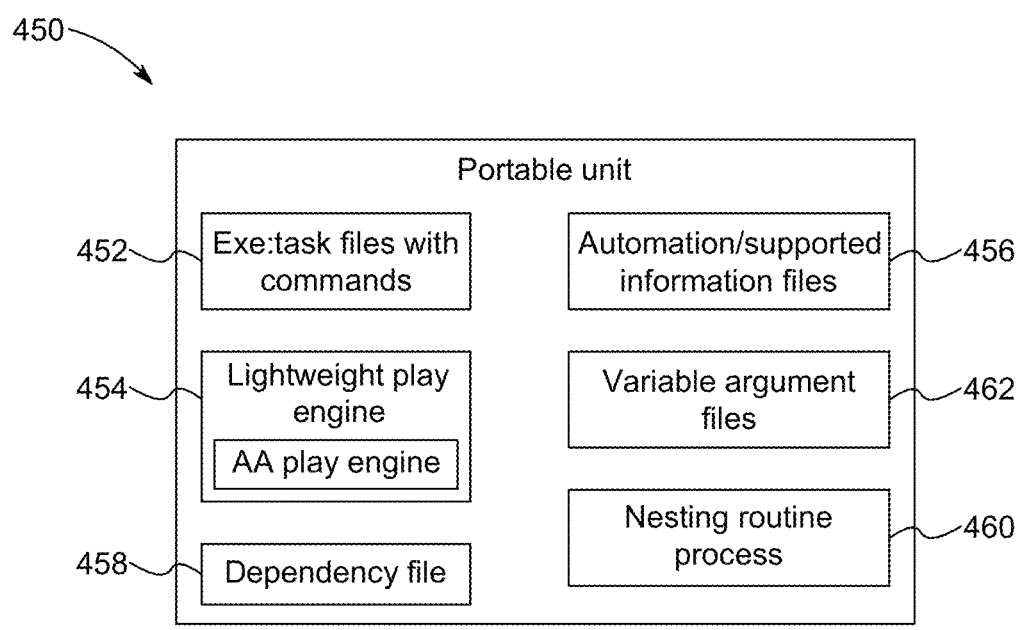
FIG. 4B shows a block diagram of a portable unit software execution file in accordance with an embodiment of the present invention.

FIG. 4A shows a flow chart of a process 400 for creation of executable portable software execution files in accordance with an embodiment. The process 400 discloses processing operations that can be performed to carry out operations 309, 301, 305 and 313 of FIG. 3. As shown in FIG. 4A, operations 403, 405 and 407 can be used in an embodiment of the validation 309; operations 409, 411, 413 and 421 can be used in an embodiment of the reading 301; operations 423, 425 and 427 can be used in an embodiment of the scanning 305; operations 417 and 419 can be used in an embodiment of the checking 313; and operations 429, 431, 433, 435 and 437 can be used in an embodiment of creating 315 of an exe file.

FIG. 4B shows a block diagram of a portable unit 450 software with the execution file EXE 452 in accordance with an embodiment of the present invention. The portable unit 450 includes at least one new task file with task with commands referred to as EXE 452 file. A command may have arguments or variables that require values associated with the task before the task can be run. When the portable unit is sent to a remote location for execution, a file of values for each of the variables or arguments associated with each command requiring a value at run time is sent as well. Essentially the variable arguments file 462 allows passing values for the arguments dynamically at the time of the EXE execution start at the remote site. In an alternate embodiment of the invention, the variables or arguments associated with each command requiring a value at run time may be inputted by the remote user before running the EXE 452 at the remote site. In order to execute or run the portable unit 450 at the remote site a lightweight play engine 454 is also sent as part of the portable unit 450. A dependency file 458, automation and supported information file 456, a variable repository 462 allows passing variables as arguments and to set variable values dynamically at the time of EXE's execution start at the remote site. The nesting routines process 460 associated with the tasks are also bundled into the portable unit. The EXE may have loops, and nested loops as earlier described. The process 460 scans the EXE 452 for loops and nested loops and determines if there are duplicate loops with the larger EXE 452 task list. If there are then the process 460 provides calls to a common set of commands to reduce the number of times a loop or nested loop has to be duplicated in the task list. The portably unit will run the loops at execution time based upon the call list provided by the process 460.

Figure 5:
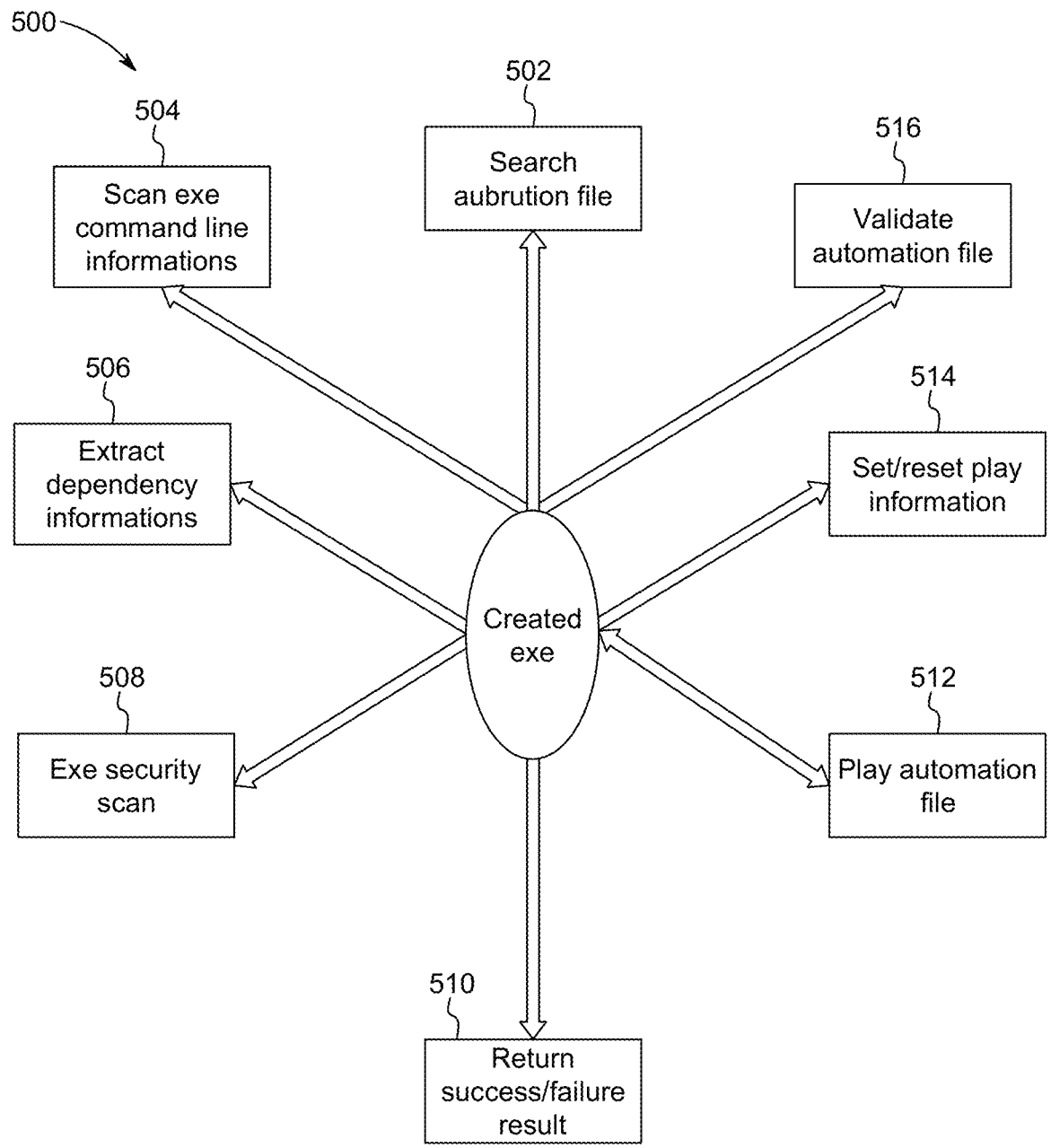
FIG. 5 shows a diagram for the creation of executable portable software execution files in accordance with an embodiment of the present invention.

Having created the portable unit as illustrated in FIG. 3, FIG. 4A, and FIG. 4B the portable unit 450 is ported or communicated to a remote computer for execution. FIG. 5 shows a chart of the play feature of the executable portable unit 450 software execution file in accordance with an embodiment of the present invention. During initialization of EXE 452 execution files the process 500 performs step 508 a security information scan of the EXE 452 file. The portable unit 450 EXE 501 will start its execution by making copy of itself inside employing the temp directory in the user's operating system or at a location based on information passed with the portable unit 450. From the chosen location process 500 starts execution of the EXE file with command information. In searching 502 file process 500 seeks to find any unsupported runs that effectively operate as nested run tasks and if it finds a requirement to loop, then it provides logic to run the unsupported task. Process 500 then proceeds to step 504 where scan EXE command line information in the form of command line arguments enable the created EXE file to use the arguments created during process 300. It also takes input variables with its value from command-line during the initialization process. In step 506 the process 500 extracts dependency information and takes necessary actions as the portable unit 450 EXE 542 runs its operations. Depending on command-line arguments process 500 evaluates the information to extract each and every item of dependency information. Process 500 extracts one by one all dependency files which are required to run the EXE file, such as by way of example script engines, script files, Application Integration, Email Automation, Email Sent, Notifications, etc. Process 500 can also validate the EXE file (i.e., automation file). Process 500 then performs step 514 play file and finds the specific file to start playing 512 the portable unit 450 EXE 452 using the light weight engine. If process 500 finds a nested task file, then it first collects information about that task file and starts a new process of self-execution and waits to finish execution of the previous process 500. If the EXE file contains script files, then it first looks at the files at the EXE file's extracted locations. If a script file is found there then process 500 uses that file, otherwise it finds a file at user's location which defines the events. Process 500 embeds certain execution engines obtained from third party DLLs, in order to execute certain commands and prior to final assembly of the portable unit 450 process 500 checks on the remote machine's environment/program to ascertain if the same engines exist as well as whether the same version is installed. Process 500 can also return a success or failure result.

Figure 6:
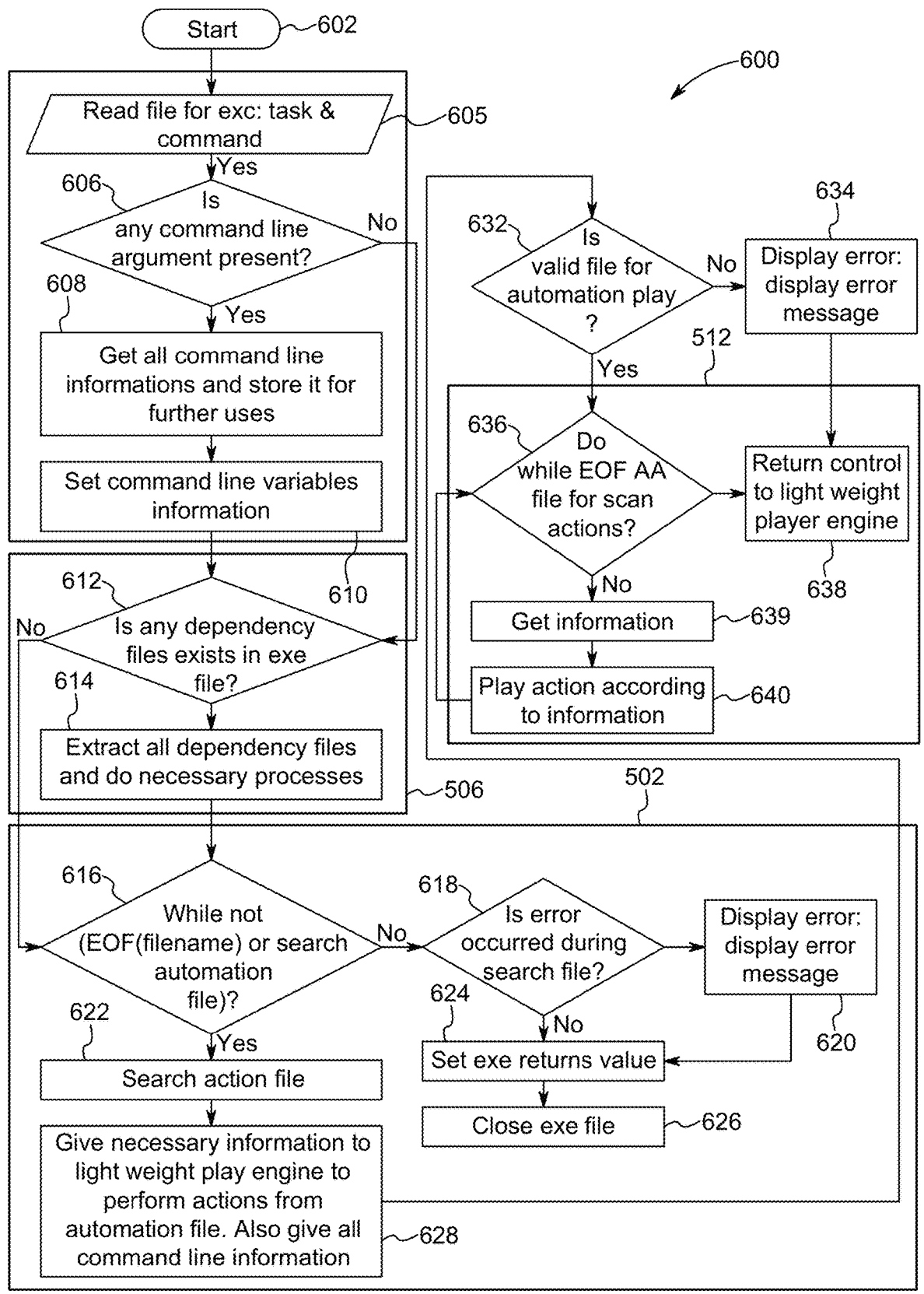
FIG. 6 shows a flow chart of the play feature of executable portable software execution files in accordance with an embodiment of the present invention.

The flow chart in FIG. 6 elaborates on the steps outlined in FIG. 5 to run the portable unit 450 (FIG. 4B) in accordance with an embodiment of the present invention. At start 602 the remote system of FIG. 1 (132a-132n or 112a-112n) receives a portable unit 450 file including the components as outlined in FIG. 4B. Process 600 reads 605 files as an acceptable file type as generated in process 500. Process 600 performs a check 606 for the presence of any command line arguments that require the insertion or incorporation of argument values 610. If there are no arguments requiring values, then dependency 612 is checked and if dependencies do not exist then process 600 reads the EXE 452 task file to determine 616 if the end of file (EOF) has been reached. If it has been reached, then a determination if an error 618 has occurred. If no error has occurred, then process 600 sets 624 the return value and closes the 626 the EXE 452 file. Any Windows executable program returns a return value when it's finished running As such the portable unit, which represents a self-executable Windows exe, returns a value 0 on successful completion and 1 otherwise, allowing a caller program, if any, to determine the outcome of the particular EXE 452 task file.

If there is an error, process 600 displays an error message 620. By way of example, an error message 620 might indicate the inability to locate a file and would alert the user as follows: "Error Message: Cannot find key file "C: \My Documents \Automation Anywhere \Automation Anywhere\My Task\Tethys.atmn" in Auto.exe."

Returning now to the check 606 for the presence of any command line arguments, if an argument is required in a command then all command line information 608 is retrieved and stored for later use when playing or executing the portable unit 450 EXE 452 file. Following the retrieval of the command-line information the command-line variable information is set 610. There is a separate variable subsystem (not shown) where all variables are stored in an array in memory with respective values and when the commands are executed, the variable values are obtained from that array. The command line values for those variables are used to 'initialize' the variables in that array.

Dependency 612 is checked and as previously indicated, if dependencies do not exist then process 600 reads the EXE 452 task file to determine 616 if the end of file (EOF) has been reached. However, if a dependency 612 is found to exist then process 600 extracts 614 all dependency files and does the necessary processing. Process 500 embeds certain execution engines obtained from third party DLLs, in order to execute certain commands. As indicated above, when process 500 embeds the engines it first checks on the remote machine's environment/program to ascertain if the same engines exist as well as whether the same version is installed. If so, process 600 employs the already installed environment.

As previously indicated the process 600 then reads the EXE 452 task file to determine 616 if the end of file (EOF) has been reached. And if it has not been reached then the process 600 searches 622 the action file, which is indicative of what actions are to be taken by the process. At step 628 the process 600 provides the necessary information to the lightweight play engine to perform actions for the running of the portable unit 450 EXE 452 file and also provides all command line information to the lightweight play engine. By way of example, necessary information might include how many times to repeat a task, at what speed, and whom to notify when the task has completed running.

Having provided the necessary information and command line information to the lightweight player, process 600 checks to determine 632 if the file is a valid EXE 452 file. If it is not a valid file an error 634 is displayed. By way of example, an error message 634 might indicate the inability to locate a file and would alert the user as follows: "Error Message: Cannot find key file "C: \My Documents\Automation Anywhere \Automation Anywhere \My Task\Tethys.atmn" in Auto.exe." If the file is valid, then it determines 636 if an EOF has been reached and if it has then the process 600 returns control 638 to the lightweight play engine. If it has not reached an EOF, then the process 600 gets the action information 639 and plays the action 640 and remains in the loop 636, 639 and 640 executing the commands and tasks in the portable unit.

Figure 7:
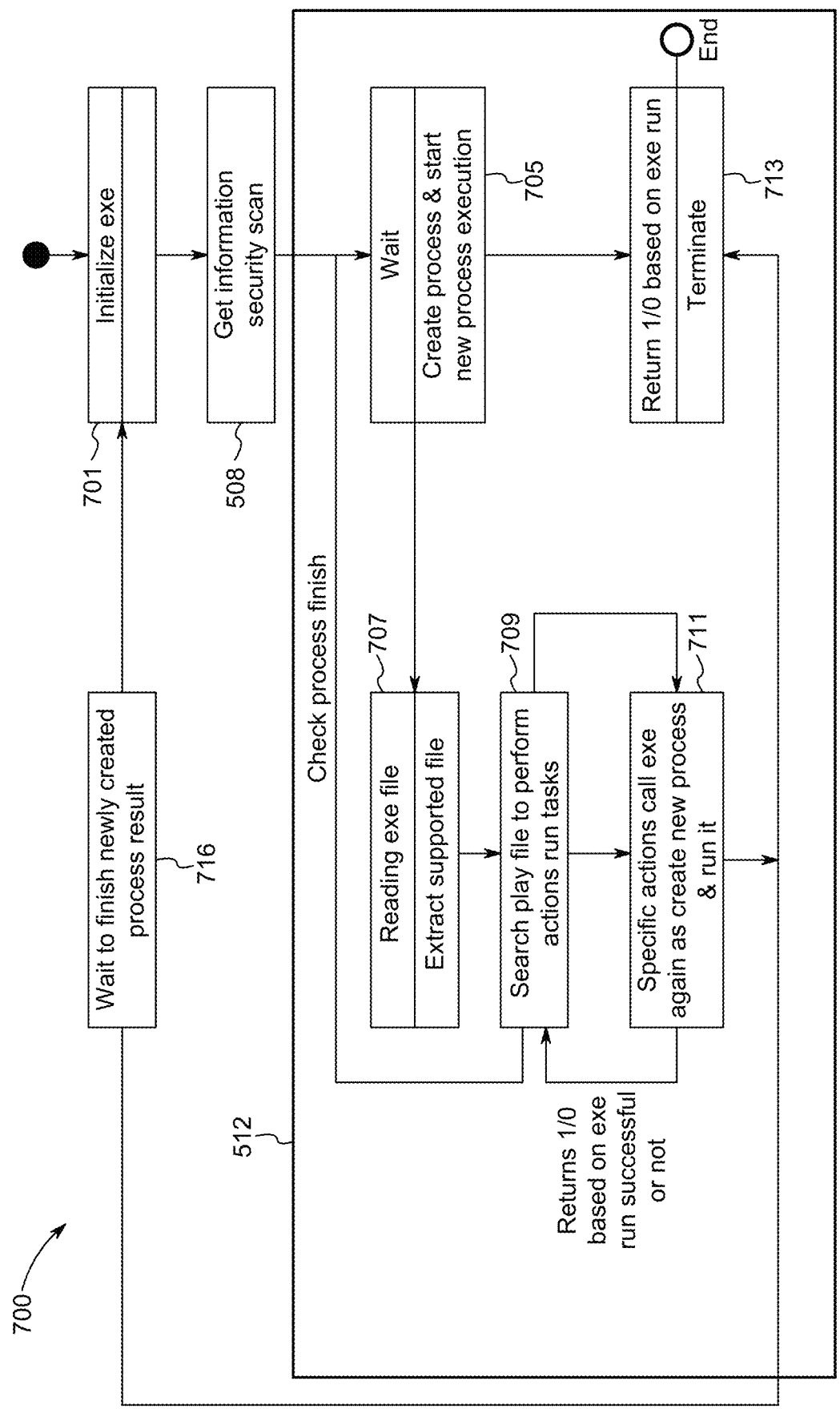
FIG. 7 shows a state diagram for the play engine in accordance with an embodiment of the present invention.

Turning to FIG. 5, FIG. 6 and FIG. 7 and the play engine described in FIG. 4B, reference 454 the operation of the play engine is further described, particularly with respect to action 640 and loop 636, 639 and 640 executing the commands and tasks in the portable unit 450 (FIG. 4B). The play engine can perform a process 700 that launches by initializing 701 the EXE 452 for execution. To perform security scan 508 information is retrieved as required. In step 705 waits as the process to execute the EXE 452 files with special arguments is read and assembled. The next series of operations 707, 709, 711 and 713, are the process 500 step 512 as earlier described. The process reads the EXE 452 file 707 to among other things extract dependency files. It then runs the file by searching the play file to perform the specified actions and then executes the actions. Additionally, if there is a nested operation as one of the tasks or series of tasks then step 709 creates a new instance of EXE 452 and starts execution by returning to step 705. At step 711, if the final task action has not been executed then the process returns to running 709. If the EXE 452 indicates that there is a newly created EXE 452 task to run the wait step passes control to the initialize step 716 and 701. Otherwise if there are no other EXE 452 files to run the process proceeds to terminate the process 713.

In addition to the foregoing, embodiments disclosed herein principally in connection with FIGS. 8 (8A and 8B)-12 enable users to read from and write data into their applications and to store the data into application walls as a repository for others to exploit. An automation map is created to present a simple, consistent view of related applications, data and metadata, and the connections between them. One embodiment takes the form of a computer method for graphically displaying information including the steps of: identifying one or more data relationships that exist between and utilized by one or more applications; determining for each data relationship a respective rank based on specific data that associates the two or more user applications; finding applications based on the degree a respective rank has to one or more user applications; categorizing each relationship based on a criteria of the interaction, such as the amount of data or how often an application has been involved in a particular application between the one or more user applications; creating an application wall containing status updates and links to and from other applications related to the one of the one or more user applications; constructing an automation map from the links between the one or more user applications and other applications.

Another embodiment disclosed herein includes searching the automation map for such items as proximity to other applications; displaying a categorization of the plurality of relations from the links between the one or more user applications and other applications according to the criteria, such as proximity to the other applications; displaying each categorization, of the plurality of relations based on the links between the one or more user applications and other applications, as a respective bar that is representative of the number of occurrences of the specific data item contained therein; uniquely coloring each link in the automation map according to common structural characteristics.

Another embodiment disclosed herein principally in FIGS. 8-12 takes the form of a method for generating input content for an application or a form resident on a first computer from content existing in local computer or other remote computers including the steps of: extracting data from a first application; saving source field data to a process repository; transforming and transferring data to a second application; saving target field metadata to a process repository until all metadata has been saved; updating the second application network database, the update including: reading source application, target application, source fields, target fields, and if a first application is linked to a second application then updating an application link with a new set of data fields, calculating a ROI and calculating an application cohesion rank; classifying the first and second applications as one of producers, consumers, or orchestrators; and recalculating the ranks.

Another embodiment disclosed herein principally in FIGS. 8-12 takes the form of a method for generating input content for an application or a form resident on a first computer from content existing in local computer or other remote computers includes the steps of recording the process and playing back the process that extracts, data, saves source field data, transforms and transfers data, saves metadata, and updates the network databases.

Another embodiment disclosed herein principally in FIGS. 8-12 takes the form of a non-transitory computer-readable medium having stored thereon computer-readable instructions for displaying information including the steps of: identifying one or more data relationships that exist in one or more databases and utilized by one or more user applications; determining for each relationship a respective rank based on specific data that associates the two or more user applications; finding applications based on the degree a respective rank has to the user one or more user applications; categorizing each relationship based on a criteria (e.g., by way of example and not limitation, the amount of data or how the often use has been made of the application) of the interaction between the one or more user applications; creating an application wall containing status updates and links to and from other applications related to the one of the one or more user applications; searching an automation map constructed from the links between the one or more user applications and other applications; (e.g., by way of example and not limitation: proximity); displaying a categorization of the plurality of relations from the links between the one or more user applications and other applications according to the criteria (e.g., by way of example and not limitation: proximity) to the other applications; displaying for each categorization of the plurality of relations from the links between the one or more user applications and other applications as a respective bar that is representative of the number of occurrences of the specific data item contained therein; coloring each display of the plurality of relations from the links between the one or more user applications and other applications that has the same key structural characteristic with a common color that is different from the coloring of the relations of the other key structural characteristics.

Another embodiment disclosed herein principally in FIGS. 8-12 takes the form of a non-transitory computer-readable medium having stored thereon computer-readable instructions for generating input content for an application or a form resident on a first computer from content existing in the same computer or one or more remote computers including the steps of: extracting data from a first application; saving source field data to a process repository; transforming and transferring data to a second application; saving target field metadata to a process repository until all metadata has been saved; saving the process; updating the second application network database, said update including: reading source application, target application, source fields, target fields, and if a first application is linked to a second application then updating an application link with a new set of data fields, calculating a ROI and calculating an application cohesion rank; classifying the first and second applications as one of producers, consumers, or orchestrators; and recalculating the ranks.

Another embodiment disclosed herein principally in FIGS. 8-12 takes the form of a computer system for displaying information including the steps of: for identifying one or more data relationships that exist between and utilized by one or more applications comprising a first processor for determining for each data relationship a respective rank based on specific data that associates the two or more user applications; a second processor for finding applications based on the degree a respective rank has to one or more user applications; a third processor for categorizing each relationship based on a criteria of the interaction; a fourth processor creating an application wall containing status updates and links to and from other applications related to the one of the one or more user applications; a fifth processor for constructing an automation map from the links between the one or more user applications and other applications.

As used in this disclosure, application software refers to all the computer software that causes a computer to perform useful tasks beyond the running of the computer itself. For purposes of the disclosure herein a specific instance of such software is called a software application, application or app (spelled APP). The term is used to contrast such software with system software, which manages and integrates a computer's capabilities but does not directly perform tasks that benefit the user. The system software serves the application, which in turn serves the user.

Figure 8A:
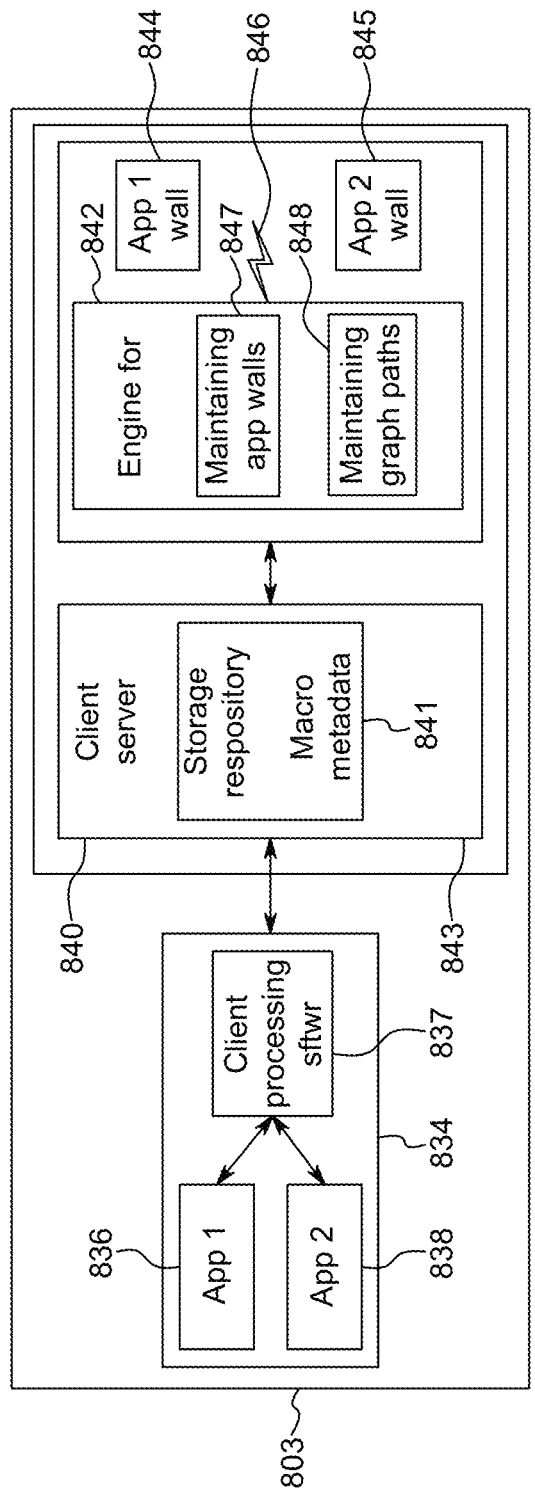
FIG. 8A shows a hardware system for creating and porting one or more portable software execution files in accordance with an embodiment of the present invention.

FIG. 8A represents a system 800 where a user at an origin can create software processes in one computer environment that can be ported to one or more remotely situated computers for obtaining a resource needed to accomplish a task such as by way of example and not limitation, the creation of substance in an accounting spreadsheet. System 800 includes at least one user computer 804 having at least one central processing unit (CPU) 819 which typically is the processor for an operating system and an application resident in memory 821 that contains display 815 and an input device 817 in addition to having the facility to access other computers, such as server 826. The server 826 has at least one central processing unit (CPU) 808 which typically is the processor for an operating system and an application resident in memory 820 that contains a database storage unit 807 and a means for communication 822. The system 800 may further include a plurality of remote computers (not shown) and further by way of example and not limitation, to a plurality of mobile personal data assistants, tablets and smartphones (not shown) that may access the server 826 and operate the processes disclosed herein.

The system 802 may be configured in many different ways. For example, server 826 may be a conventional standalone server computer or alternatively, the function of server may be distributed across multiple computing systems and architectures. Server 826 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to communications ports that serve as a communication link with other servers, client or user computers. A variety of communications protocols may be part of the system, including but not limited to: Ethernet, SAP, SAS.TM., ATP, Bluetooth, GSM and TCP/IP.

Figure 8B:
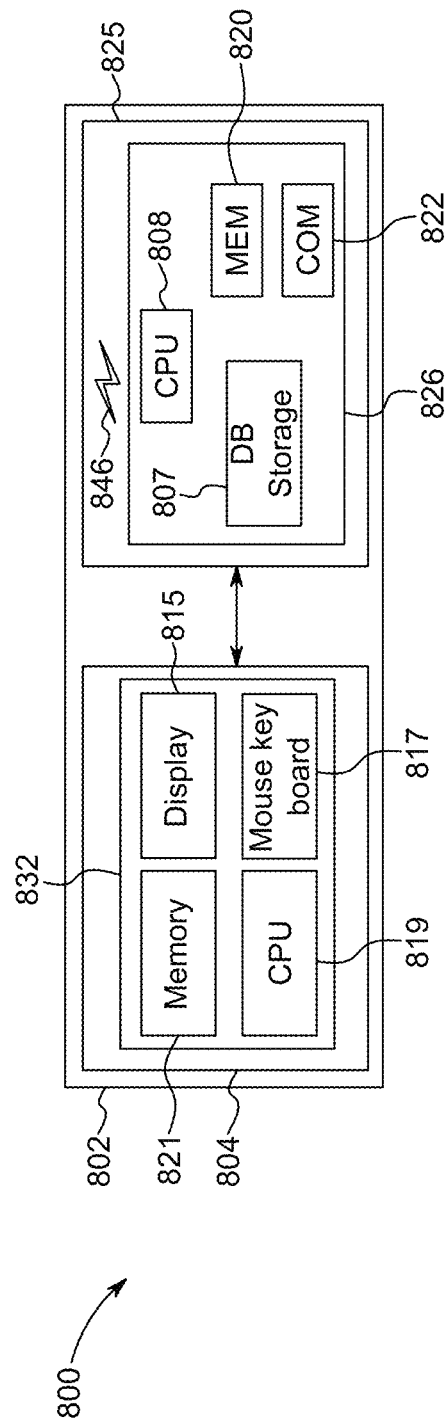
FIG. 8B shows a logical system for creating and porting one or more portable software execution files in accordance with an embodiment of the present invention.

Referring to FIG. 8A and FIG. 8B, a process 803 is executed by system 802. The disclosed invention enables users utilizing computer 804 to read and write data, manually and utilizing an automated process (to be further described below) into applications, such as APP 1 836 and APP 2 838 and onto APP wall 844 and APP wall 845. By way of further explanation, the functionality in logical unit 843 (840) is contained in server 825 and the functionality contained in logical unit 834 is contained in computer 804. The logical unit 834 can include APP 1 836, APP 2 838 and client processing software 837. Storage repository 841 resides in database (DB) storage 897. Logical unit 843 maintains 847 the APP 1 wall 844 and APP 2 wall 845 using an engine 842. APP walls are generally considered open to all users on a system. Engine 842 also creates and maintains a process 848 for creating and presenting automation maps which may be simple, consistent views of related APPs and the data, metadata, and the connections between them.

Data storage devices (not shown) within which systems, applications and communications programs as well as databases, such as database 807, may be stored on hard magnetic disk drives, optical storage units, CD-ROM drives, RAM or flash memories by way of example. Data storage devices (e.g., database storage 807) contain databases used in processing the tasks to be further described below and/or calculations in accordance with the present invention, including at least a command structure for application in the construction of macros or tasks as will also later be described in detail. In one embodiment, database software creates and manages these databases. Creation and porting of portable software (such as software to find applications, scrape data from those applications, insert the scraped data into APPs such as APP 1 836 or APP 2 838, and update APP 1 wall, 844 or APP wall, 845) and bring about related calculations and/or execute algorithms of the present invention are stored in storage device and executed by the CPU 804 in association with server 825. Controllers (not shown) reside in CPU 808 and CPU 819 that comprise processors (not shown), such as one or more conventional microprocessors and one or more supplementary co-processors such as math co-processors. In CPU 808 at least one such processor is in communication with a communication module 822 that transmits data over a port through which the communication module 822 communicates with other devices such as other servers, user terminals or devices and the Internet 846. The communication port may include multiple communication channels for simultaneous communication with, for example, other processors, servers or client terminals.

The data storage device 807 may store, for example, (i) a program (e.g., computer program code and/or a computer program product for creating, executing and porting the portable software, or maintain the APP 1, APP 2, APP 1 wall and APP 2 wall (see, FIG. 8A, FIG. 8B) to direct the processor in accordance with the present invention, and particularly in accordance with the processes described in detail hereinafter with regard to the creating, executing and porting the portable software to achieve the novelty of the invention; (ii) a database adapted to store information that may be utilized to store information required by the program for creating, executing and porting the portable software to achieve the novelty of the invention. The program for creating, executing and porting the portable software may be stored, for example, in a compressed, an uncompiled and/or an encrypted format, and may include computer program code. The instructions of the program included user generated macros that may include instructions to record and playback executable programs may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Figure 9A:
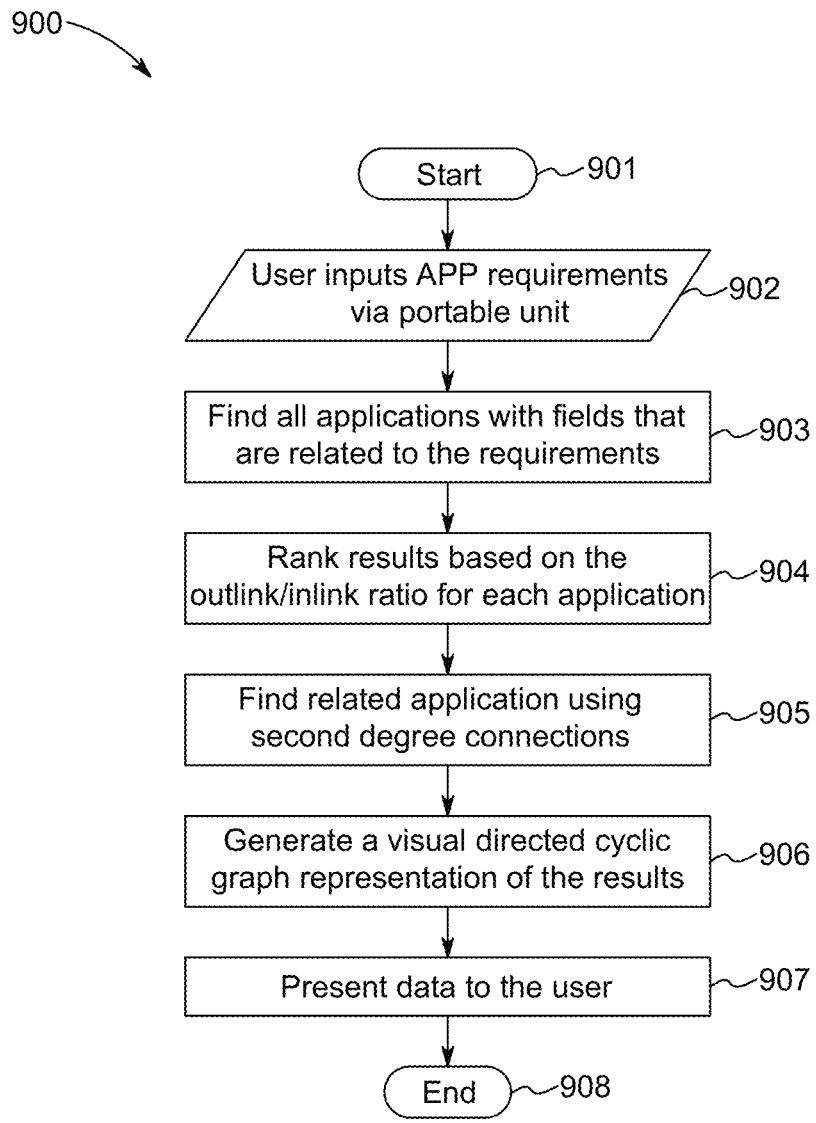
FIG. 9A, shows a flow diagram for the discovery of an application required from completing an application task in accordance with an embodiment of the present invention.
Figure 9B:
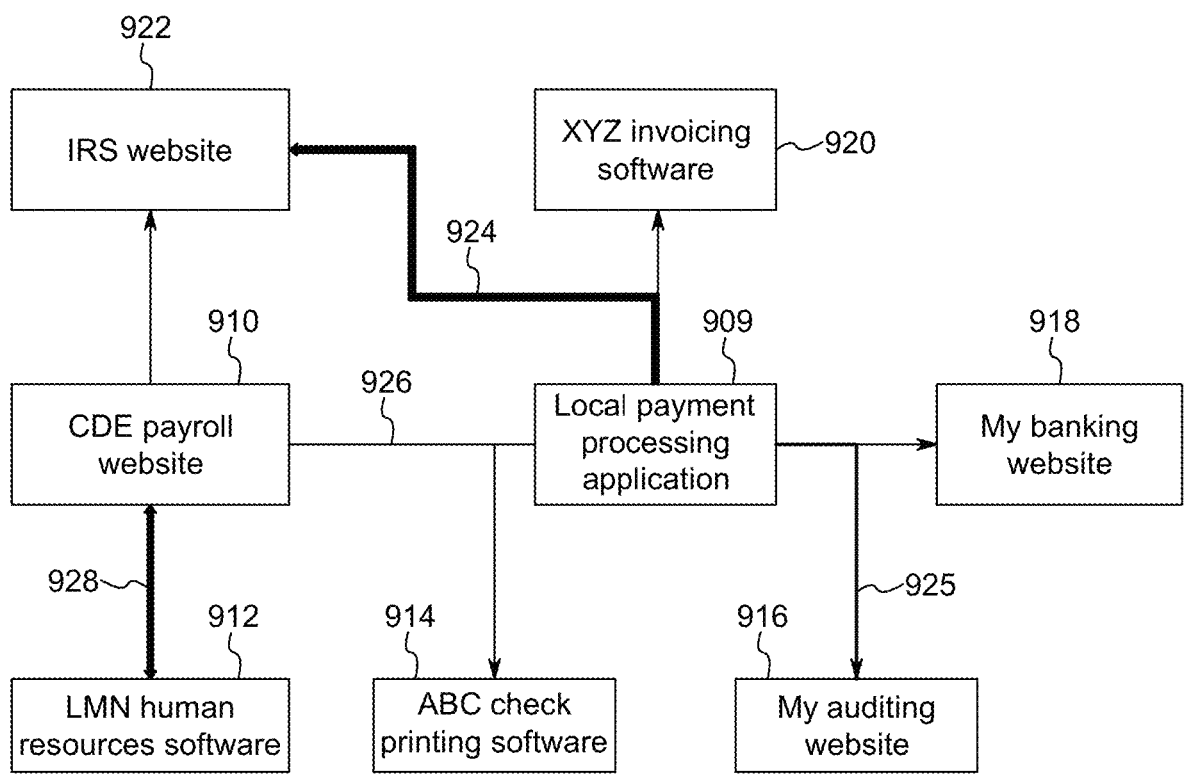
FIG. 9B illustrates a map of the connections made by the system in accordance with an embodiment of the present invention.

FIGS. 9A, 9B, and the system 800 (FIGS. 8A/8B) disclose one embodiment of the invention where a user may desire to identify one or more data relationships that exist between and utilized by one or more APPs or applications; determine for each data relationship required by an APP, a respective rank based on specific data that associates the two or more user applications (e.g., for a given data relationship, the rank may be based on how current by update time the data relationship is) find applications (either within the local computer 804, or more broadly the local system 800, and even within the domain of the Internet) based on the degree a respective rank has to one or more user applications.

With further reference to FIG. 9A, 9B, and by way of example, a user of the system 800 (FIGS. 8A/8B) may desire to create a process 900 instantiated as a task to be run at various times or repetitively on the local computer 804 to achieve the foregoing objects. In a browser viewed by the user in display 815, once started 901, process 900 will permit, as will be further described in connection with FIG. 9B through FIG. 12, the user to insert commands having single execution features or as part of a several line operation or one of several commands that may operate as part of a larger loop or nested loop that will have the effect of achieving an outcome such as searching the Internet for sites that have information needed, by way of example and not limitation, for populating a tax return or an accounting balance sheet, i.e., applications as represented schematically in FIG. 8 as APP 1, 836 and APP 2. 838. The creation of commands having single execution features or as part of a several line operation or one of several commands known as a portable unit that will facilitate the construction of the inventive features of the process 900 is disclosed above in connection with FIGS. 1-7.

An embodiment of the present invention is that the system 800, utilizing process 900, generates an automation map shown in FIG. 9B, from the links between the one or more user applications and other applications. In the example shown in FIG. 9B, a portable unit launched over the Internet has found several sites that will achieve the goal of retrieving information needed to accomplish the task represented as represented in FIG. 8 as APP 1, 836 and/or APP 2, 838. Based on the foregoing, one embodiment of the invention includes the creation of a portable unit that includes at least one new task file with tasks having commands and inputs relevant to the APP 1 and/or APP2 requirements 902. In the example illustrated in the flow chart, FIG. 9A, the portable unit contains an execution file that directs it to find 903 all applications with fields that are related to the requirements and to retrieve at the site so located the same requirements. It is anticipated that over time users may determine other examples related to the requirements. Upon finding the applications 903 the process 900 ranks 904 the results based on the outlink/inlink ratio. Inlink in this instance is the number of specified fields the application consumes. The outlink is the number of specified fields the application produces. An application is a more reliable source for the data fields than a user may be interested in if it is a net producer of those fields. This is one example of a ranking. The process 900 then finds 905 related application using second degree connections. For example, 912 is a second degree for application 922. This metric highlights the fact that there are multiple steps or APPs between the current application and the source application. This could mean changing the connection map by changing the steps to either passing along the required fields or making a direct connection from 922 to 912. In step 906, process 900 generates the automation map illustrated in FIG. 9B and presents the results 907 in display 815. After the results are presented 907, the process 900 can end 908. By way of example, the automation map FIG. 9B, has a series of connecting lines that emanate from a local Payment Processing Application 909 resident on computer 804 (FIG. 8A) and touch each application found for example to have relevance to achieving the task of completing the requirements for APP 1. The thickness of the lines, such as seen in reference lines, 924, 925, and 926 signify the number of fields involved in the data that is being returned, as for example My Automation Website 916, My Banking Website 918, XYZ Invoice Software 920, and ABC Check Printing Software 914. The number of fields reflects the impedance mismatch between the two applications used in this example. The more fields needed to be transferred, the larger the communication/integration or automation gap. The IRS Website line 924 is thicker than the other lines depicted in the automation map indicating that the information found at IRS Website 922 contains a greater number of fields of information, and therefore, more information than the other sites. The hashed line 928 (although any color or other denotation may be used) between site 910 and 912 indicates a qualitative measure of the time saved in the automated process versus acquiring the data offered by this connection though manual means.

Having found the applications and or application/sites using process 900 (FIG. 9A), an embodiment of the invention herein carries out a recording process 1000*a* to capture and record events. The process start 1020 initiates the launch 1022 of the recorder APP, where a user is queried to enter process information 1024. The user initiates the start of the process 1026 upon entering the information, whereby the process 1000 attaches system event listeners (e.g., these are subroutines running in the background to capture key strokes, mouse events, etc.) and captures user generated events 1028. In step 1030 the process 1000 captures process context, until the user indicates the process end 1032. A this point the process 1000*a* causes the system 800 to compute an automation map 1034. Process 1000*a* then saves 1036 the automation map to a database and ends 1038 the capture event process. Process 1000*a* Step 1034 also proceeds to execute step 1040 to identify data source events (e.g., application used to execute a "cut" operation in word processor to extract a portion of a document) and step 1042 identify data input events (e.g., the actual paste event in a word processor document). Based on the information acquired in steps 1040 and 1042 the process 1000*a* classifies the APP as intermediate, producer or consumer. For example, an intermediate APP might be a spreadsheet application such as Microsoft Excel that plays no essential or critical role in performing the process or the task. In step 348 process 1000 tests if intermediate APPs are present and if so then it removes 1050 the intermediate APPs and links the producer directly to the consumer. If and when no intermediate APPs are present, then the processor builds or updates the automation map 1052. The process 1000 in step 1054 pre-calculates edge weights (e.g., field count, amount of data flowing, location events) and computes APP cohesion index for all APP pairs 1056 before ending the process 1058.

Figure 10A:
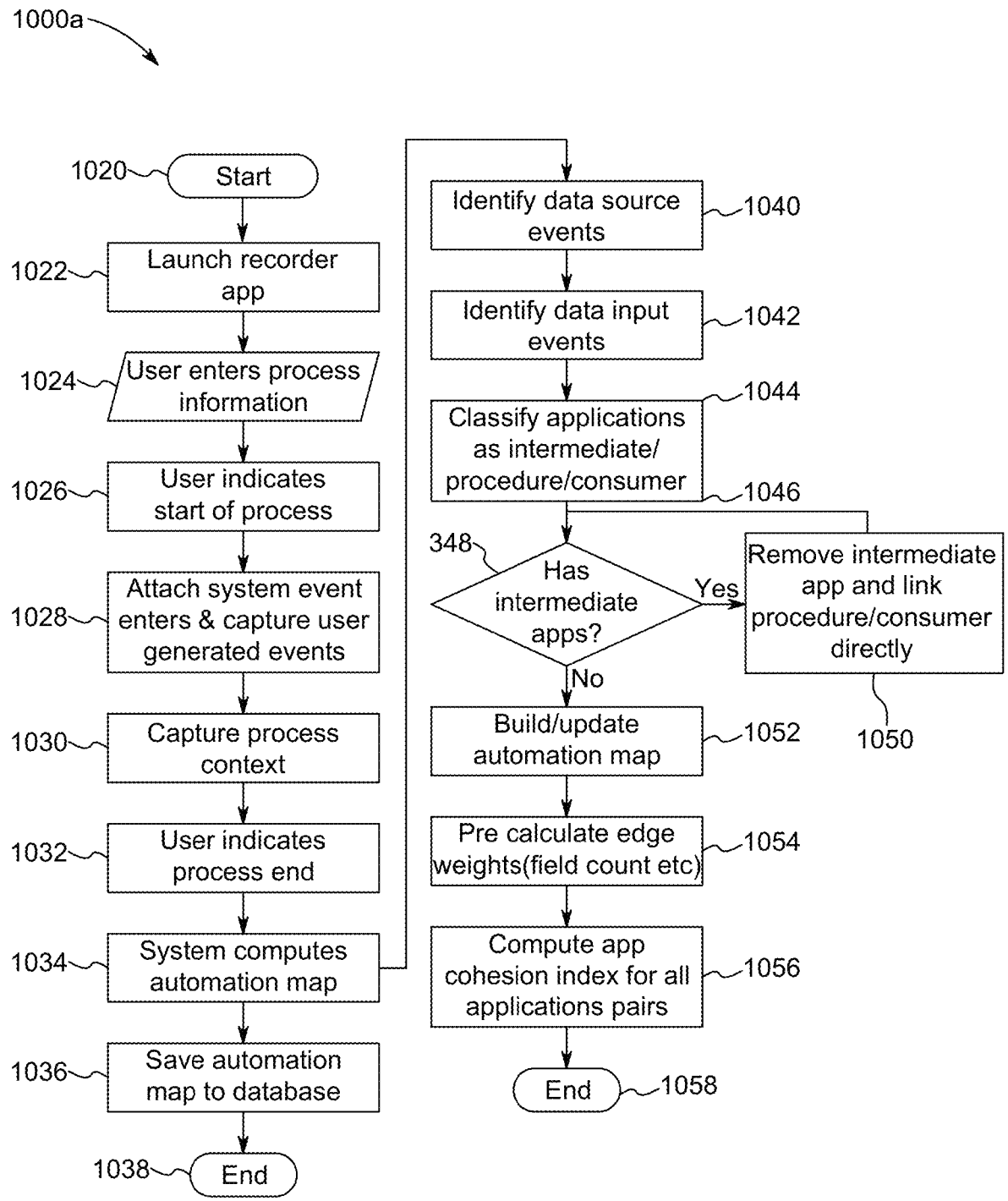
FIG. 10A shows a flow diagram of the recording of an execution files in accordance with an embodiment of the present invention.
Figure 10B:
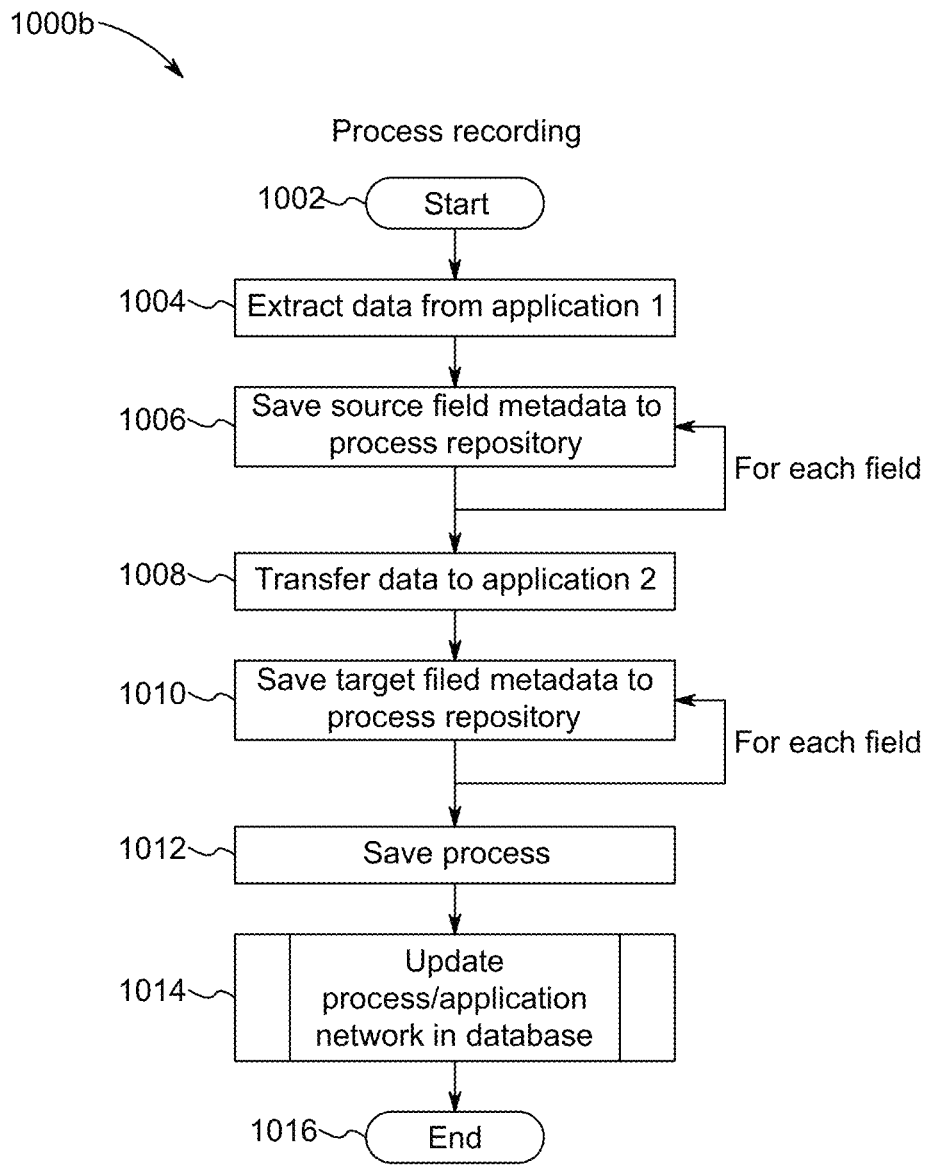
FIG. 10B shows a flow diagram of the recording of an execution files in accordance with an embodiment of the present invention.

A portion of an embodiment of the invention shown in FIG. 10B, process 1000b can start 1002 and then expands in steps 1004, 1006, 1008 and 1010, the operation that takes place in step 1028 (FIG. 10A). Similarly, FIG. 10B, steps 1012 through 1014 expand on FIG. 10A steps 1034, 1036. Finally, FIG. 10B, steps 1012 through 1014 embody the steps 1040, 1042, 1044, 1046, 348, 1050, 1052, 1054, and 1056. By way of further explanation assume that APP 1, 836 contains information required by APP 2, 838, then step 1004 extracts data from APP 1, and in step 1006, process 1000b saves the source field metadata to a process storage repository 841, located in server 843 (FIG. 8B). The step 1006 is repeated until all the data from APP1 relevant to APP 2 is saved in the repository. In step 1008 the process 1000b transfers the metadata stored in the repository 841 and transforms it so as it is in the proper form and format to be used by APP 2. In step 1010, the process saves the target field metadata to the process repository 841. The step 1010 is repeated until all the data relevant to target field metadata is saved in the repository 841.

In step 1014 the process 1000 saves 1012 the process executed in steps 1004, 1006, 1008, and 1010 to have available for future use. In step 1014, the process 1000b updates the process/application network database and either creates an APP wall (844, 845) or updates the APP wall (844, 845) for the user and other users to resource. The process essentially updates status and updates or creates links to and from other applications related to the one of the one or more user applications to reflect the changes made in the execution of steps 1004, 1006, 1008, and 1010. The process 100b ends 1016 after step 1014.

Figure 11:
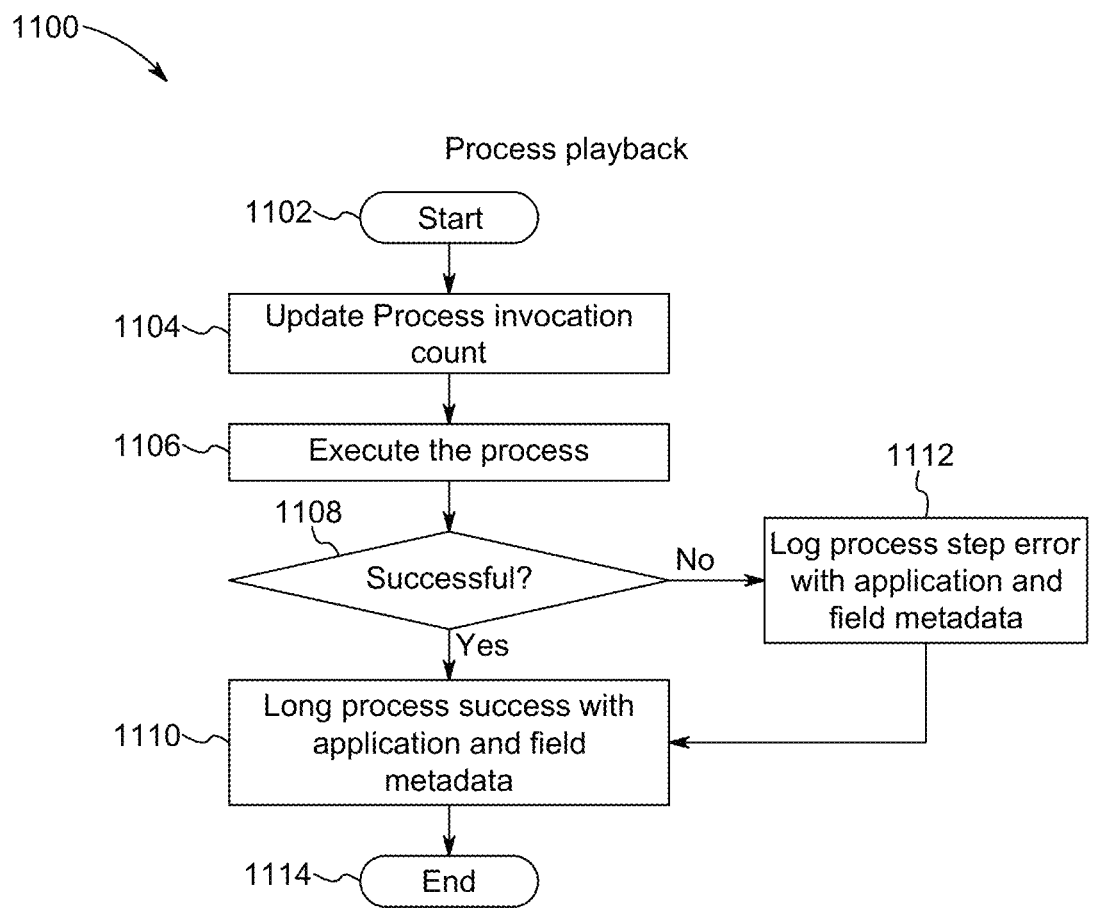
FIG. 11 shows a diagram for the playback of an execution file in accordance with an embodiment of the present invention.

Having stored the relevant metadata and target field metadata the applications, we turn to FIG. 11, an embodiment of the invention herein that carries out process 1100, which has the ability to playback the process stored in during process 1000a and process 1000b. After process start 1102, in step 1104, process 1100 updates the invocation count, 1104. The invocation count is used during visualization and analytics to optimize the user interaction (e.g., the higher the count, more it signals that the step should be automated at an API level to make it seamless to the end user. In step 1106, process 1100 executes the process (such as the process stored in during processes 1000a and 1000b). Having executed the process, the process 1100 tests 1108 if the execution was successful, and if not proceeds to step 1112, where it logs the process step containing the error with the application and field metadata and ends 1114 process 1100. If the execution in step 1106 was successful, then in step 1110, the log process indicates a success with the application and field metadata.

Figure 12:
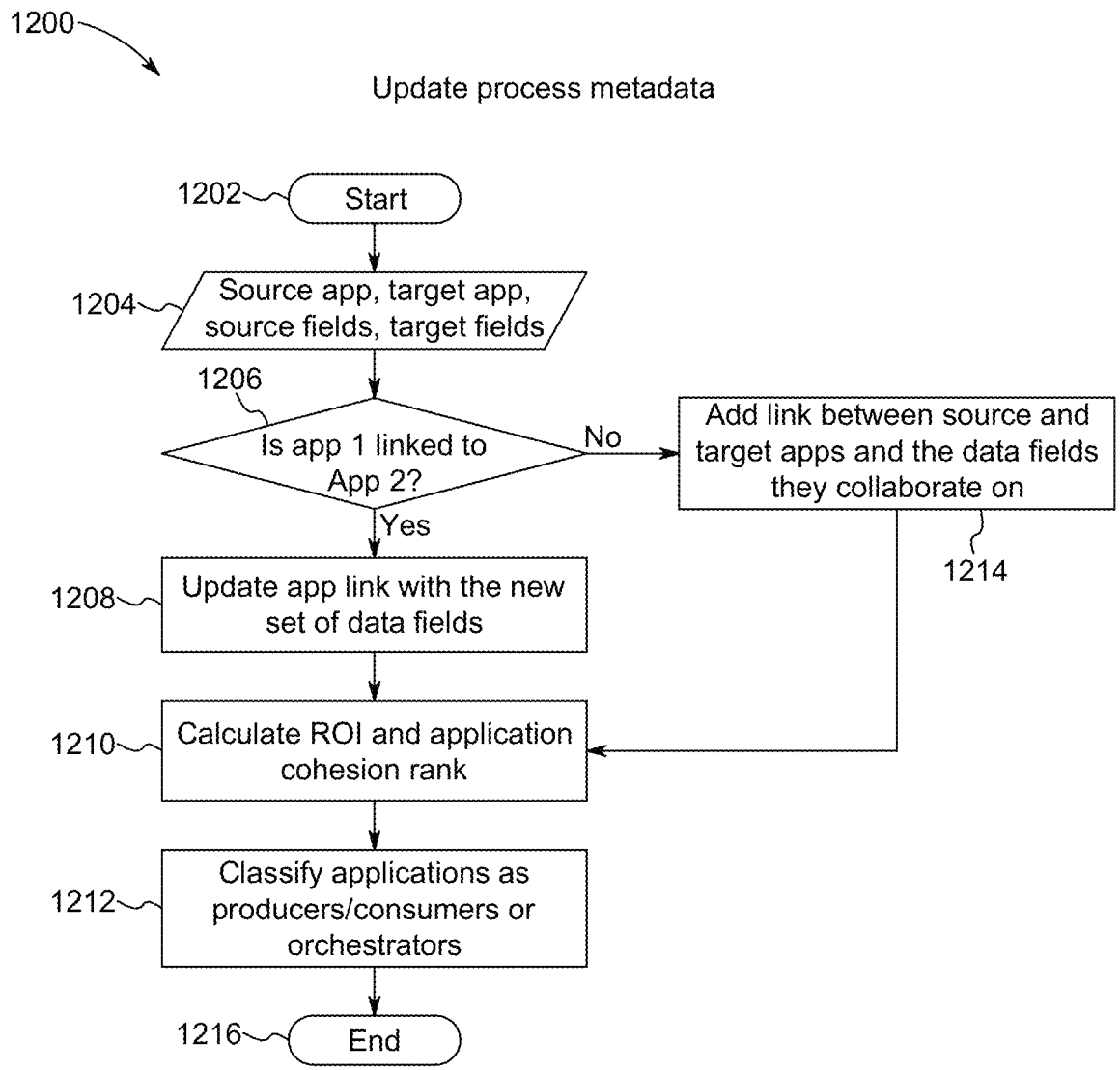
FIG. 12 shows a flow chart for the updating of the process metadata used by the executable execution files in accordance with an embodiment of the present invention.

FIG. 12 is an embodiment of the invention where the system 800 updates the metadata collection process starting 1202 with a process 1200 that retrieves 1204 the source application, the target application and the source application field data and the target field data. In step 1206, the process 1200 determines if by way of example and not limitation, APP 1, 836 (FIG. 8B) is linked to APP 2, 838 (FIG. 8B). If it is determined it is not, then step 1214 adds a link between the source and the target APPS (e.g., APP 1 and APP 2) as well as to the data fields they the two related APPS collaborate on, and proceeds to step 1210. If the APP 1 is linked to APP 2, then step 1208 updates the APP link with the new set of data fields.

In one embodiment the process 1200 categorizes each relationship based on a criterion of the interaction. To this end, in step 1210, process 1200 calculates an ROI (Return On Investment.) The ROI is an index of how much value (generally denominated in a currency) is saved or could be saved by eliminating or optimizing a process step. The system can predict and provide historical values to make task automation suggestions. An application cohesion rank is a computed numeric value, whereby given two applications the system computes: (sum of fields directly or indirectly sourced from each other) times (the weighted distance between them). One application of this is the APP pairs with higher cohesion index are candidates for process optimization. In step 1212 process 1200 classifies applications as producers, consumers and orchestrators. After step 1212, process 1200 can end 1216.

Figure 13:
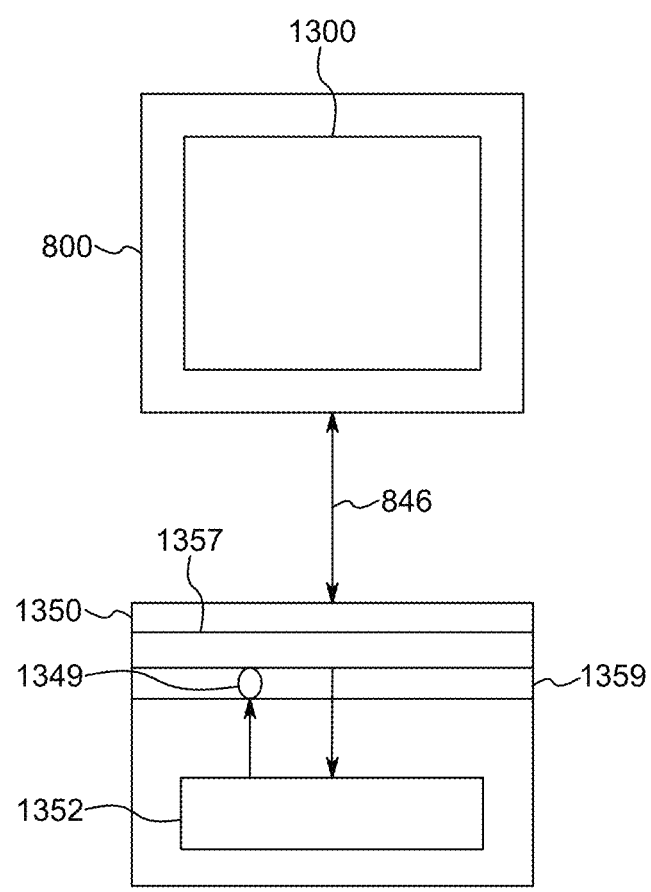
FIG. 13 shows a service provider computer system and a remote computer-to-be-updated system, in accordance with an embodiment of the present invention.
Figure 14:
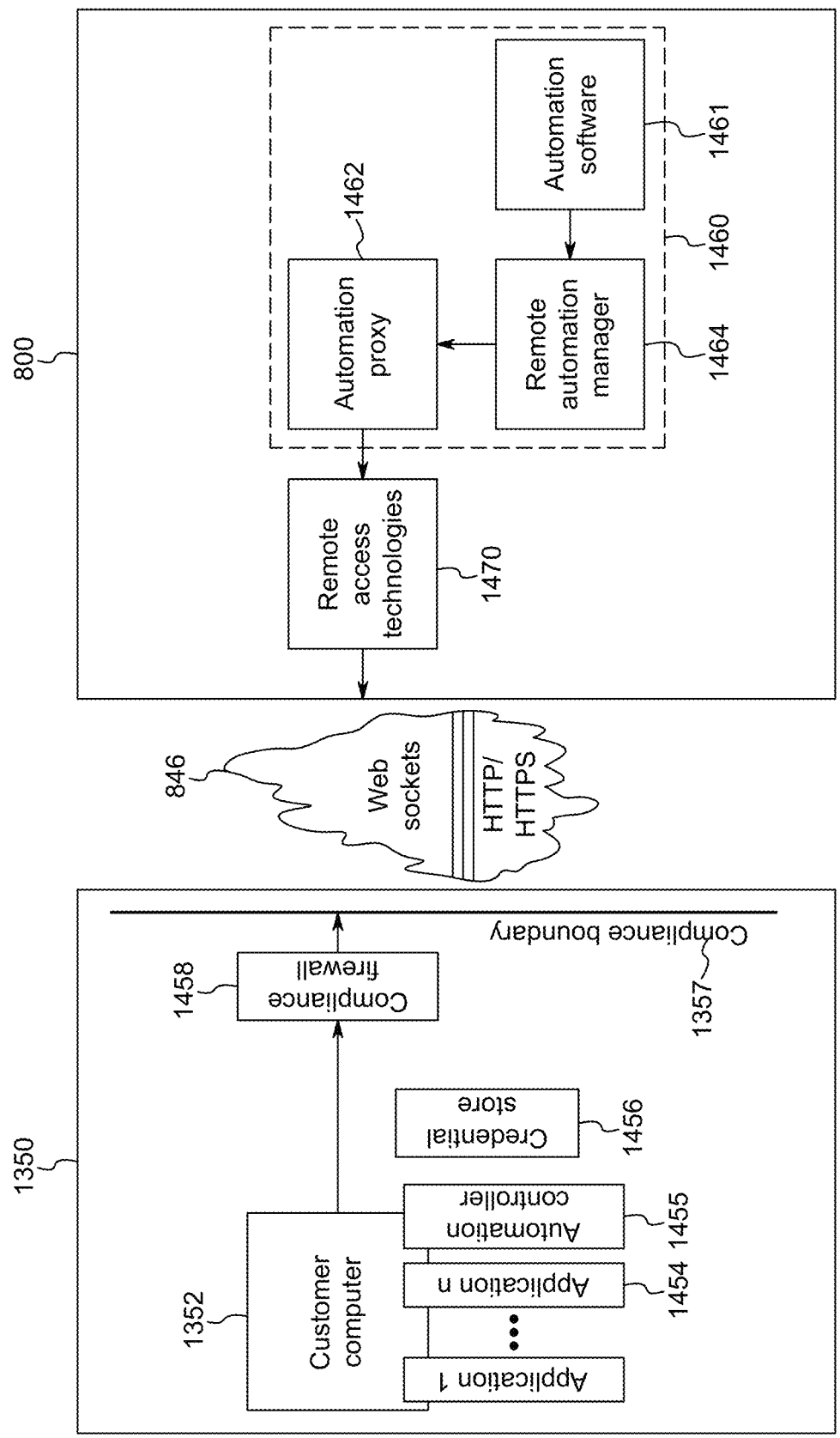
FIG. 14 shows a system that for a service provider computer to perform automation updates remotely on a customer computer, in accordance with an embodiment of the present invention.
Figure 15:
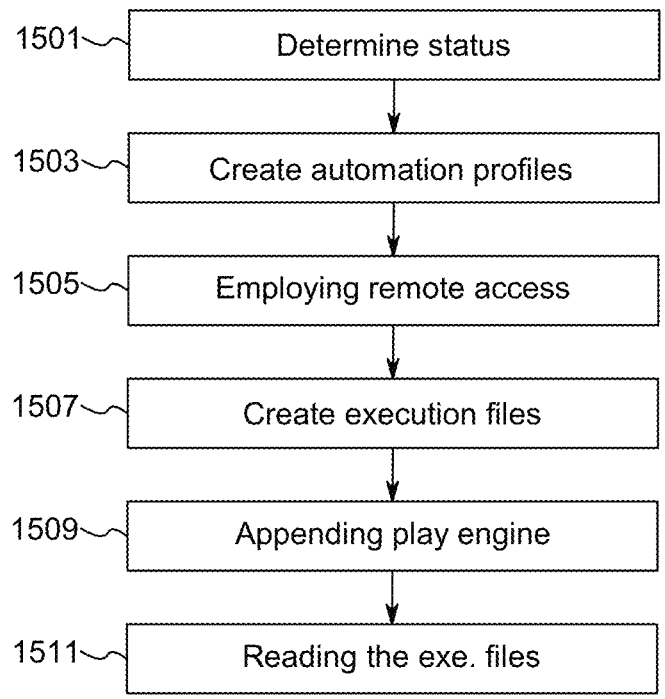
FIG. 15 shows a process that allows a service provider to perform automation updates on customer machines remotely, in accordance with an embodiment of the present invention.

Further disclosed herein principally in connection with FIGS. 13-15 is an embodiment of a computer method for creating software on a first computer to be executed on one or more remote computers including the steps of: A. (1) employing in the first computer remote access technology to access and update software on one or more remote computers; (2) determining a status of the one or more remote computers; (3) utilizing the status to create one or more automation profiles for execution in one or more remote computers; B. negotiating between the first computer and the one or more remote computers, a highest level protocol for the one or more remote computer compliance boundaries required to access an automation controller in the one or more remote computers; C. (1) creating in the first computer a set of execution files having one or more nested tasks for deployment; (2) appending a light weight play engine to the execution files; (3) delivering the executable files to the one or more remote computer automation controllers using a remote access technology; D. (1) executing in the one or more remote computers the light weight play engine having appended execution files; (2) reading the execution task files; and (3) updating the one or more remote computers.

Another embodiment disclosed herein principally in connection with FIGS. 13-15 takes the form of a computer method for creating a portable unit on a first computer to be executed on one or more remote computers including the steps of (a) performing automation updates on one or more remote computers, while adhering to one or more remote computers compliance requirements; and (b) enabling the one or more remote computers to define compliance boundaries using a rules-based compliance firewall; and (c) enabling the first computer, subject to the compliance boundaries, to create one or more adapters that enable automated applications to be executed on the one or more remote computers; and (d) incorporating the one or more adapters into the communication protocols of the first computer and the one or more remote computers such that the automation updates to take effect optionally at the initiation of the first computer or the one or more remote computers.

Another embodiment disclosed herein principally in connection with FIGS. 13-15 takes the form of a non-transitory computer-readable medium having stored thereon computer-readable instructions for enabling new and updated applications including the steps of: (a) enabling a service provider computer to perform automation on a remote customer computer, while adhering to remote customer computer compliance requirements by (b) enabling the remote computer (1) to define a compliance boundary that allows a service provider computer access to the remote customer; and (2) to execute an automated application, subject to the compliance boundaries, such that the remote computer receives new applications and updates other applications.

Disclosed herein is software, which manages and integrates a computer's capabilities, such as the generation of adapters to enable application automation by exposing operations that can be automated, in the form of an API that can be leveraged by various automation engines including Automation Anywhere (found at www.automationanywhere.com). A benefit of such operations is to assist in automatically upgrading older version applications to newer versions, which in turn serves the user or customer. The creation of commands having single execution features or as part of a several line operation or one of several commands that serves as an application is disclosed above in connection with the description accompanying FIGS. 1-7. The description below deals more specifically with a process for executing applications in a service provider environment required to update applications in a remote computer, generally referred to as a computer-to-be-updated, or a customer computer or environment, while adhering to the customer's compliance boundary requirements.

The tasks in the service provider environment have one or more of a series of tasks having commands, and other instructions having variables, executable by the computer-to-be-updated's application. In one embodiment, the service provider computer assembles tasks into execution files, which may require validating the tasks and organizing nested tasks, including collecting nested task information for each task, and accounting for all dependencies to ensure that files, tasks, and environments for running on one or more computer-to-be-updated computers are present. At least one or more dependencies will, subject to a computer-to-be-updated set of compliance boundary parameters, enable a service provider to create specific adapters that enable an automated application to be executed, when the adapters are incorporated into the computer-to-be-updated.

The creation of an execution file may include reading the task file, scanning for event dependencies and embedding files and links needed for the remote execution of the execution file, storing the dependencies in a dependency file, scanning for security, such as ensuring the customer's compliance boundary parameters are present and functional, and verifying the task file for proper formatting. In the inventive process, the service provider must have access via a remote access technology, to deliver the elements of code, while respecting the compliance parameters, required for upgrading the computer-to-be-updated system. Reference in connection with the below description is made to FIG. 8B which represents a service provider computer system (800) as described below.

The service provider in fulfilling its provision of services, in accordance with an embodiment disclosed herein, seeks automatically, i.e., with little or no human intervention, to create an application to update a computer-to-be-updated such that it performs reliably.

Turning to FIG. 13 and FIG. 14 a remote access technology 1470, represents any technology that allows a computer to remotely access another computer's screen, applications, data and configuration, and resides within the service provider's computer system 800. For example a remote desktop technology 1470, such a Cytrix or a Microsoft Remote Desktop product, two of many technology products that are well known to those of ordinary skill in the art of systems maintenance, which will connect to a remote computer, such as the computer-to-be-updated, for example computer system 1350, to establish a communication link between the computer system 1350 and the computer system 800, to permit apps, files, and network resources to be made available from computer system 800 to computer system 1350.

Turning to FIG. 14, a compliance automation technology resides in block 1460. Automation software 1461 and a remote automation manager 1464 in conjunction with an automation proxy 1462, utilize the remote desktop technology 1470, to deploy a set of executable modules 1300 (FIG. 13 also referred throughout as (a) execution files or (b) automation application(s), that when installed on computer system 1350 are used (1) to determine the status of the computer system 1350 as relates to processing power, current processing load, application footprint, application characteristics and application performance, as are available in one or more applications 1454, (2) to locate one or more application controls (FIG. 14, 1455); to track changes between an older and a newer version of an application 1454; (4) to change in the remote computer system 1350, among other things way of example: (a) adding of one or more new data fields, (b) removing of one or more data fields; (c) changing (i) a data field type, (ii) a field layout; (iii) an underlying technology framework of the application; and (5) to store the changes, and (5) to incorporate the changes so as to upgrade the computer-to-be-updated applications, and (6) to update generally the remote computer 1350.

Automation proxy 1462 negotiates the most high-level protocol, including security protocols, for each remote customer computer 1350, where automation is desired. An automation controller 1455 resident on computer system processor 1352, under the control of the automation proxy 1462, configures the customer computer 1350, so as to appear as a local machine relative to the automation software 1461. To achieve this operation, automation software 1461 sends all automation commands and queries to the remote automation controller 1455, utilizing the automation proxy 1462, while respecting the security compliance protocols of computer system 1350. To achieve the objects of the invention the automation software 1461 creates adapters that enable particular automated applications to be executed; and incorporates the adapters into the customer/service provider communication/security system to permit the remote application to take effect in the computer system 1350 via the automation controller 1455.

A compliance boundary 1357 represents a logical boundary, across which, any transfer of data or other information is controlled by agreements between parties. As such, one important distinction between commercially available remote desktop technology, generally, and remote desktop technology 1470, particularly is that the remote desktop technology 1470 is disabled from performing certain tasks on computer system 1350, by way of example and not limitation, copying files, loading cookies, or transmitting data from computer system 1350, through or beyond a compliance boundary 1357 onto the Internet connection 846 or any other output device that would violate the security protocols established by the computer system 1350.

A compliance firewall 1458 is located within the computer system 1350 and represents software, which connects one or more remote automation controllers 1455 and proxies to one another. The main function of the firewall 1458 adds to the compliance boundary 1357 security, utilizing a filter object function 1359, for filtering out data and logical activities that are impermissible based upon a customer regime, established within computer system 1350. Data 1349 from the computer system processor 1352 can be provided to the filter object function 1359. The firewall 1458 is also capable of masking sensitive data and transforming data where needed. Requests from the automation software 1461 to access computer system 1350 are determined on the basis of credentials, i.e., the conditions of credential store 1456, which must be satisfied before any action can be successfully performed on the customer system 1350. The credential store 1456 contains usernames, passwords and other secure data needed to be protected or hidden from service providers. It ensures secure data storage and retrieval services to authorized software. It also manages logical naming to credential mapping, so that the credentials are known to service providers only via a logical name.

It is not desirable, nor efficient to have the credentials known to the service providers, such as the operators of computer system 800. The automation tasks to be performed refer to the credentials using a logical name and the firewall, which then interact with the credential store to auto fill the required secure fields by reverse mapping the name to the actual credentials.

FIG. 15 represents a non-limiting embodiment of the invention for carrying out a process for creating an execution file for automating updating software on computer system 800, to be executed on one or more remote computers, such as a computer-to-be-updated such as computer system 1350. During the initial communication exchange and after any subsequent exchange, computer system 800 is permitted only to determine the status of computer system 1350. The status may include by way of example, processing power, current processing load, application footprint, application characteristics, application performance, and application software and system software revision dates. As such remote computer system 1350 may query computer 800 for responses, requiring discrete replies, such as "Yes" or "No."

Turning to FIG. 15, in step 1501, a process for updating a remote computer includes determining the status of the one or more remote computers, such as computer system 1350, as the system relates to processing power, current processing load, application footprint, application characteristics and application performance. Step 1503 includes creating, by computer system 800 automation profiles from the status, to be used in a set of modules executable in one or more remote computer systems(s) 1350. Step 1505 includes employing by the computer system 100, remote access technology 1470 in order to utilize the services of an automation proxy 1462, to access and automate one or more remote computers 1350, having a compliance boundary 1357 and associated compliance firewalls 1458, based on supported protocols, by negotiating the highest level protocol for the one or more remote computers 1350, in order to pass through the one or more remote computers compliance boundary 1357 and firewall 1458, to access an automation controller 1455. Step 1507 includes creating by computer system 800 a set of execution files 1300, having one or more nested tasks for deployment, said tasks having command line arguments executable as variables by the remote computer 1350, assembled into a single execution file, and storing the variables in an array of memory, with respective values. Step 1509 includes appending by the first computer system 800 a light weight play engine to the execution file 1300, to deliver an automation executable set of modules, to the one or more remote computer 1350 automation controllers 1455, in order to configure the one or more remote computers 1350, so it functions as a local machine relative to the automation proxy 1462. Step 1511 includes reading by the one or more remote computers 1350 the execution task file 1300 having the one or more of nested tasks, wherein the reading includes: initializing the execution file 1300, by optionally making a local copy of the execution file; scanning the execution file 1300 to determine if it meets the security compliance in place for the remote computer 1350, wherein the scanning includes: checking the nested task for task calls to other tasks and backward compatibility; and ascertaining existence of the play engine; creating a new instance of the execution file 1300, and updating the one or more remote computers 1350.

Further disclosed herein principally in connection with FIGS. 16-18C is an embodiment that takes the form of a computerized method operable in a computer system to enable updating applications for a computer-to-be-updated based on artificial intelligence methods including: a) Determining system automation profiles by relating system processing power, current processing load, application footprint, application characteristics and application performance; b) Constructing artificial intelligence based learning mechanisms to derive key automation criteria; c) Combining artificial intelligence (AI) based learning on local system with broader learning from multiple similar systems to provide recommendations on automation criteria such as optimal automation speed, best automation technique, and recommendations for optimal delays; d) Storing and updating of the automation criteria over the entire period of time during which automation is performed on a system; and e) Creating portable automation criteria libraries (correlated to a system with a specific automation profile) that can be instantly leveraged on new systems with comparable automation profiles thus providing near-perfect and reliable automation out-of-the-box.

One embodiment disclosed principally in connection with FIGS. 16-18C relates to a computerized method for automatically updating a computer application based on artificial intelligence methods including: (a) collecting automation information related to a current application; (b) locating application controls; (c) scanning the computer application to extract data on processing power, load, footprint, and performance attributes; (d) using the data in an automation profile generator for determining a system automation profile; (e) using an artificial intelligence based modeler for analyzing input and output data; (f) and applying the data to an artificial intelligence model for training and predicting performance, and wherein if the training and predicting function is not satisfied during test, the artificial intelligence model is adjusted and the process of creating a satisfactory performance model is repeated, until the training and predicting function is satisfied; (g) then merging the artificial intelligence model within a cloud based database, adjusting the artificial intelligence model to achieve an updated automation criteria with optimal values, wherein the optimal values provide input to an automation criteria library for storing and updating a prior automation criteria; (h) and exporting the upgraded automation criteria values for incorporation in an application on a customer computer, to achieve a reliable automation.

Another embodiment disclosed principally in connection with FIGS. 16-18C relates to a non-transitory computer-readable medium having stored thereon computer-readable instructions for scanning one of a computer application or system software for processing power and load; for creating an application footprint, which includes performance attributes; using performance attribute data for determining a system automation profile, which analyzes input/output data and applies the data to an AI model, which includes a training and predicting performance function, and if the train and performance function is not satisfied during a test, adjusting the AI model, and repeating the process of creating a satisfactory performance model, until achieving a satisfactory test outcome; storing the optimal values and updating the prior automation criteria values; exporting the automation criteria library and applying the library to a system for reliable automation.

Figure 16:
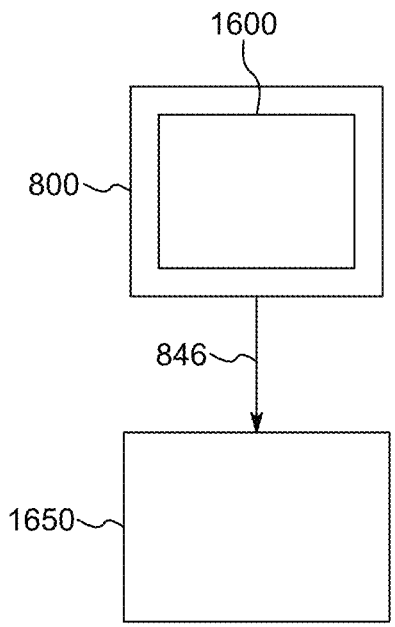
FIG. 16 shows a system for a service provider computer system and a computer-to-be-updated computer in accordance with an embodiment of the present invention.

Another embodiment disclosed principally in connection with FIGS. 16-18C relates to a computer system for updated applications on a remote computer including: (a) an automation profile generator for determining a computer-to-be-updated computer automation profile as an aggregate function of the data provided by the system's application inspector; (b) an artificial intelligence based modeler for applying artificial intelligence mechanisms and techniques to determine optimal automation criteria based on the system automation profile; (c) a recommendation engine for merging one or more artificial intelligence based modeler results, for performing an aggregate analysis, for adjusting an automation criteria to optimize values; (d) an automation criteria library for storage, update and retrieval; (e) a learning and mechanism for updating the automation criteria over the time during which automation is performed on the computer-to-be-updated; (f) a library porting mechanism for exporting the automation criteria library. One object of the embodiments disclosed below is to assist in automatically upgrading older version applications to newer versions, which in turn serves the user or customer. FIG. 8B as described above includes a system 800 that incorporates a set of modules (FIG. 17, 1700), which operate a novel process 1800 (See, FIGS. 18A, 18B, 18C), in order to update a computer-to-be-updated application operating in a customer computer environment (FIG. 16, 1650).

More specifically, the service provider computer 800 and the customer computer-to-be-updated 1650 (FIG. 16) typically operate under a remote desktop server protocol. FIG. 7 represents a non-limiting embodiment of a system 1700 that includes functional modules that perform in accordance with the definitions to follow, and apply the inventive process embodied in FIGS. 18A, 18B and 18C. In one embodiment of the invention, the service provider in fulfilling its provision of services, in accordance with the embodiment of the invention, seeks automatically. i.e., with little or no human intervention, to create an application to update a computer-to-be-updated (FIG. 16, 1650) such that it performs reliably.

In determining a customer's computer system's (FIG. 16, 1650) automation profiles, a set of executable modules 1600 (see, FIG. 16 reside in the system 800 computer 832 for determining the status of the computer 1650 as that status relates to processing power, current processing load, application footprint, application characteristics and application performance. All the foregoing have processing inputs and outputs, which will more fully explained in connection with a process 1800, below. In addition, the various executable modules 1700 are provided with overall system/task performance parameters and metrics required to carry out the intents of the invention. Further, the modules 1700 afford machine learning mechanisms or techniques to be used to build models that predict overall system/task performance for varying levels of the processing inputs. The system then adjusts task buffer times etc., to optimize the automation success (i.e. successful task runs) for various system automation profiles.

The construction of learning mechanisms is key to the derivation of automation criteria. By way of example and not limitation such constructions may include one or more of mechanisms and techniques that include: supervised and unsupervised learning, regression analysis and methods, Bayesian statistical models and clustering algorithms. Many of these techniques are well-known by those of ordinary skill in the art of programming and artificial intelligence.

The system shown in FIG. 8A, may combine artificial intelligence-based learning functions on its internal learning mechanisms (computer 832), while accepting inputs having with broader learning capabilities from one or more external systems. In some instances, the latter inputs provide recommendations on automation criteria, such as optimal automation speed, best automation technique, and recommendations for optimal delays. These system 800 inputs and automation outputs from the multiple systems are further stored in one or more databases, such as by way of example, data storage device 807.

Figure 17:
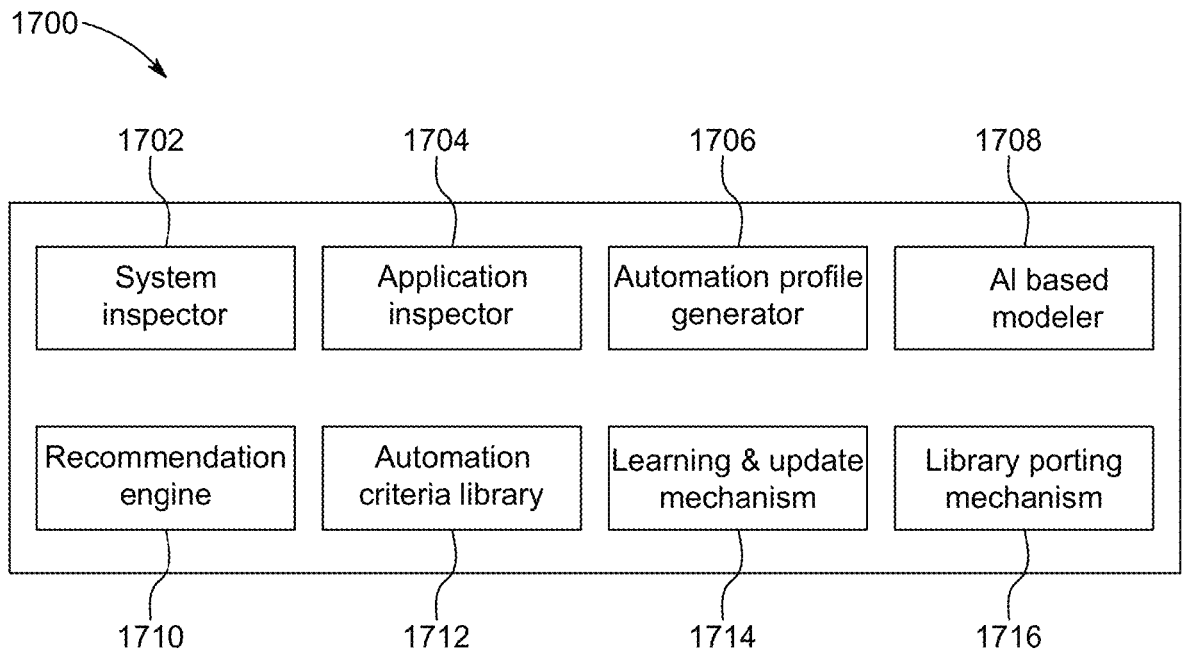
FIG. 17 shows a set of modules for an application automation process in accordance with an embodiment of the present invention.

Turning to FIG. 17, more particularly, a system inspector module 1702 performs an analysis of the computer-to-be-updated 1650 system and obtains information about its processing power, processing load and other information related to its performance, scalability and speed. An application inspector module 1704 performs a deep analysis of the application that it is pointed at on computer-to-be-updated computer 1650 and obtains information on underlying application framework, object metadata and properties, object type and associated actions, UI layout and application response times. It also gets information about application performance and latency. This information is critical to automating the application resident on the customer computer 1650.

An automation profile generator 1706 determines the computer-to-be-updated 1650 automation profile as an aggregate function of the data provided by the system 800 and Application Inspectors. An AI based modeler 1708 applies artificial intelligence mechanisms and techniques, as referred to above, to determine optimal automation criteria based on the system 800 automation profile. Automation criteria can be directly used to build reliable automation tasks for the system. A recommendation engine 1710 merges one or more local AI based modeler results, performs aggregate analysis and adjusts automation criteria to optimize values that can be default recommended automation criteria for systems with similar automation criteria. An automation criteria library 1712 can be stored in an automation criteria library for storage, update and retrieval.

A learning and update mechanism 1714 updates the automation criteria over the entire period of time during which automation is performed on a customer computer 1650. A library porting mechanism library porting mechanism 1716 provides a means for exporting an automation criteria library for application to any new system, e.g., a customer computer 1650, to ensure reliable automation on that system in an instant manner.

One non-limiting embodiment includes a process 1800 (FIG. 18A), including a system and application inspector 1836, which includes, scanning 1802 a computer application or system software in a computer-to-be-updated 1650, for processing power and load. The scanning operation 1802 output provides input for scanning an application footprint 1804, which includes performance attributes. This data is then used in an automation profile generator 1835, in determining a system automation profile 1806.

Figure 18A:
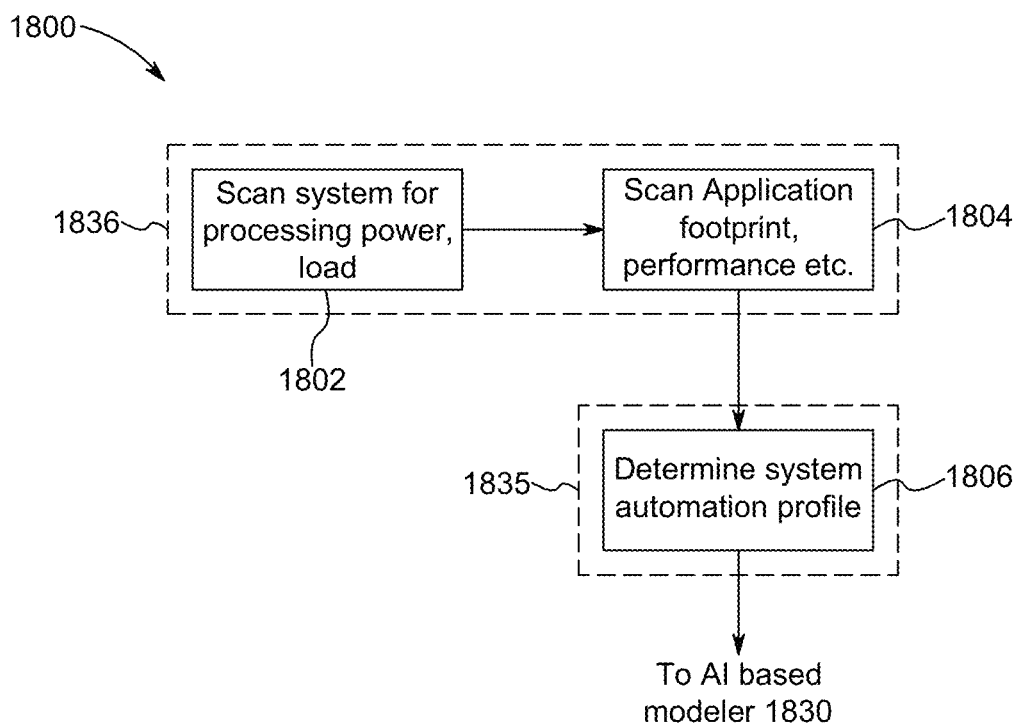
FIG. 18A shows an automation process in accordance with an embodiment of the present invention.
Figure 18B:
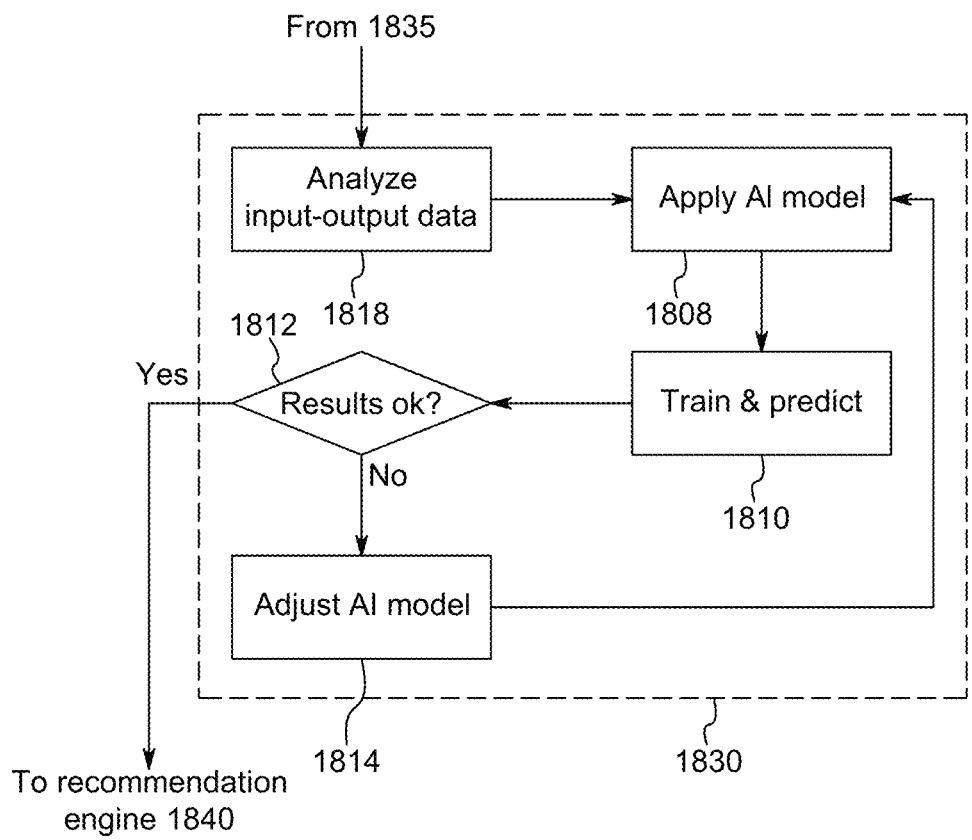
FIG. 18B shows an automation process in accordance with an embodiment of the present invention.
Figure 18C:
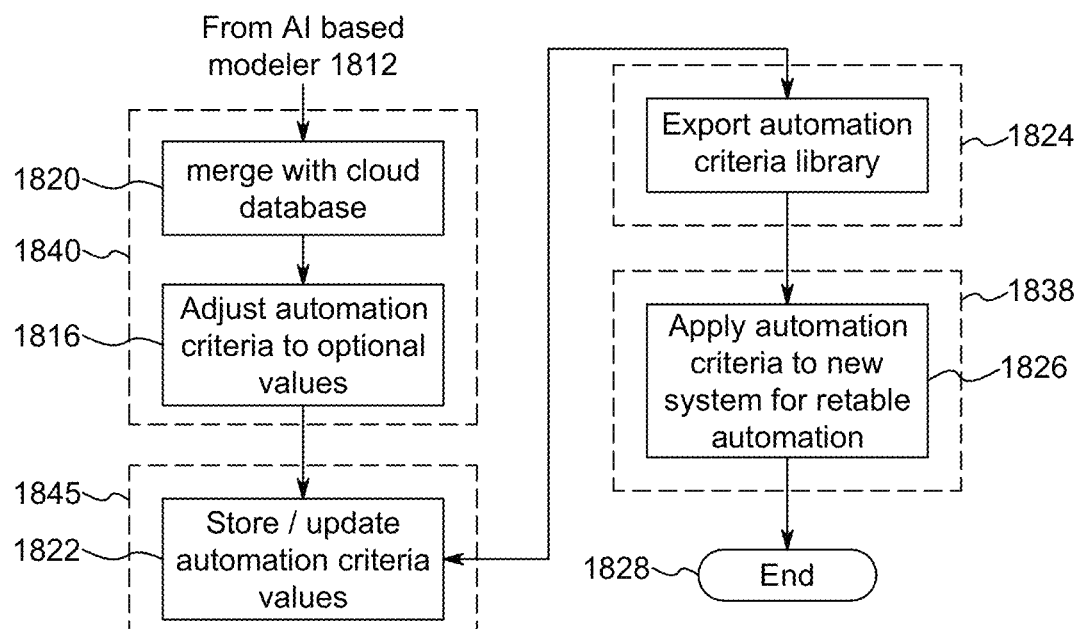
FIG. 18C shows an automation process in accordance with an embodiment of the present invention.

FIG. 18B shows a continuation of process 1800 in accordance with an embodiment of the present invention, wherein an AI based modeler 1830 includes analyzing input/output data 1818 and applying the data to an AI model 1808, which includes a train and predict performance function 1810. If the train and performance function 1810 is not satisfied during test 1812, the AI model is adjusted 1814 and the process of creating a satisfactory performance model is repeated by applying steps 1808, 1810 and 1812.

If a satisfactory test 1812 outcome is achieved, the process 1800 proceeds to a recommendation engine 1840 (FIG. 18C) that merges the model within a cloud-based database 1820. The model is adjusted 1816 to achieve an automation criterion with optimal values. The optimal values provide input to an automation criteria library 1845, which stores and updates 1822 the prior automation criteria values. At step 1824 process 1800, the automation criteria values are exported to a library porting mechanism 1838 and applied to a customer computer 1650 to achieve a reliable automation 1826. The process ends at step 1828.

The process 1800, artificial intelligence model may utilize one of supervised and unsupervised learning methods, regression analysis, Bayesian statistical models, and clustering algorithms. Also, the process 1800 may include determining system automation profiles via one or more of a computer operating system, processing power, processing load, speed, processor type, manufacture application footprint, characteristics and specific application.

Finally, the process 1800 may further include comparing system inputs and automation outputs from a local system to stored results to obtain the optimal automation fit for the computer-to-be-updated under examination, as a candidate for updating.

Further disclosed herein principally in connection with FIGS. 19A-27 is an embodiment that takes the form of a computerized method operable in a computer system to create adapters that enable application automation, the method causing the computer system to execute the steps including: (1) collecting automation information related to a computer application; (2) locating one or more application controls; (3) tracking changes between an older and a newer version of the application, the changes including one or more of: (a) an addition of one or more new data fields, (b) a removal of one or more data fields; (c) a change in data field type, (d) a field layout; (e) an underlying technology framework of the application; and (f) presenting the changes, utilizing an exception management model, employed by a user, whereby the user provides a feedback; (4) storing the changes, whereby the adapters are resilient to application changes and upgrades; (5) and incorporating the changes to upgrade the application.

Another embodiment disclosed herein principally in connection with FIGS. 19A-27 takes the form of a computer method for creating adapters that enable new and updated applications or versions thereof including the steps of: (1) opening a new application related to an existing application; (2) navigating to a specific display screen; (3) generating a screen fingerprint of the existing application; (4) checking existing versions; (5) determining if the screen exists; and if (a) the screen does not exist, then (6) serializing the screen for storing into a repository and then exiting the method; otherwise if (b) the screen exists, then (7) generating semantic differences between the new application and the existing application; (8) finding closest screen match; (9) presenting the differences to a user with a probability score dependent on the differences; (10) providing feedback from a user; (11) updating a semantic model; (12) serializing the screen repository and exiting the method.

Another embodiment disclosed herein principally in connection with FIGS. 19A-27 takes the form of a method for generating updated programming content, for an existing application having an adapter, in order to operate with a new version of a related application, including the steps of (1) extracting source field data from existing application and target field metadata from the new version of the related application; (2) storing the source field data from existing application and target field metadata from the new version of the related application to a process repository; (3) transforming and transferring the stored data from steps (2) to the adapter; (4) updating the existing adapter to work with the new version of the related application, utilizing the data obtained by the adapter in step (3).

Another embodiment disclosed herein principally in connection with FIGS. 19A-27 takes the form of a non-transitory computer-readable medium having stored thereon computer-readable instructions for creating adapters that enable new and updated applications including the steps of: (1) opening an new application related to an existing application; (2) navigating to a specific display screen; (3) generating a screen fingerprint of the existing application; (4) checking existing versions; (5) determining if the screen exists and if (a) the screen does not exist, then (6) serializing the screen to repository and exiting method; otherwise (b) if the screen exists, then (7) generating semantic differences between the new application and the existing application; (8) finding closest screen match; (9) presenting the differences to a user with a probability score dependent on the differences; (10) providing feedback from a user; (11) updating a semantic model; and (12) serializing the screen repository and exiting method.

A benefit of the embodiments disclosed in more detail below in principally connection with FIGS. 19A-27 is to assist in automatically upgrading older version applications to newer versions, which in turn serves the user. In one embodiment disclosed below a computer process enables users (a) to create adapters that enable application automation by collecting automation information; (b) to locate application controls and tracking changes between an older and a newer version of the application, such changes to include addition of one or more new data fields, removal of one or more data fields, change in data field type (i.e., type of data held in the field). The program looks for application controls in every screen of the application that the user exposes to the program. An application control is any field or UI control used to add, remove or change application data or perform actions such as clicking buttons, selecting input from list, as by way of example, indicating yes/no, etc. One non limiting embodiment of this includes a method for generating updated programming content, for an existing application having an adapter in order to operate with a new version of a related application, including the steps of (1) extracting source field data from existing application and target field metadata from the new version of the related application; (2) storing the source field data from existing application and target field metadata from the new version of the related application to a process repository; (3) transforming and transferring the stored data from steps (2) to the adapter; (4) updating the existing adapter to work with the new version of the related application, utilizing the data obtained by the adapter in step (3).

The process of locating application controls includes creating a logical hierarchical representation of each application screen (see FIG. 22B and FIG. 22D), and storing different nodes of this tree, along with key properties of each node in the tree. Further embodiments allow a change of field layout; and a change in the underlying technology framework of the application. An example of changes in underlying technology framework would be an application that was initially developed using.NET framework, could be rewritten using a Java framework, i.e., a high-level programming language developed by Sun Microsystems.

The embodiments disclosed herein also present application changes using an exception management model to a user, so that the user can, by way of example, provide feedback in a visual, instead of programmatic manner. An exception management model refers to presenting only the differences, i.e. new and modified fields in the application versions to the user. Visual feedback refers to the user selecting the field type from, by way of example, a drop-down menu instead of writing a script referring to a particular data type. The process then stores the changes, so as to make the adapters resilient to application changes and upgrades, as well as incorporating the changes to upgrade the application itself.

Figure 19A:
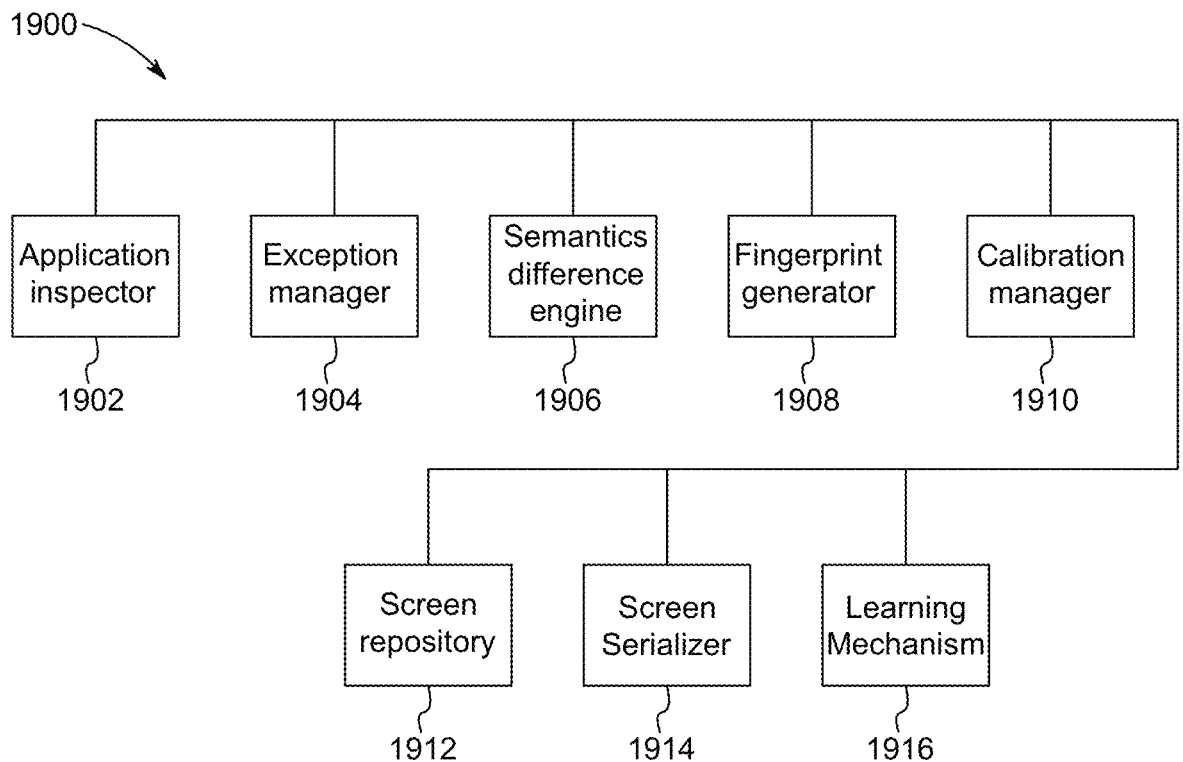
FIG. 19A shows the modules for creating one or more new application execution files in accordance with an embodiment of the present invention.

Referring now to FIG. 19A, a system 1900 of a set of modules 1902-1916 comprises a non-limiting embodiment of the invention. These modules include the following functions:

Application Inspector: The application inspector 1902 performs an analysis of the application that it is pointed at, and gets information on underlying application framework, object metadata and properties, object type and associated actions, user interface (UI) layout and application response times. This information is critical to automating the application. Examples of these frameworks are found in a Document Object Model (DOM) for a browser, Java framework, .NET framework, SQL and other underlying technologies, all which are well-known by those of ordinary skill in the art of system programming.

Exception Manager: The exception manager 1904 filters out mismatched objects between versions of objects that semantically have a high probability of being synonyms, but the actual object properties indicate that object structure has changed significantly. The exception manager then routes these exceptions to an exception queue (not shown), which is then presented to the user to either confirm or remap the objects.

Semantics Difference Engine: The sematic difference engine 1906 uses two object hierarchies: a source object and locates the source object in a target hierarchy (see, FIG. 22D). It does this by taking into account the source and target object's labels and inferring its meaning, the context of other fields, and controls within its sphere of activity in a physical layout. The engine 1906 assigns weights to label closeness matches, the distance to other known controls and the object structure of the source and the potential target control. The output of engine 1906 is a number or other quantifier, that represents a percentage of the probability of a match.

Fingerprint Generator: The fingerprint generator 1908 analyzes a screen writer for various objects (markers) and their locations. The combination of various objects, object metadata, properties and types, and location on the screen is used to generate a unique set of keys that can together represent a "fingerprint" of that screen that assists the automation application, as disclosed in U.S. Pat. No. 8,504, 803, System and Method For Creating and Executing Portable Software, to recognize that specific screen, among a set of any other possible screens.

Calibration Manager: The calibration manager 1910 compares and analyzes similar functional screens from different versions of an application. It uses a variety of methods to perform the comparison, i.e. compare screen fingerprints, perform an application inspection and incorporate user input. It presents the results in a graphical user interface that allows a user to categorize application objects as common, new or deleted. Based on fingerprinting information the calibration manager offers recommendations on field mapping. Users can follow the calibration manager's recommendations or override as needed.

Screen Repository: The screen repository 1912 represents a set of screens deemed by the user to be essential to carrying out selected business process from a screen collection. Multiple collections created by the user comprise a screen repository.

Screen Serializer: The screen serializer 1914 is a program to store screens and related metadata and to control structure in a machine-readable format.

Learning Mechanism: The learning mechanism 1916 program is utilized to build an upgraded resilient automation adapter that the system utilizes to timely store and mine features of an underlying application technology and object recognition criteria, and to learn critical identifying criteria, for the purpose of applying it to automate the applications that it may be updating. The learning mechanism includes filing information under appropriate categories, applying machine learning techniques, as by way of example and not limitation, multiple regression, principal component analysis, and storing the results in a knowledge database. This knowledge database is then utilized to identify underlying technologies and object recognition criteria for any new application that the automation application encounters.

Figure 19B:
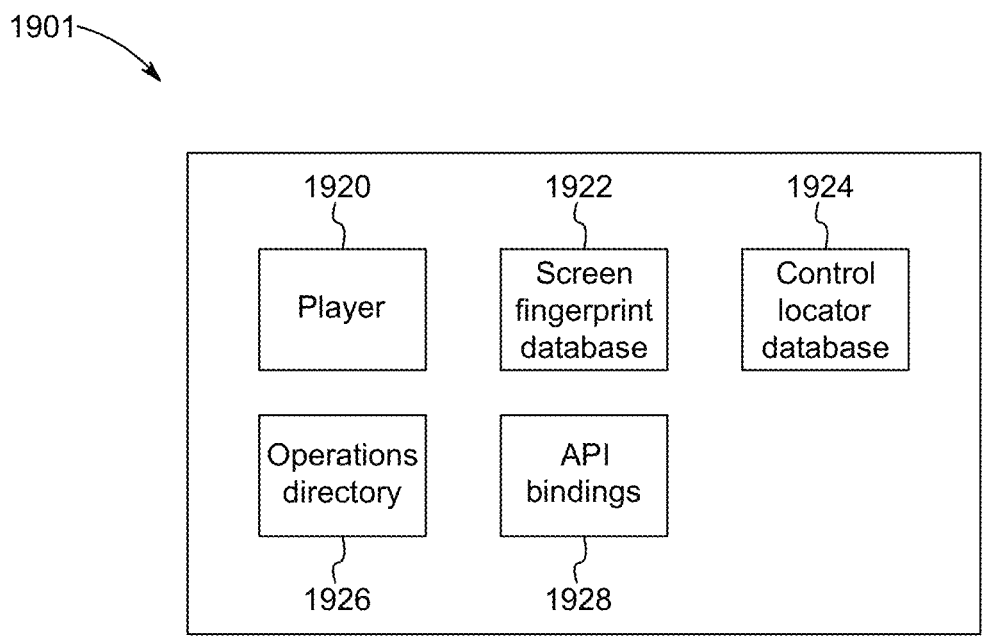
FIG. 19B shows a diagram for an adapter as generated, in accordance with an embodiment of the present invention.

FIG. 19B illustrates a non-limiting example of a hypothetical adapter data module 1901, for use in a process FIG. 20, 2000, as further described below. It includes the application player 1920, a screen fingerprinting database reference 1922, a control locator database reference 1924, an operations directory 1926 and API bindings 1928. Those of ordinary skill in the art of object programming applications will appreciate the significance of the generation of the adapter parameters and data modules depicted in FIG. 19B.

Figure 20:
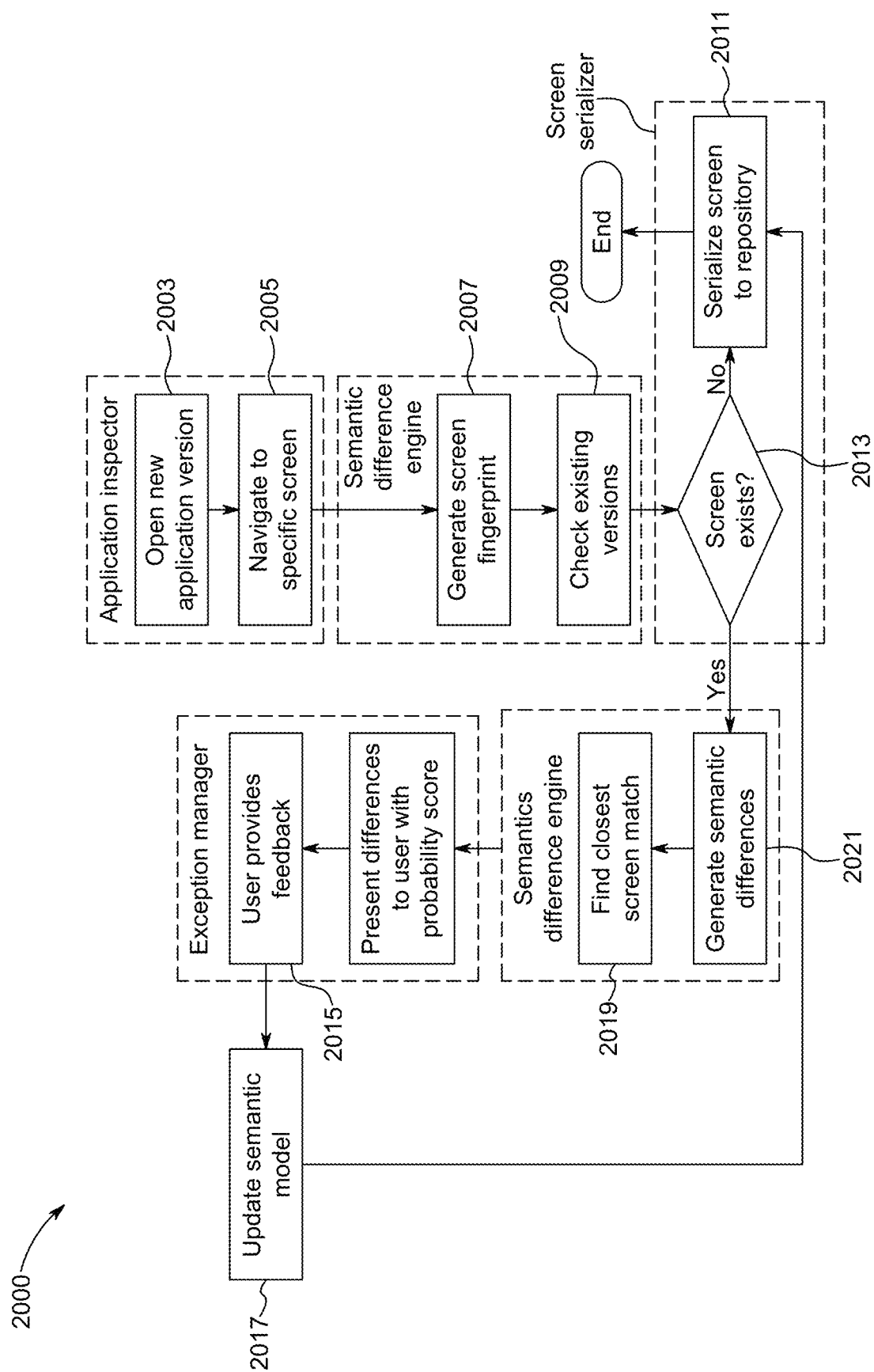
FIG. 20 shows a flow diagram for creating one or more new application execution files, in accordance with an embodiment of the present invention.

With further reference to FIG. 8B, and FIG. 20, and by way of example and not limitation, a user of the system 800 (FIG. 8B) may desire to create a process 2000 instantiated as a task to be run at various times or repetitively on the local computer 804 to achieve the foregoing objects. In a browser, viewed by the user in display 815, process 2000 will permit the user to insert commands having single execution features or as part of a several line operation or one of several commands that may operate as part of a larger loop or nested loop that will have the effect of achieving an outcome having the effect of reflecting updates in earlier version applications. As by way of example a user would achieve the objects of the invention by the following series of operations: (1) Locate candidates for change by control identification ("id"); (2) Determine if a unique control found and control type match exits; (3) Eliminate all candidates with control type!=reference control type; (4) Assign weights to compute match probability; (5) Compute attribute differences for each candidate; (6) Observe if a higher overlap percentage gets a higher weight; (7) Compute reference control path ends with a match in target screen; (8) Determine if a longest path overlap gets higher weights; (9) Locate proximity to neighbors on actual visual placement on screen; (10) Determine if percentage of control types and text labels/id match the reference screen; (11) Eliminate all controls under a probability threshold limit; (12) Present control mapping to user to confirm.

The creation of commands having single execution features or as part of a several line operation or one of several commands known as a portable unit that will facilitate the construction of the inventive features of the process 2000 are disclosed in FIGS. 1-12 and the accompanying description.

Process 2000, which aids the user in carrying out the foregoing operations, begins at step 2003, resident in the application inspector FIG. 19A, 1902, wherein the user opens a new application version, for example, locating a candidate by control id. A control id typically represents information needed for automating, such as application controls, application objects, their fields and their properties, and integration services. The controls, though not exclusively, are embodied in menu hierarchies, and the arrangement of GUI buttons that serve as menu commands, having textual labels and hierarchical layouts characterized as drop-down menus or hotlinks, necessary for operating various programs and applications.

In step 2003 the user then navigates to a specific screen 2005 in order to generate a screen print 2007, which in the particular embodiment disclosed resides in the semantics difference engine, FIG. 19A, 1906, working with the fingerprint generator 1908. The process step 2009 then checks or retrieves an existing version of the application and in step 2013 determines if a screen exists. If the screen does not exist, the application is serialized 2011 for reference and the process 2000 is ended 2023. If the step 2013 determines that a screen exists, then the semantic differences are ascertained in step 2021 and an analysis on the differences is performed in step 2019 to find the screen's closest match. By way of example, depending on versions of a program, an object may have appeared on a screen different from a later version, and it may be necessary to determine the correct screen to compare, the former and the latter version by extracting system attributes.

In one embodiment, the steps 2021 and 2019 are performed as part of the semantics difference engine FIG. 19A, 1906. The difference found in step 2019 and in step 2020 presented to the user with a probability score. In step 2015 the user provides feedback, such as by way of example and not limitation, what to include in the adapter for the new version. Both steps 2020 and 2015 are, in the disclosed embodiment, performed in the exception manager, FIG. 19A, 1904. The user feedback 2015 is used to update the semantic model in step 2017. Following that step, the process 2000 returns to serialize 2011 for reference and the process 2000 is ended 2023.

Figure 21:
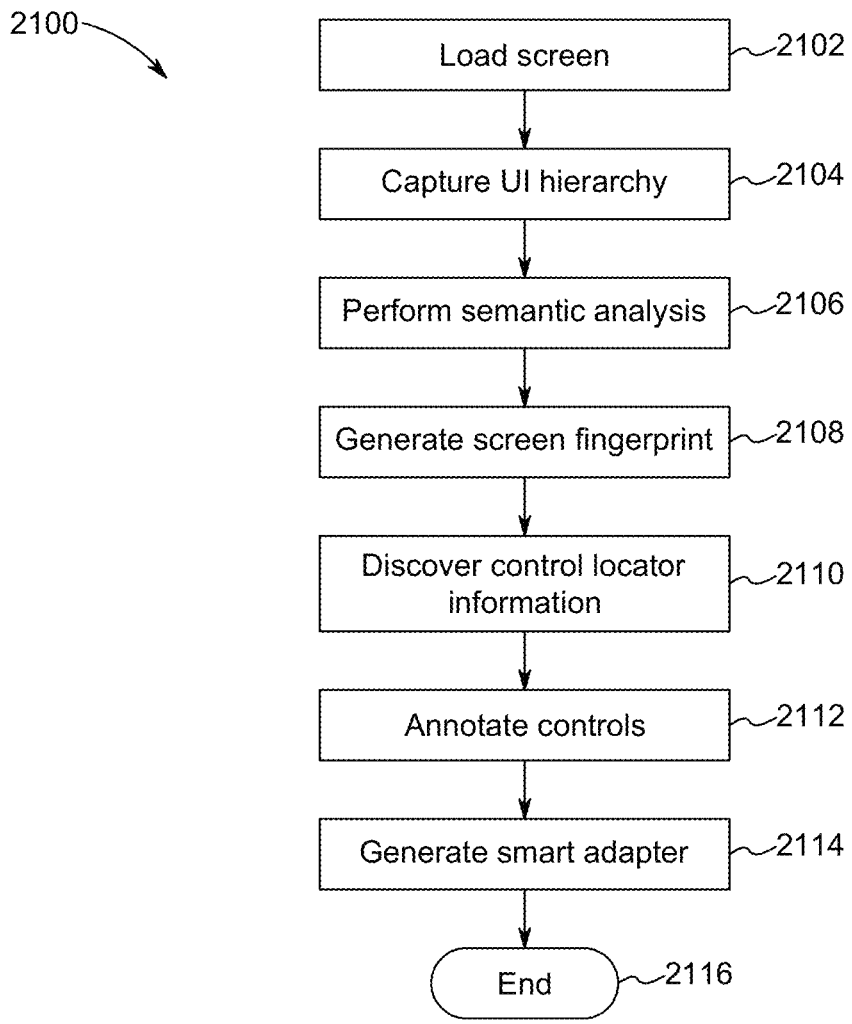
FIG. 21 shows a block diagram for adapter creation, in accordance with an embodiment of the present invention.

In yet another embodiment of the invention FIG. 21 illustrates a block diagram 2100 for the creation of an adapter. Block 2102 shows loading the screen under examination, which proceeds to capture the UI hierarchy 2104 (Also see, FIG. 22B, as more fully described below), for purposes of performing a semantic analysis 2106. By way of example, a field type change in one version of an application may be referred to by a different name. In step block 2108 a screen print is generated and in block 2110 control locator information is determined and stored. The data from 2110 is used to annotate the controls 2112 and is then sent to block 2114 to generate a smart adapter. Block 2116 closes out the transaction.

Figure 22A:
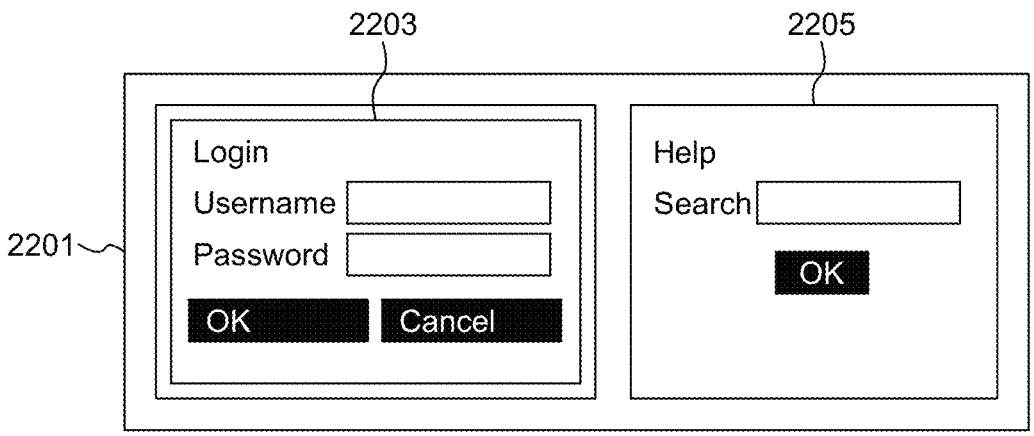
FIG. 22A shows a physical screen of an application, before an upgrade, in accordance with an embodiment of the present invention.
Figure 22B:
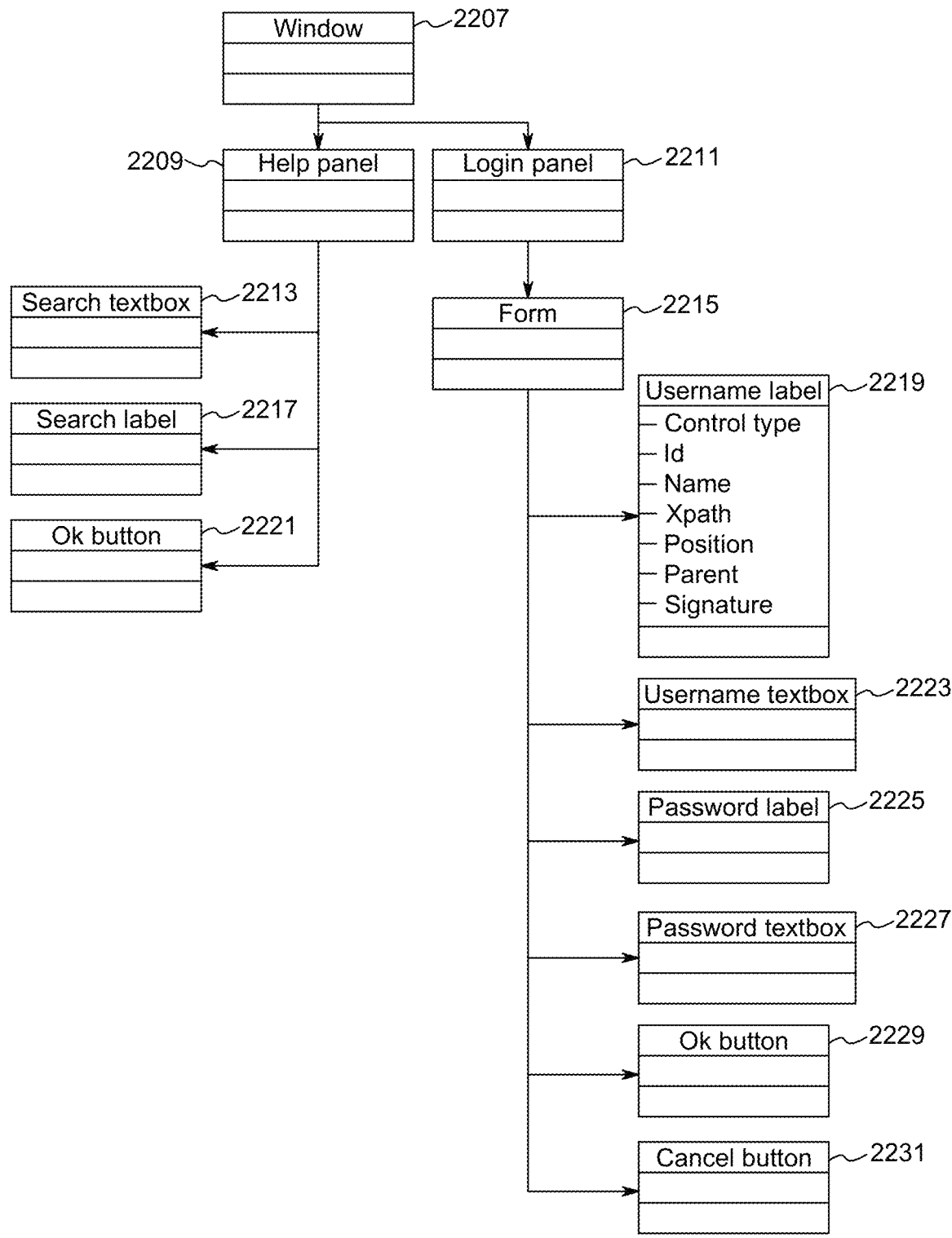
FIG. 22B shows a logical hierarchy of the application in FIG. 5A, before an upgrade, in accordance with an embodiment of the present invention.
Figure 22C:
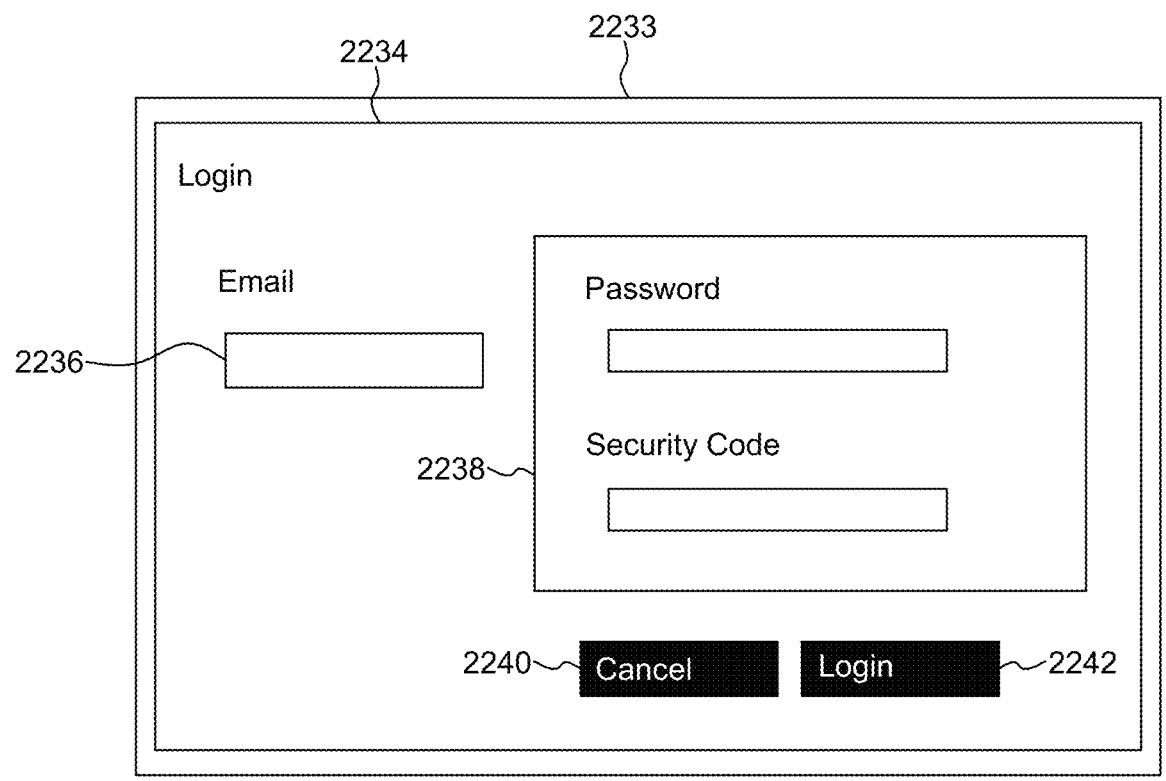
FIG. 22C shows a physical screen of an application after an upgrade, in accordance with an embodiment of the present invention.

FIGS. 22A-D illustrate a non-limiting example of an application that has been upgraded using the process 300 as detailed. FIG. 22A shows a GUI screen of an application before an upgrade, while FIG. 22B shows its corresponding logical hierarchy that supports the screen depicted in FIG. 22A. FIG. 22C shows a screen of an application after an upgrade in accordance with an embodiment of the present invention, utilizing process 300 that creates a corresponding revised hierarchy shown in FIG. 22D after an upgrade in accordance with an embodiment of the present invention.

Returning to FIG. 22A, the screen 2201 has thereon depicted a non-limiting example of images generated by a current version of a hypothetical system, such as a window 2203, for logging in, and a window 2205 for providing help. FIG. 22B, represents the corresponding logical hierarchy representing the screen 2201 (FIG. 22A), having a window 2207 that branches into a help panel 2209 and a login panel 2211. The help panel 2209 contains three elements: a search textbox, 2213; a search label 2217; and an OK button 2221. The login panel 2211, contains a form 2215, which itself contains six elements: a username label 2219, having sublabels, as by way of example indicated (control type, id, name, path, position, parent, and signature); a username textbox 2223, a password label 2225; a password textbox 2227; an OK button 2229; and a cancel button 2231.

Figure 22D:
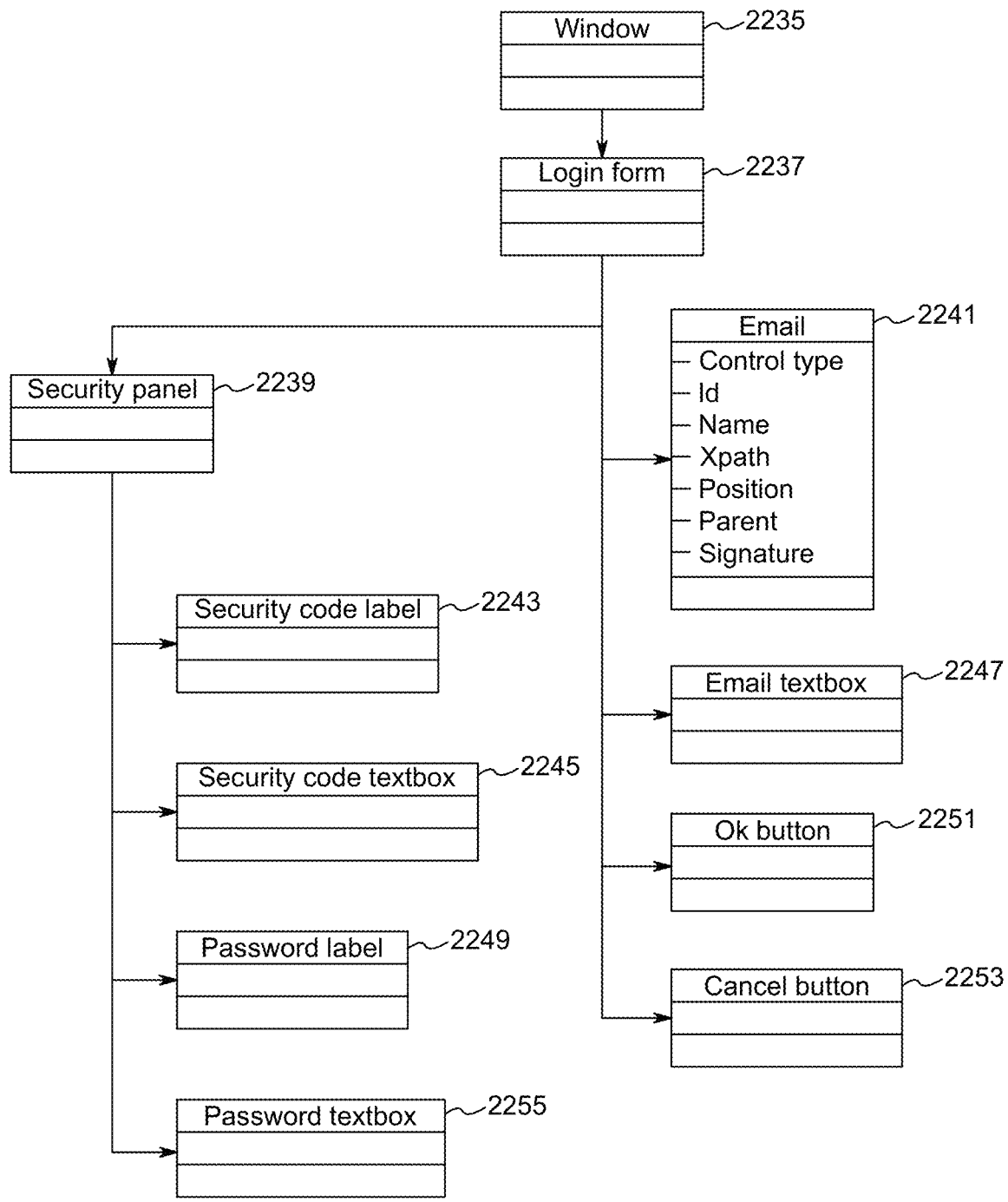
FIG. 22D shows a logical hierarchy of the application in FIG. 5C, after an upgrade, in accordance with an embodiment of the present invention.

Returning to FIG. 22C, GUI screen 2233 has thereon depicted images generated by a subsequent or later version of the hypothetical system FIG. 22A. The new version contains a GUI window 2234, for logging in, and a box 2236 for providing for an Email address; a sub-window 2238 providing a box for password and a box for security code. Window 2234 includes a cancel button 2240 and a login button 2242. FIG. 22D, represents the corresponding logical hierarchy representing the screen 2233 (FIG. 22C), having a window 2235 directed to a login form 2237. Login form 2237 branches into a security panel 2239 and an email 2241; email textbox 2247; an OK button 2251; and a cancel button 2253. Each such logical function corresponding to the physical representation in FIG. 22C. The security panel 2239 contains four elements: a security code label 2243; a security code textbox 2245; a password label 2249 and a password textbox 2255.

FIGS. 23-27, illustrate GUI screens of applications, which are modified according to the process disclosed in accordance with the invention. The screens in FIG. 23 through FIG. 27, are separated into two windows in some instances and three windows in other instances. At least two windows show the before and after of an application. In cases where another window is shown, it typically illustrates the set of parameters undergoing modification.

Figure 23:
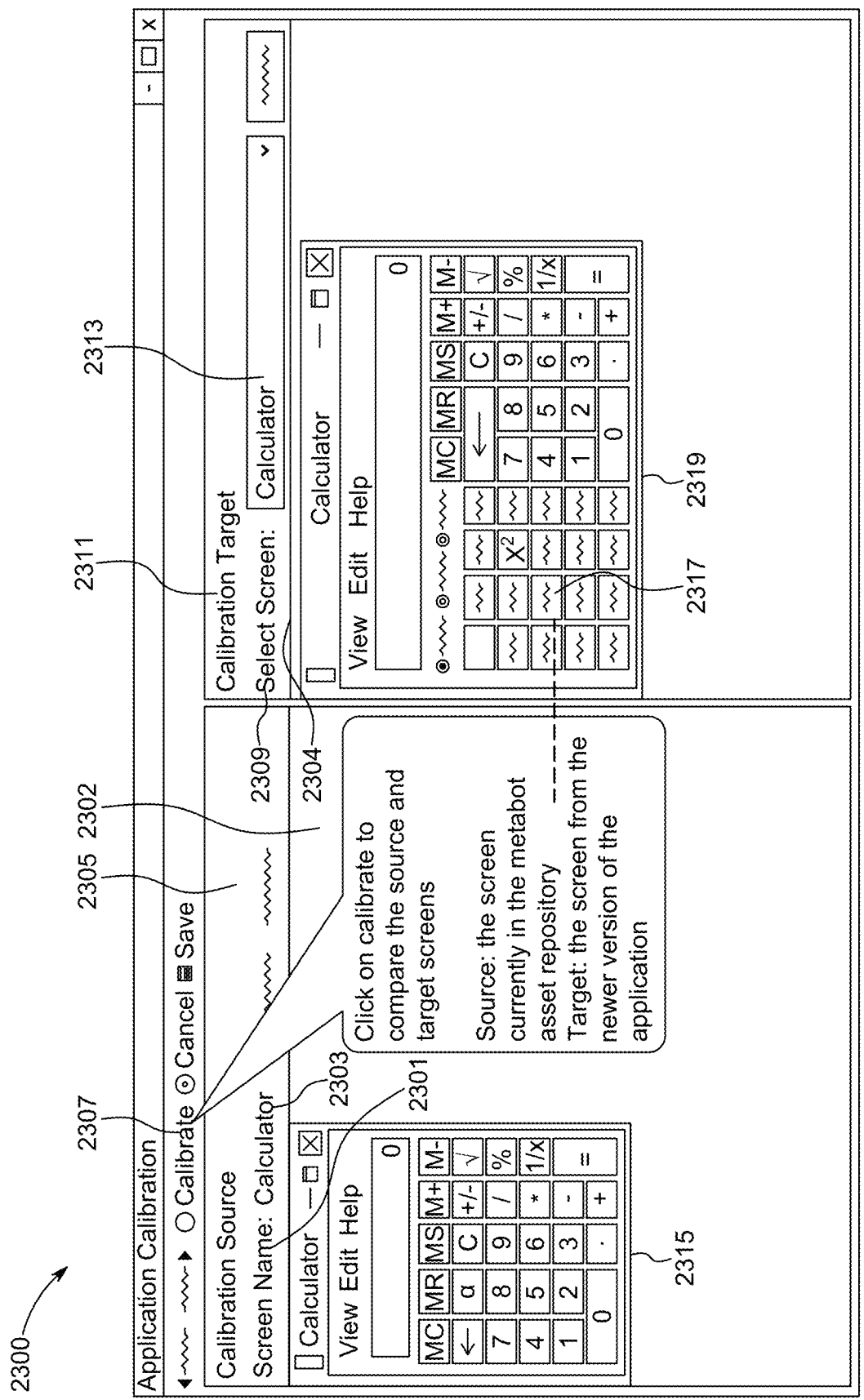
FIG. 23 shows a screen of an application before an upgrade is made and after an upgrade is made, in accordance with an embodiment of the present invention.

FIG. 23 shows a screen 2300 divided into a source screen 2302 and a target screen 2304, which illustrate the before and after screen effects of an upgrade modification to a calculator 2315 functionality. A banner 2305 generally contains, by way of example, a Screen Name 2301, which in the instant example is a Calculator 2303 undergoing modification. The Calibrate button 2307 allows the user to compare the source screen. In the target screen 2304, there is a corresponding banner which in the example, shows Calibration Target indication 2311, and a select screen name 2309 as Calculator 2313. Note that the target screen 2304 upgraded calculator 2319 contains a multiplicity of new function keys, such as key 2317, labeled "cash."

Figure 24:
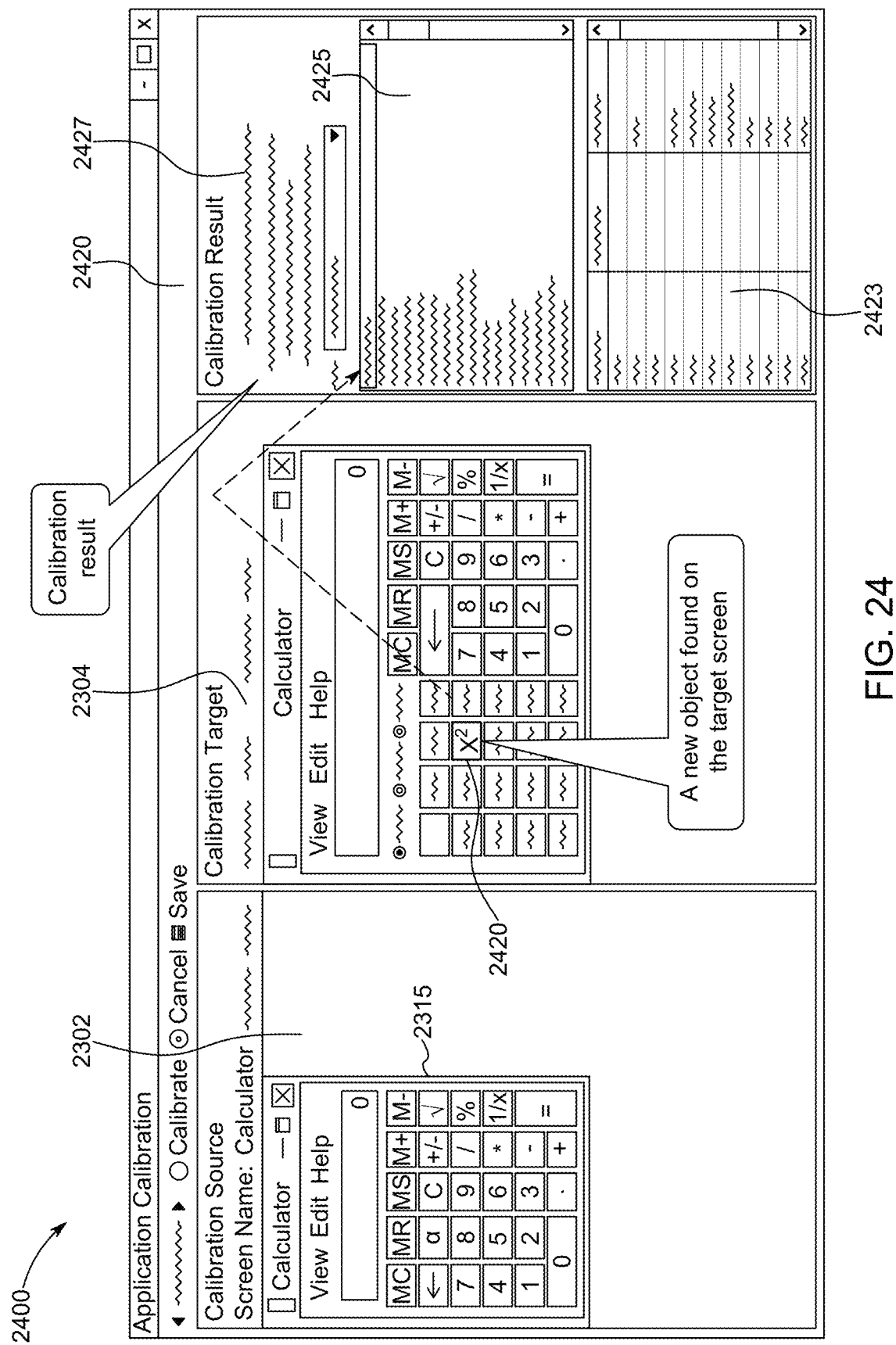
FIG. 24 shows a screen of an application before an upgrade is made and after an upgrade is made, in accordance with an embodiment of the present invention.

FIG. 24 shows a screen 2400 with source window 2302 and target window 2304, and an added window 2320, that by way example illustrates in the windows, before and after an upgrade is made, as well as providing additional information in sub-windows 2421, 2423 and 2425. Sub-window 2425 displays the types of added function keys that appear in the upgraded calculator. Additionally, a calibration result 2427 provides statistical information as to the effect of the change. The calibration result 2427 is provided in calibration result window 2420. In the illustrated case, 58 objects are found in the target screen 2304. Sub-window 2423 displays information pertaining to the particular function "click" in the sub-window 2425, which in the example shows the parameters for the "Square-PushButton" $X.sup.2$ in the upgraded calculator.

Figure 25:
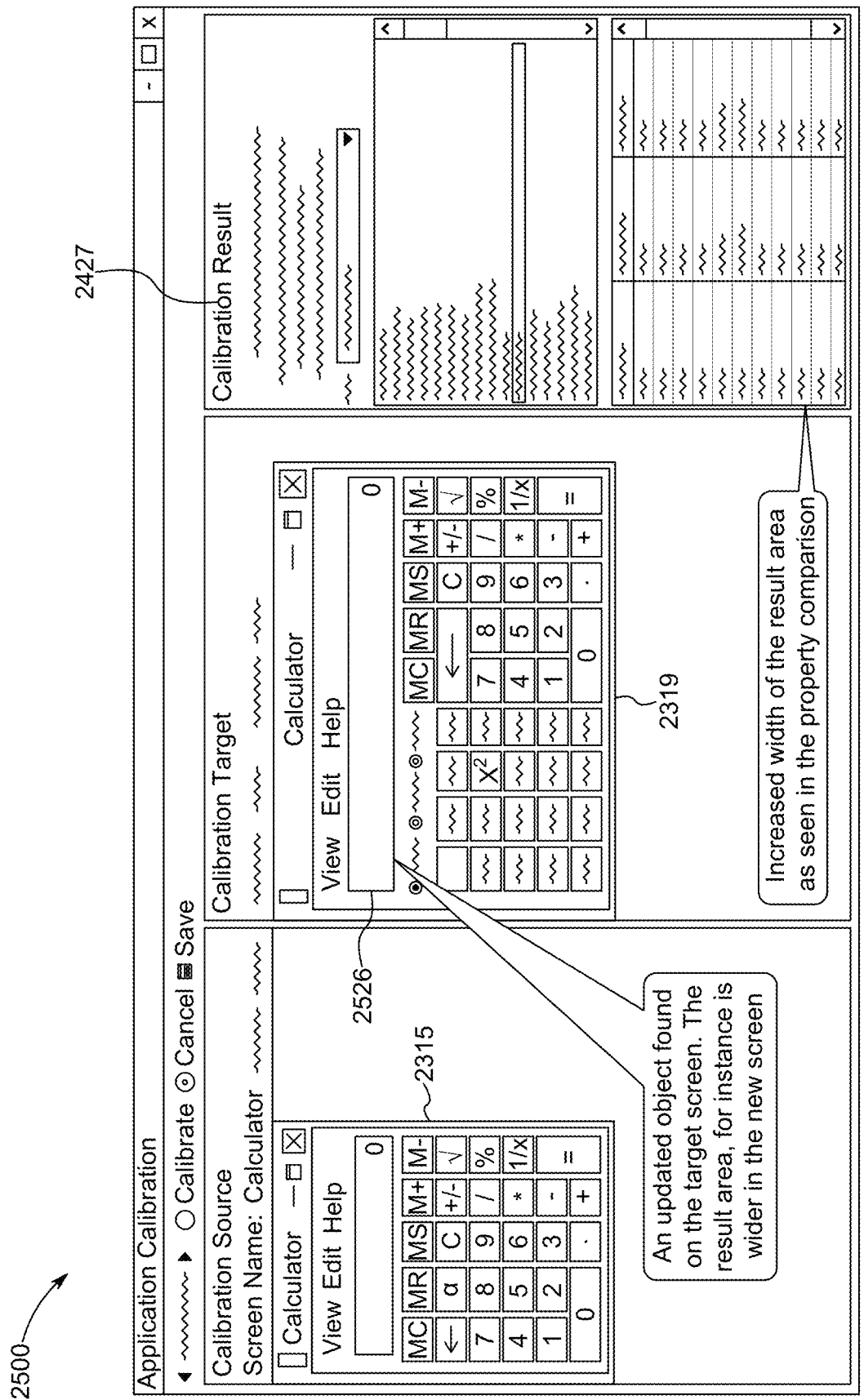
FIG. 25 shows a screen of an application before an upgrade is made and after an upgrade is made, in accordance with an embodiment of the present invention.

FIG. 25 shows a screen 2500 of an example illustrating before and after an upgrade is made to the result area 2526, in accordance with an embodiment of the present invention.

Figure 26:
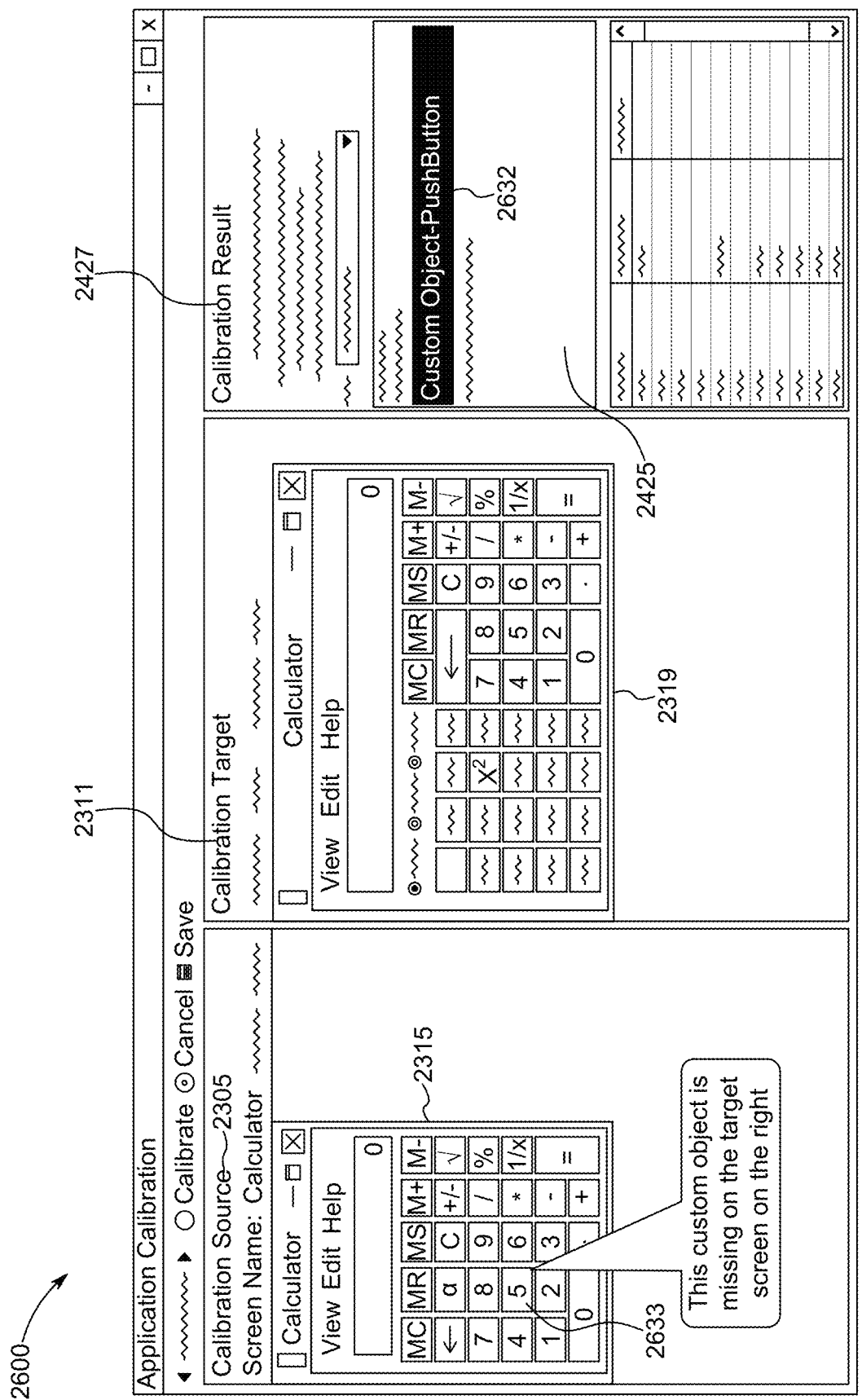
FIG. 26 shows a screen of an application before an upgrade is made and after an upgrade is made, in accordance with an embodiment of the present invention.

FIG. 26 shows a screen 2600 of an example illustrating before and after an upgrade is made, where a custom object-pushbutton 2633 is missing. It is also noted in the sub-window 2425, as "Custom Object-PushButton" 2632, in accordance with an embodiment of the present invention.

Figure 27:
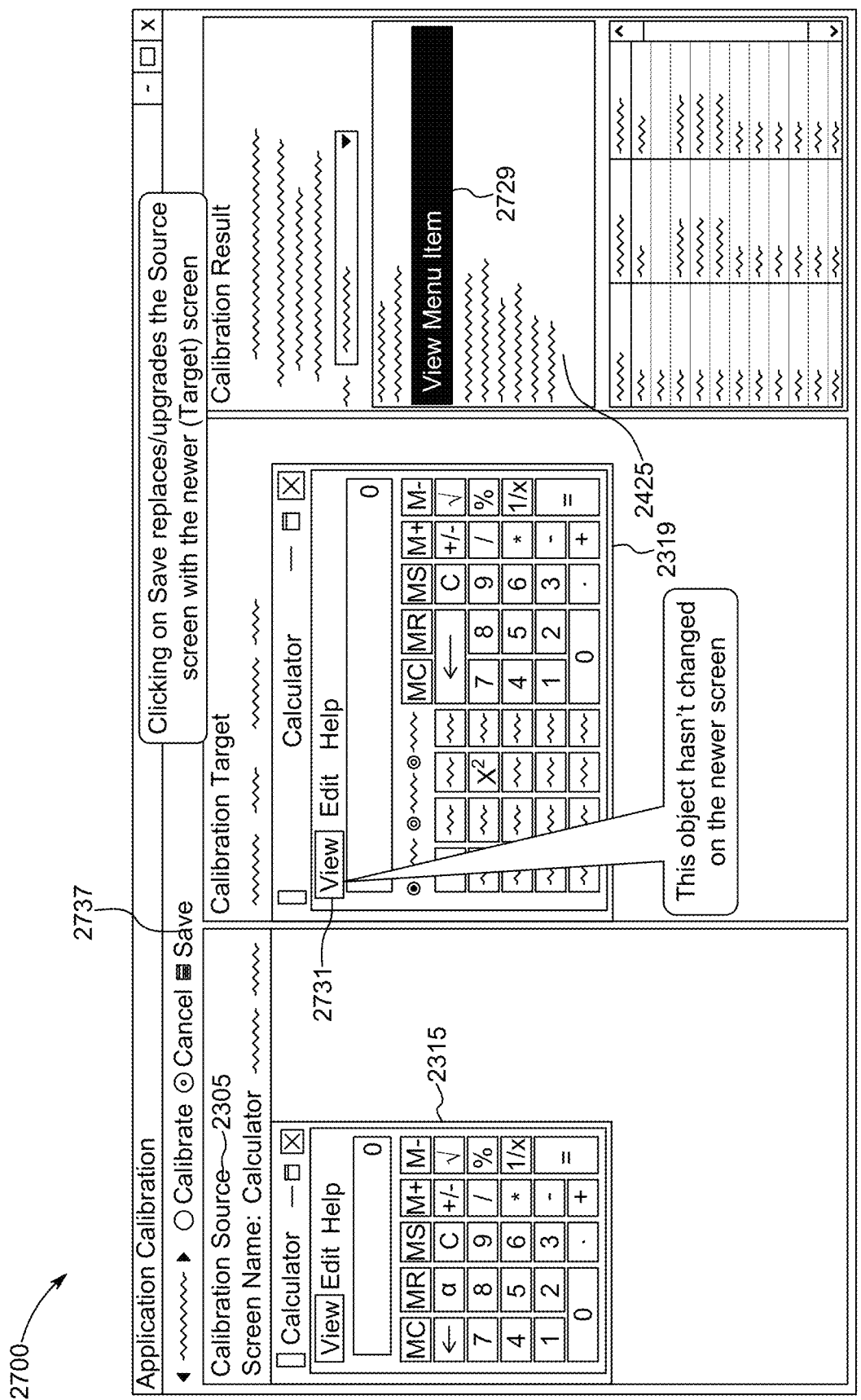
FIG. 27 shows a screen of an application before an upgrade is made and after an upgrade is made, in accordance with an embodiment of the present invention.

FIG. 27 shows a screen 2700 of an example illustrating before and after an upgrade is made, where a view button 2731 has not changed on the target screen 2319, and it is noted in the sub-window 2425, as "View Menu item" 2729. Clicking on the Save 2737 button, replaces or upgrades the source screen 2302 with the newer target window such as 2304 (FIG. 24) in accordance with an embodiment of the present invention.

Figure 28:
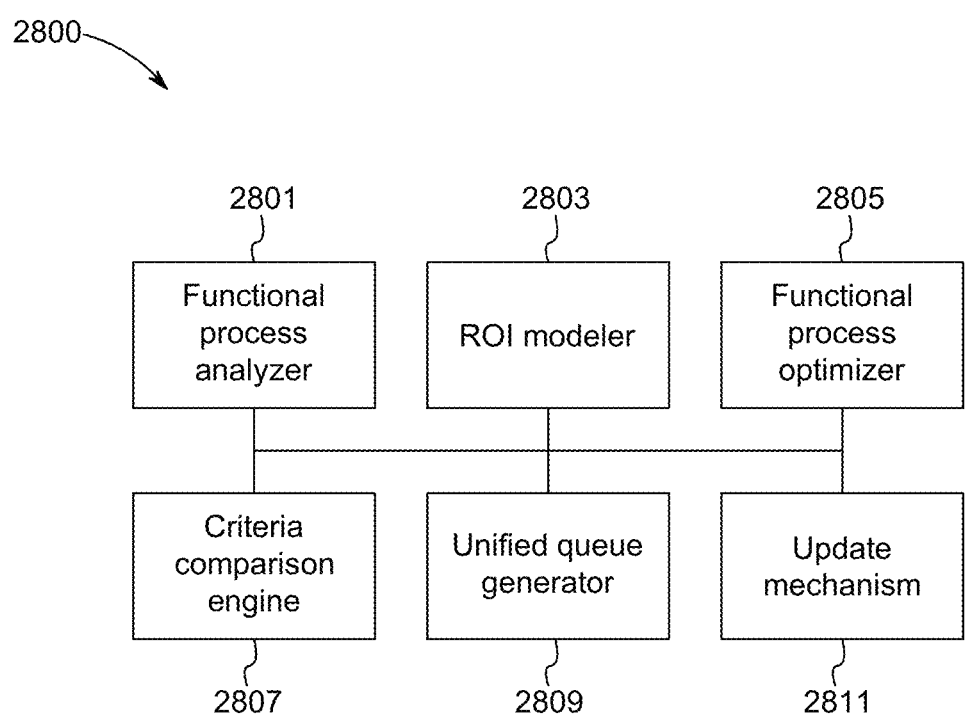
FIG. 28 shows a set of modules for an application automation process in accordance with an embodiment of the present invention.
Figure 29:
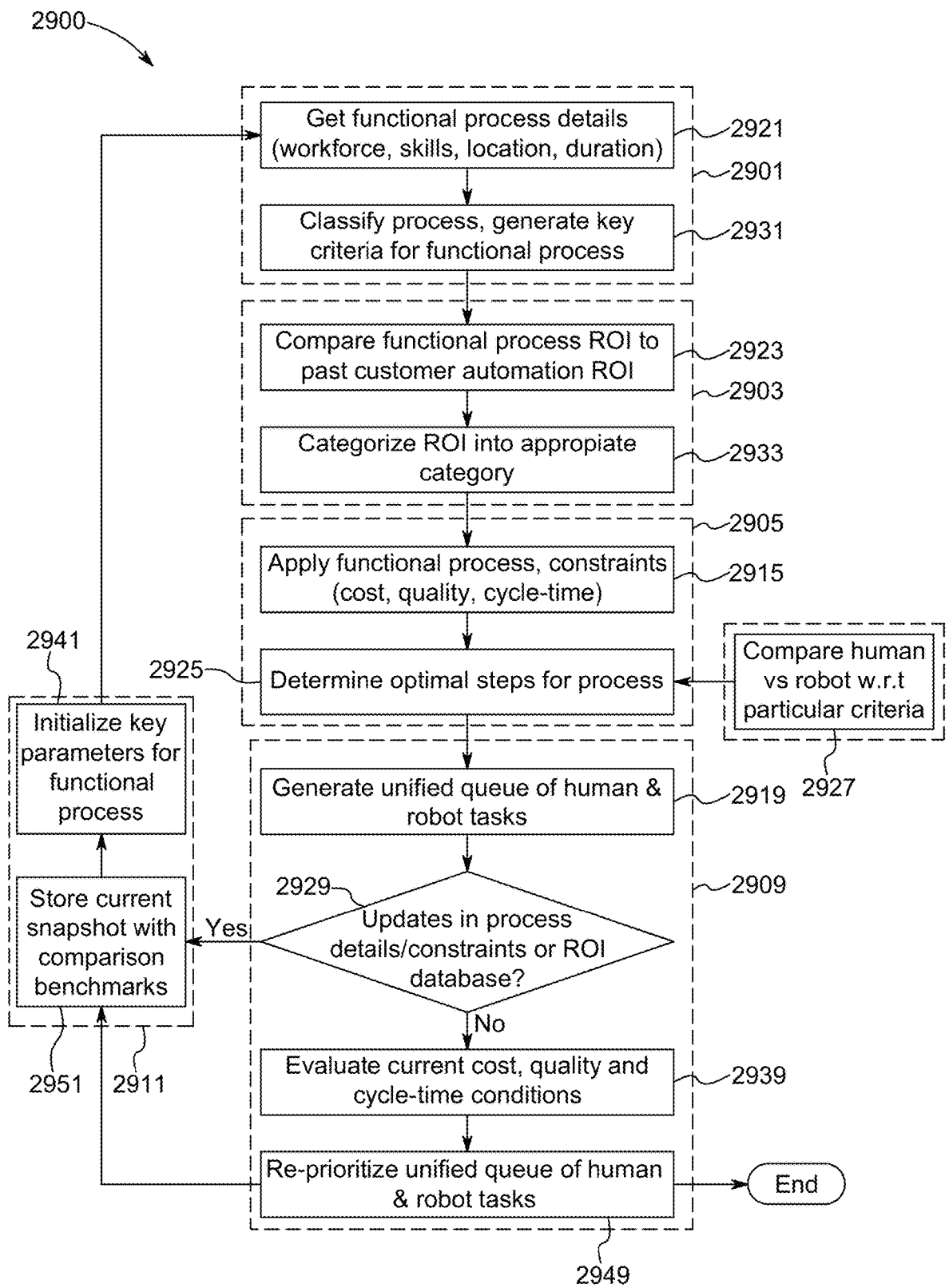
FIG. 29 shows a process for a system an application automation process in accordance with an embodiment of the present invention.
Figure 30:
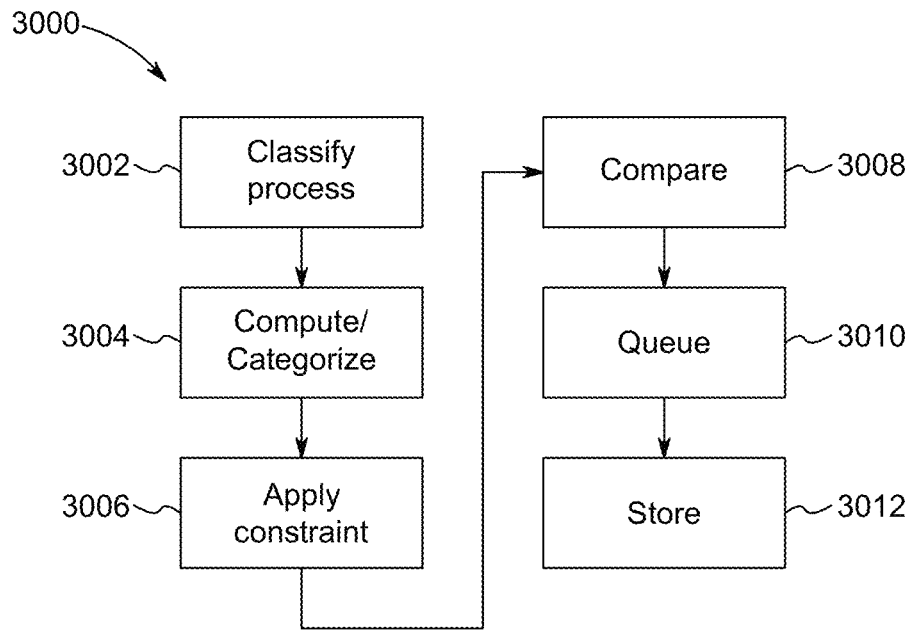
FIG. 30 shows a process for a system an application automation process in accordance with an embodiment of the present invention.

FIGS. 28-30 principally describe a system and method to determine the appropriate sequence of processes to automate based on projected return on investment ("ROI") as applied to such efforts as computer programming activities. Additionally, the inventive system and method divides the process into an optimum mix of human and robotic automation of the activities to minimize cost, increase quality and improve on the cycle-times of the affected computer processes.

An overview of an embodiments disclosed principally in FIGS. 28-30 includes: categorizing ROI, as it relates to automating a functional computer process, via leveraging an existing database of past automation ROI realized by a customer computer; evaluating a specific automation ROI for a given process based on total number of full time equivalents ("FTEs") employees, location, skillset requirements, and cost to replace/help FTEs; dividing a process into essential steps based on: (a) the entity performing the work, (b) where the work is being performed etc.; comparing a human FTE cost to machine cost to determine an optimal option to perform the work; accounting for service level agreements ("SLA"), work duration and quality requirements, to place tasks in a unified queue for humans, robots and related entities such as software bots; reprioritizing a task creating portable automation criteria libraries (correlated to a system with a specific automation profile) that can be leveraged on new systems with comparable automation profiles thus providing near-perfect and reliable automation of the work effort, out-of-the-box.

Another embodiment principally disclosed in FIGS. 28-30 includes a computer method for automating a computer process based on a return on investment, including the steps of: (1) creating an execution file having one or more tasks having command line arguments executable as widgets by the computer, assembled into an execution file, which includes nested tasks; (2) organizing the nested task related to each task; (3) accounting for all dependencies to ensure that files, tasks, and environments for running on the computer are present in the execution file; (4) the step of creating an execution file further including: (a) reading the task file, (b) scanning for event dependencies, and (c) embedding files and links needed for execution of the execution file, (d) storing the dependencies in a dependency file, and (e) accessing a functional process analyzer, evaluating specific automation return on investment for a computer process, based on one or more of a total number of FTE employees, employee location, employee skillset requirements, and cost to replace or help full time equivalents; (f) dividing the computer process into constituent steps based on: (5) the entity performing the work, (6) where the work will be performed; (7) comparing a human full time equivalent costs to a machine cost to determine an optimal option to accomplish the work; (8) accounting for SLAs, work duration and quality requirements to place tasks in a unified queue for humans, robots and related entities such as software bots; (9) reprioritizing task for creating portable automation criteria libraries; (10) correlating to a system with a specific automation profile, that leveraging on computer processes with comparable automation profiles, for providing optimum and reliable automation for out-of-the-box software.

Yet another embodiment principally disclosed in FIGS. 28-30 is a computer system for automating a computer process based on a return on investment, including: (A) a functional process analyzer for (1) classifying a process based on an entity and a corresponding divisional partition, such as one of a group, department or stakeholder, and (2) generating key criteria, such as a (a) process automation index, or (b) a process complexity index, based on (i) workforce parameter, (ii) a required skill, (iii) a workforce location, or (iv) a process duration; (B) a return on investment modeler for: (1) computing and categorizing the return on investment into (a) a measurement based on earlier in time customer automation return on one of (i) investment data by industry or (ii) dependent on predefined categorizations based on (a) vertical organization or (ii) a process category; (C) a functional process optimizer for (1) applying constraints such as one of (a) cost, (b) quality or cycle-time, in order to determine the optimal steps for the return on investment process; and (c) determining the optimum resource to carry out the return on investment process by a (i) human, (ii) a robot or (iii) bot; (D) a criteria comparison engine for (1) comparing one of (a) the human entered data, (b) the robot entered data, (c) the bot acquired data, with respect to one (i) cost, (ii) quality or (iii) cycle-time; (E) a unified queue modeler for: (1) queuing one of (a) a human task, (b) a robot task, or (c) a bot constructed task, based on (i) the functional process optimizer, or (ii) and evaluation of any changes in process details such as by one of (d) workforce, (e) required skills, (f) workforce location, (g) process duration, and (h) process constraints such as one of (j) cost, (k) quality factors, or (1) cycle-time, and for: (2) re-prioritizes the unified queue in real-time; (F) and update mechanism for: (1) storing (a) a track of process changes, (b process details and constraints in the event of a change; (2) initializing a plurality of key parameters for a next set of values and changes in benchmarking ratios. The disclosure pertaining to the embodiments disclosed in FIGS. 28-30 pertains to software, which manages and integrates a computer's capabilities, such as the generation of adapters to enable application automation by exposing operations that can be automated, in the form of an API that can be leveraged by various automation engines including Automation Anywhere (found at www.automationanywhere.com). The disclosure accompanying FIGS. 1-7 describes the creation of commands having single execution features or as part of a several line operation or one of several commands. The disclosure accompanying FIGS. 28-30 describes more specifically an inventive process for executing applications related to optimizing return on investments for a service provider environment, operating in and outside of a communication channel, such as the Internet or a direct connection to a customer computer, via installed software or direct connection via hard wire to a customer computer, in either case requiring updated applications for the customer computer, generally referred throughout as a computer-to-be-updated, or a customer computer or environment, while generally adhering to the customer's compliance boundary requirements.

The tasks in the service provider environment have one or more of a series of tasks having commands, and other instructions having variables, executable by an application in the computer-to-be-updated. In one embodiment, the service provider computer assembles tasks into execution files, which may require validating the tasks and organizing nested tasks, including collecting nested task information for each task, and accounting for all dependencies to ensure that files, tasks, and environments for running on one or more computer-to-be-updated computers are present. At least one or more dependencies will, subject to a computer-to-be-updated set of compliance boundary parameters, enable a service provider to create specific adapters that enable an automated application to be executed, when the adapters are incorporated into the computer-to-be-updated.

The creation of an execution file may include reading the task file, scanning for event dependencies and embedding files and links needed for the remote execution of the execution file, storing the dependencies in a dependency file, scanning for security, such as insuring the customer's compliance boundary parameters are present and functional, and verifying the task file for proper formatting. In the inventive process, the service provider is presumed to have access via a remote access technology, to deliver the elements of code, while respecting the compliance parameters, required for communicating between two or more computer environments. The service provider in fulfilling its provision of the return on investment services, in accordance with the disclosed embodiments, seeks automatically, i.e., with little or no human intervention, to create an application to update a computer-to-be-updated such that it performs in accordance with the principles described herein.

This disclosure accompanying FIGS. 28-30 principally relates to a computer method for creating the appropriate sequence of processes to automate a computer process based on a ROI, including the steps of: (1) creating an execution file having one or more tasks having command line arguments executable as widgets by the computer, assembled into an execution file, which includes nested tasks; (2) organizing the nested task related to each task; (3) accounting for all dependencies to ensure that files, tasks, and environments for running on the computer are present in the execution file; (4) the step of creating an execution file further including, (a) reading the task file, (b) scanning for event dependencies, and (c) embedding files and links needed for execution of the execution file, (d) storing the dependencies in a dependency file, and (e) accessing a functional process analyzer, evaluating specific automation ROI, for a given process based on one or more of a total number of FTE employees, location, skillset requirements, and cost to replace/help FTE employees; dividing the computer process into constituent steps based on: (1) the entity performing the work, (2) where the work will be performed; comparing a human FTE cost to a machine cost to determine optimal option to accomplish the work; accounting for SLA, work duration and quality requirements to place tasks in a unified queue for humans, robots, and software bots; reprioritizing task creating portable automation criteria libraries, correlating to a system with a specific automation profile that can be leveraged on new computer processes with comparable automation profiles to provide optimum and reliable automation out-of-the-box software.

FIG. 28 represents a non-limiting system containing functional modules 2800 that interconnect and perform in accordance with the definitions to follow and apply the inventive process in accordance with the definitions of the modules are as follows:

Functional Process Analyzer: The functional process analyzer 2801 classifies a process based on functional process details, such as: an entities divisional partitions, such as groups, departments and stakeholders, involved and business objectives that the process aims to satisfy the objects of the entity. The functional process analyzer 2801 also generates key criteria such as a (1) process automation index and (2) a process complexity index, based on workforce, skills required, their location, and process duration (cycle-time).

ROI Modeler: The ROI modeler 2803 computes and categorizes the process ROI into appropriate categories, such as by way of example and not limitation a measure of very high, high, medium, low, very low, by accessing results of past customer automation ROI data by industry, dependent on predefined categorizations such as by way of example and not limitation, (1) vertical organization and (2) process category.

Functional Process Optimizer: The functional process optimizer 2805 applies functional process constraints such as by way of example and not limitation, cost, quality and cycle-time in order to determine the optimal steps for the process. It also determines the optimum resource to carry out the process step, by way of example and not limitation, human, robot or related entity such as a software bot.

Criteria Comparison Engine: The criteria comparison engine 2807 compares human and robot data with respect to various criteria, such as by way of example and not limitation cost, quality and cycle-time.

Unified Queue Modeler: The unified queue modeler 2809 is a unified queue of human and robot tasks based on the functional process optimizer. It evaluates any changes in process details such as by way of example and not limitation: (a) workforce, skills required, their location, process duration; (b) process constraints such as cost, quality & cycle-time; and (c) re-prioritizes the unified queue in real-time.

Update Mechanism: The update mechanism 2811 provides a data storage to keep track of all process changes. It stores the current snapshot of process details and constraints in the event of a change and initializes the key parameters for the next set of values to store. This includes changes in benchmarking ratios with respect to customer automation ROI database as well.

Utilizing the functional components 2800 as described in FIG. 28, one non limiting embodiment is a process 2900, which includes the following steps: A. utilizing the functional processor analyzer 2801, 2901 for obtaining functional process details 2921; B. utilizing the functional process details for establishing 2931, (1) a classification and (2) a generation of key criteria; C. utilizing the ROI modeler 2803, 2903 for (1) comparing 2923 a functional process ROI to past customer automation ROI and (2) categorizing 2933 ROI into an appropriate category; D. utilizing the process optimizer 2805, 2905 for applying functional process constraints 2915 and (2) for determining optimal steps for the process 2925; E. utilizing the compare human versus robot 2807, 2927 function as input to the determine optimal steps for process 2925; F. utilizing the unified queue modeler 2809, 2909 for generating 2919 unified queue of human robots, and software robot tasks; and testing 2929 if the updates in process details/constraints or ROI databases. If the test yields a "no", then the process 2900 evaluates 2939 current cost, quality and cycle time conditions and reprioritizes 2949 the unified queue of human and robot tasks. If the test yields a "yes" then the process proceeds to the update mechanism 2811, 2911 to store 2951 a snapshot with comparison benchmarks. Likewise, the reprioritize 2949 also proceeds to the update mechanism 2811, 2911 to store 2951 a snapshot with comparison benchmarks the updates. Once the snapshot is stored 2951 the process initializes 2941 the parameters for the functional process and starts over. The process also has the option of ending.

One non limiting embodiment as depicted in FIG. 30, includes a computer process 3000 based on a return on investment, (a) including classifying a process 3002 based on an entity and corresponding divisional partition; (b) computing and categorizing the return on investment 3004; (c) applying constraints 3006 such as one of (i) cost, (ii) quality or (iii) cycle-time, in order to determine the optimal steps for the return on investment process, and (iv) determining the optimum resource to carry out the return on investment process by one of a (i) human, (ii) a robot or (iii) bot; (d) comparing 3008 one of (i) the human entered data, (ii) the robot entered data, (iii) the bot acquired data, with respect to one (x) cost, (y) quality or (z) cycle-time; (e) queuing 3010 one of (i) a human task, (ii) a robot task, or (iii) a bot constructed task; (f) storing 3012 one of (i) tracking process changes, (ii) process details and constraints in the event of a change; (2) initializing a plurality of key parameters for a next set of values and changes in benchmarking ratios.

More particularly the non-limiting embodiment illustrated in FIG. 30 includes a computer process based on a return on investment, including (A) (1) classifying a process based on an entity and corresponding divisional partition, such as one of a group, department or stakeholder, and (2) generating key criteria such as one of a (a) process automation index, or (b) a process complexity index, based on one of (i) workforce parameter, (ii) a required skill, (iii) a workforce location, or (iv) a process duration; (B) (1) computing and categorizing the return on investment into one of (a) a measurement based on earlier in time customer automation return on one of (i) investment data by industry or (ii) dependent on predefined categorizations based on one of (a) vertical organization or (ii) a process category; (C) (1) applying constraints such as one of (a) cost, (b) quality or cycle-time, in order to determine the optimal steps for the return on investment process; and (c) determining the optimum resource to carry out the return on investment process by one of a (i) human, (ii) a robot or (iii) bot; (D) (1) comparing one of (a) the human entered data, (b) the robot entered data, (c) the bot acquired data, with respect to one (i) cost, (ii) quality or (iii) cycle-time; (E) (1) queuing one of (a) a human task, (b) a robot task, or (c) a bot constructed task, based on one of (i) the functional process optimizer, or (ii) and evaluation of any changes in process details such as by one of (d) workforce, (e) required skills, (f) workforce location, (g) process duration, and (h) process constraints such as one of (j) cost, (k) quality, or (l) cycle-time, and for: (2) re-prioritizes the unified queue in real-time; (F) (1) storing one of (a) tracking process changes, (b process details and constraints in the event of a change; (2) initializing a plurality of key parameters for a next set of values and changes in benchmarking ratios.

Further disclosed herein in connection with FIGS. 31-36 are embodiments pertaining to a computerized method for executing the steps including: (1) assembling tasks for collecting data for purposes of displaying a visual comparative, qualitative or quantitative analysis; (2) executing an analytics processor to perform an analysis of the data; (3) marking variables pertinent to the data by choosing from available variables related to the tasks; (4) choosing a data profile for inspecting the data against each variable marked for analytical examination within one or more elements of the task; (5) choosing a rank tab for displaying a distribution of the data against the parameters for an assigned variable; (6) running the tasks through the analytics processor; (7) automatically creating a dashboard for viewing one or more key comparative, qualitative or quantitative indicators, such as one of a mathematical presentation, chart, map or graph; (8) optionally using a data filter for analyzing the data over a data field and displaying the data field on the dashboard.

The disclosure pertaining to FIGS. 31-36 further relates to a computer method for creating a dashboard on a display including the steps of: (1) creating an execution file having one or more tasks having command line arguments executable as widgets by the computer, assembled into an execution file, which includes nested tasks; (2) organizing the nested task related to each task; (3) accounting for all dependencies to ensure that files, tasks, and environments for running on the computer are present in the execution file; (4) the step of creating an execution file further including, (a) reading the task file, (b) scanning for event dependencies, and (c) embedding files and links needed for execution of the execution file, (d) storing the dependencies in a dependency file, and (e) accessing a data profiler to profile data attributes related to the line arguments and pertinent to data sources tagged, (f) outputting the data profiler attributes and identifiers to a data rank classifier for a visualization widget generator, whereby one or more individual key performance indicators are programmatically input to a dashboard generator that combines the individual widgets to create a single dashboard associated with the underlying automation task for which the data attributes were associated.

The disclosure pertaining to FIGS. 31-36 further relates to a computer system for creating a dashboard comprising: (1) executable widgets assembled into an execution file, which includes nested tasks; (2) a data elements profiler for profiling data attributes pertinent to a tagged data source for which one of a comparative, qualitative or quantitative analysis is desired; (3) a data rank classifier for inspecting the results from the data profiler and classifying numeric attributes based on a preselected parameter; (4) a visualization widget generator for generating a key performance indicator whereby one or more widgets selected attributes, is identified by a data rank classifier; (5) A dashboard generator for combining widgets generated by the visualization widget generator, for creating a dashboard associated with the underlying automation task for which the data attributes are associated; (6) a date filter associator in association with each of the widgets that form that part of the dashboard generated. The disclosure pertaining to FIGS. 31-36 more specifically relates to software, which manages and integrates a computer's capabilities, such as the generation of widgets and adapters to enable application automation that can be leveraged by various automation engines, including such technology as offered at Automation Anywhere (found at www.automationanywhere.com).

Figure 31:
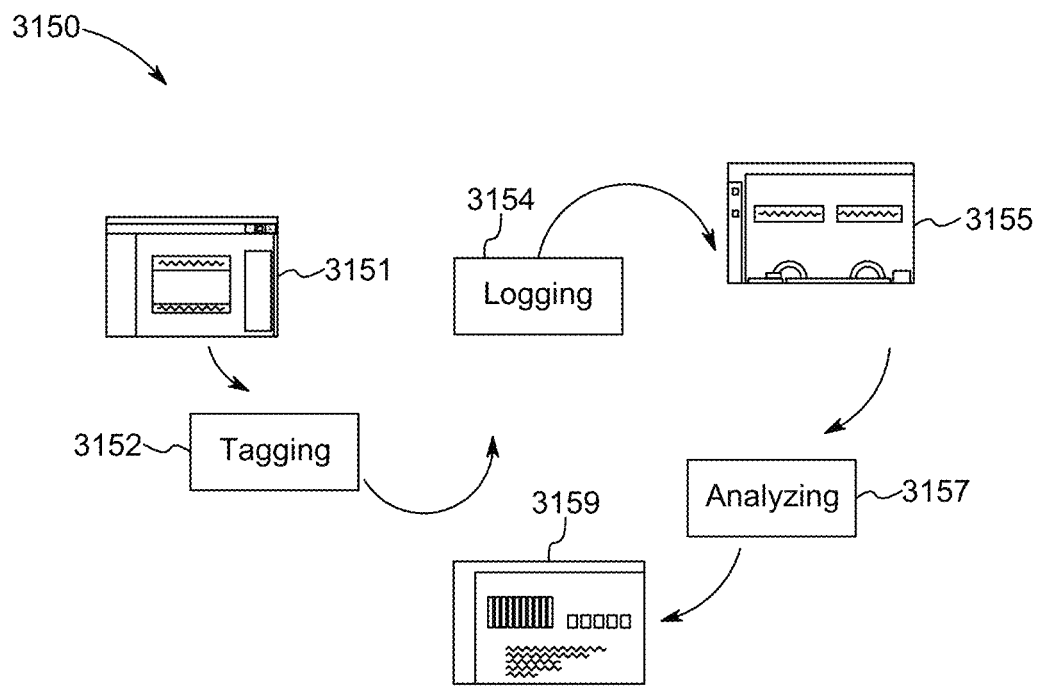
FIG. 31 shows the main steps for data profiling and generating a dashboard to make information more readily useable in accordance with an embodiment of the present invention.
Figure 35:
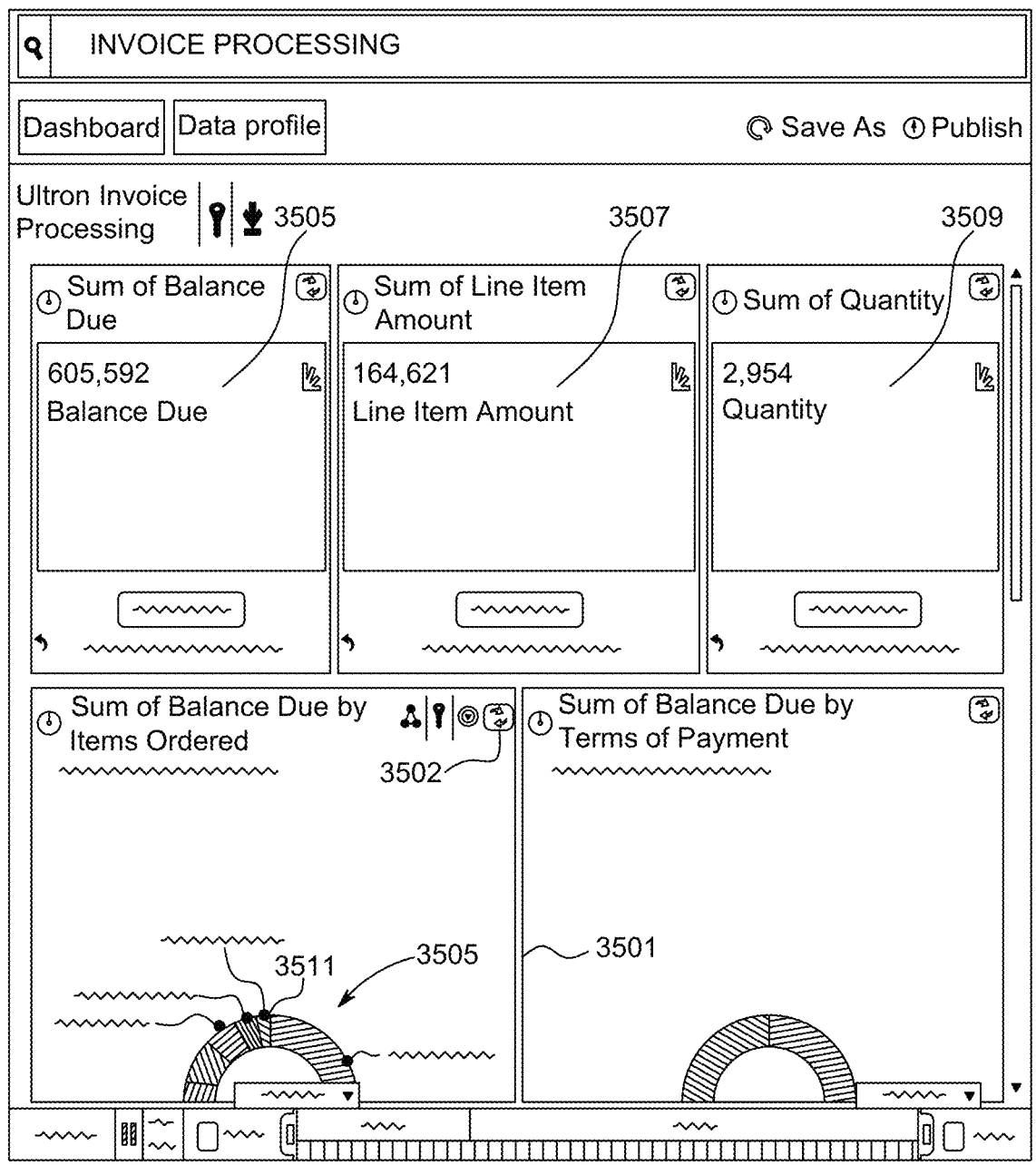
FIG. 35 shows a screen of a dashboard that data profiles in accordance with an embodiment of the present invention.

FIG. 31 discloses a computerized process 3150 for creating an analytical presentation of diverse information. The method includes using a browser having therein a program 3151 for extracting data relevant to a particular analysis. In step 1 a user engages in tagging 3152, each source data schema, by way of example, data about a particular business entity or information related thereto, such as products, goods, services, and their attributes (quantity, quality, amount of sales, cost of goods, etc.). Additionally, tagging may be used to point to or identify data to be subsequently retrieved by a system bot. The bot thereafter engages in step 2 of the process by logging 3154, in real time or in other instances at a specified time chosen by a system timer, the data that had been identified during step 2, i.e., tagging 3152. The information that is logged in step 2 is displayed in a browser (FIG. 33 In step 3 the data is processed, as described below, to yield visualizations of charts, graphs and other selected depictions relevant to the analysis that a user desires to perform. An analyzing 3157 step 4, allows a user to analyze the information in the data dashboard 3155 (FIG. 35).

The data profiling of each data source schema is presented for analysis as data types and classified accordingly, as by way of example strings, numbers, and such distinguishing characteristics as date, time, place or condition of occurrence. The process 3150 also includes ranking and classifying the data elements according to salience of the information that is being generated. The process allows building individual bots or widgets needed to retrieve data from multiple sources, that then allows automatic construction of the data into a dashboard 3155 visualization, based on by way of example, a ranking of data elements, predefined by the user, based on user generated algorithms, or other artificial intelligent processes. As indicated in step 3 an auto-generation of a visualization dashboard 3155 combines the individual widget generated data, by associating the relevant data filters to perform such visualizations as charts, graphs (e.g., time-series analysis) and maps on the dashboard 3155. The process 3150 also allows for the customization and personalization of the dashboard 3155.

Further disclosed in connection with FIGS. 31-36 are embodiments pertaining to a computerized method that embodies process 3150, for executing the steps including: (1) assembling tasks for collecting diverse information for purposes of displaying a visual comparative, qualitative or quantitative analysis; (2) executing an analytics processor to perform an analysis of the information; (3) marking variables pertinent to the data analysis by choosing from available variables related to the tasks; (4) choosing a data profile for inspecting the data against each variable marked for analytical examination within one or more elements of the task; (5) choosing a rank tab for inspecting a distribution of the data against the parameters for an assigned variable; (6) running the tasks through the analytics processor; (7) automatically creating a dashboard for reviewing one or more key comparative, qualitative or quantitative indicators, such as one of a mathematical (e.g., statistical presentation or graphical timeline), chart, map or graph; (8) optionally using a data filter for analyzing the data over a data field and displaying the data field on the dashboard.

Figure 32:
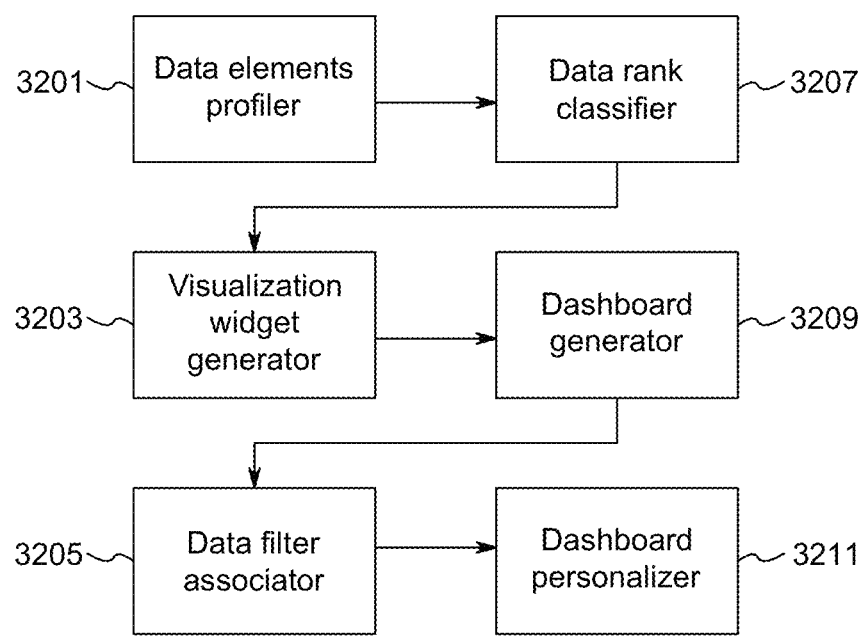
FIG. 32 shows the modules, their inputs and outputs for creating one or more application files, in accordance with an embodiment of the present invention.

Referring now to FIG. 32, a set of modules 3201-3207 comprise a non-limiting embodiment for carrying out the process 3150, and specifically as pertains to the step 3157 (see, FIG. 31) analysis and display step 3159 (see, FIG. 31) presentation of the information retrieved. These modules include the following analysis and presentation functions:

A data profiler 3201 profiles the various data attributes pertinent to a data source tagged 3152 (FIG. 31) and identifies data types (by way of example and not limitation, string, numeric, date) and for which one of a comparative, qualitative or quantitative analysis is desired, as by way of example a statistical distributions such as MIN, MAX, SUM, AVG and DISTINCT counts. The data profiler outputs the profile attributes and the identifiers to a data rank classifier 3207.

The data rank classifier 3207 inspects the results from the data elements profiler 301 and classifies the 'n' most valuable numeric attributes based on a preselected parameter, such as by way of example, a data distribution range (MAX-MIN). It then ranks this list based on an appropriate measure, such as by way of example, a SUM of the data values for each attribute. Thereafter the data rank classifier 307 determines a set of the ranks, such as the top n, where n is a number, such as 3, for a visualization widget generator 3203.

The visualization widget generator 3203 generates a individual key performance indicator (KPI), such as a pie chart, donut chart or time-series bar chart, whereby one or more widgets select attributes, such as a numeric data attribute, as identified by the data rank classifier 3207. For example, a time-series bar chart, may depict the top 2 KPIs, which are then identified and plotted against by way of example, a date or time attribute that is identified based on the date or time having an attribute with a highest distinct value count. By way of another example, a donut chart may include the top KPI identified as plotted over 2 string type attributes, where a row count sum for the top 10 values as a percent (%) of total row count is highest.

A dashboard generator 3209 combines all the individual widgets generated by a visualization widget generator 3203 and creates a single dashboard that is associated with the underlying automation task for which the data attributes were associated.

A date filter associator 3205 is a common data filter in association with each of the widgets that form that part of the dashboard generated, which is selected from the list of attributes based on certain parameters as, by way of example, the highest DISTINCT value count.

After the dashboard 3159 (see, FIG. 31) is generated by the dashboard generator 3209, a dashboard personalizer 3211 enables a level of personalization, where the labels of the individual widgets can be personalized, by way of example, new widgets added, etc.

With further reference to FIG. 8A, FIG. 31, and FIG. 32, and by way of example and not limitation, a user of the system 800 (FIG. 8A) may desire to create, load and execute the process 3150 instantiated as a task to be run at various times or repetitively on local computer 804 to achieve the foregoing objects. In a browser, viewed by the user in display 815, process 3150 will permit the user to insert commands having single execution features or as part of a several line operation, or one of several commands that may operate as part of a larger loop or nested loop that will have the effect of achieving an outcome as described in connection with FIG. 31, FIG. 32. As by way of example a user would achieve the objects of the disclosed embodiment by the following series of operations: (1) locate candidates for tagging 252 ("id"); (2) determine if a unique control found and control type match; (3) eliminate candidates not relevant to the tagging 3152 process; (4) optionally assign weights to compute match probability; (5) determine attribute differences for each candidate if required.

More specifically, the disclosure herein further relates to a computer method for creating a dashboard on a display including the steps of: creating an execution file having one or more tasks having command line arguments executable as widgets by the computer, assembled into an execution file, which includes nested tasks, organizing the nested task related to each task and accounting for all dependencies to ensure that files, tasks, and environments for running on the computer are present in the execution file, said step of creating an execution file further including, reading the task file, scanning for event dependencies and embedding files and links needed for execution of the execution file, storing the dependencies in a dependency file, and accessing a data profiler 3201 to profile data attributes related to line arguments and pertinent to data sources tagged, the data profiler outputting the profile attributes and identifiers to the data rank classifier 3207 for the visualization widget generator 3203, that generates one or more individual key performance indicators to be input to a dashboard generator 3209 that combines the individual widgets generated by the visualization widget generator 3203, to create a single dashboard that is associated with the underlying automation task for which the data attributes were associated. A data filter associator 3205 functions as a common data filter to allows the user to separate widgets that form that part of the dashboard generated into distinct categories.

Figure 33:
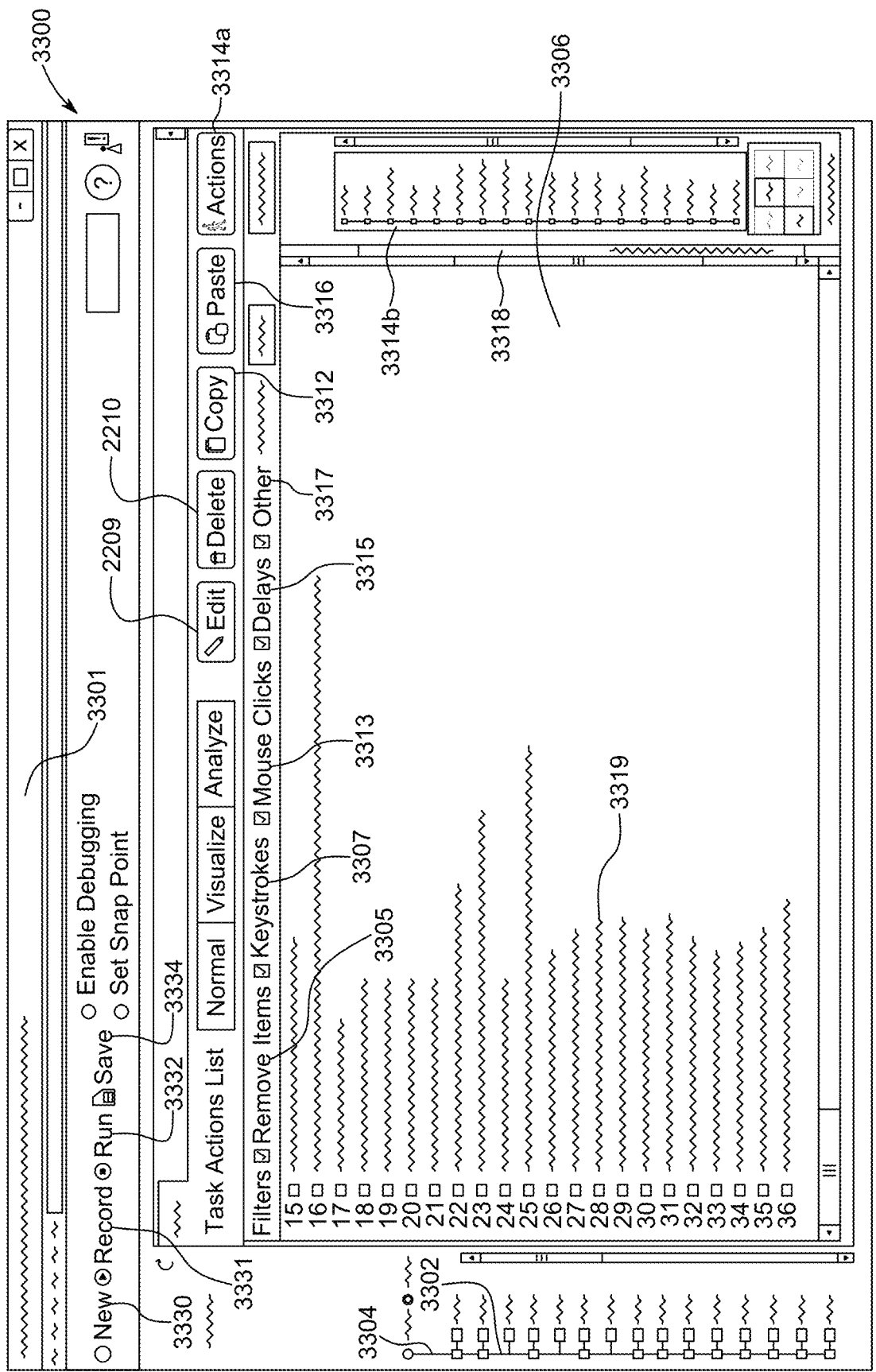
FIG. 33 shows a screen of an application for acquiring information from a data source for profiling, in accordance with an embodiment of the present invention.

More particularly with reference to FIG. 33, a suitable computer program code will allow the tagging and creation of the tasks 3300 that provides for performing process 3150. A browser having a task editor 3301, assists in the creation a new task 3319, which will be incorporated into the execution file, as hereinbefore described, using point and click functionality as will be further described below, and as appropriate, to record 3331 key strokes defining a new task, to run 3332 or save 3334 the new task 3319, and to edit 3309 the new task, within the context of a task action list denoted by lines 15 through 38 by way of illustration.

Upon execution of the new task 3319, the data elements profiler 3201 (FIG. 32), coded to extract various data attributes within a data source (related to the new task) and to identify data types (string, numeric, date) related to one of comparative, qualitative or quantitative analysis, as by way of example, statistical distributions such as MIN, MAX, SUM, AVG and DISTINCT counts, provides the information required by the data rank classifier 3207 (FIG. 32). The computer program code required to create a data elements profiler 3201 (FIG. 32) with the above functionality (and the other functions described herein) can be developed by a person of ordinary skill in the art of programming and is not described in detail herein.

As shown in FIG. 33, suitable computer program code is provided for performing numerous functions such as displaying a task editor 3301 in the browser, and such as creating a new task 3330, to be ported to another computer, or to be run on the same computer as where the task editor 3301 is resident. The task editor 3301 includes drop and drag commands, which all various tasks to be imported into a task action list, and as appropriate, to edit 3309, delete 3310, copy 3312 and paste 3316 commands, within the context of the task action list 3319. The computer program code required to implement the above functions (and the other functions described herein) can be developed by a person of ordinary skill in the art of programming and is not described in detail herein.

Task editor 3301 contains three adjunct windows, a task action window 3306, a command window 3304 and an action window 3314b. The task editor 3301 also includes commands that are inserted into the task action window 3306. For each of the commands 3302, added as tasks, the system 100 permits inserting new actions or keystrokes 3307, removing/adding mouse moves 3305, mouse clicks 3313, delays 3315 and optimizing tasks, and creating new tasks.

More particularly with reference to FIG. 33, a suitable computer program code may be provided for performing numerous functions such as displaying a the tasks 3300 in the browser on display 815 (FIG. 8B), to create a new task using point and click functionality as appropriate, and to record 3331 key strokes defining the new task, to run 3332 the new task 3319 and to edit 3312 the new task, within the context of a task action list 15 through 38 by way of example. The task action list 3317 shows numerous tasks in the new task 3319 that for illustration have been previously created. The computer program code required to create a browser with the above functions (and the other functions described herein) can be developed by a person of ordinary skill in the art of programming and is not described in detail herein.

Referring again to FIG. 33, an action 3314a permits viewing and editing enabled features. Features may include: edit 3309 keystroke actions; duplicating an action below the marked action; undoing and redoing an action; converting to variable; converting a keystroke to a variable; converting to prompt; converting a keystroke to a prompt message; inserting an 'If condition'; insert 'If condition' for a selected block of task actions; insert error handling; insert error handling for a selected block of task actions; changing window title; setting a window title to multiple window titles; running from 'This Step'; running the task from a selected action onwards; enabling an action; disabling an action; moving up and moving down an action. In addition, a user may record mouse moves 3307, mouse clicks 3313, control or delay the execution of tasks 3315, and other features 3317 that may exist from time to time. Those persons of ordinary skill in the art of programming will appreciate the forgoing list of actions and how they are utilized in connection with building a task list as described.

Figure 34:
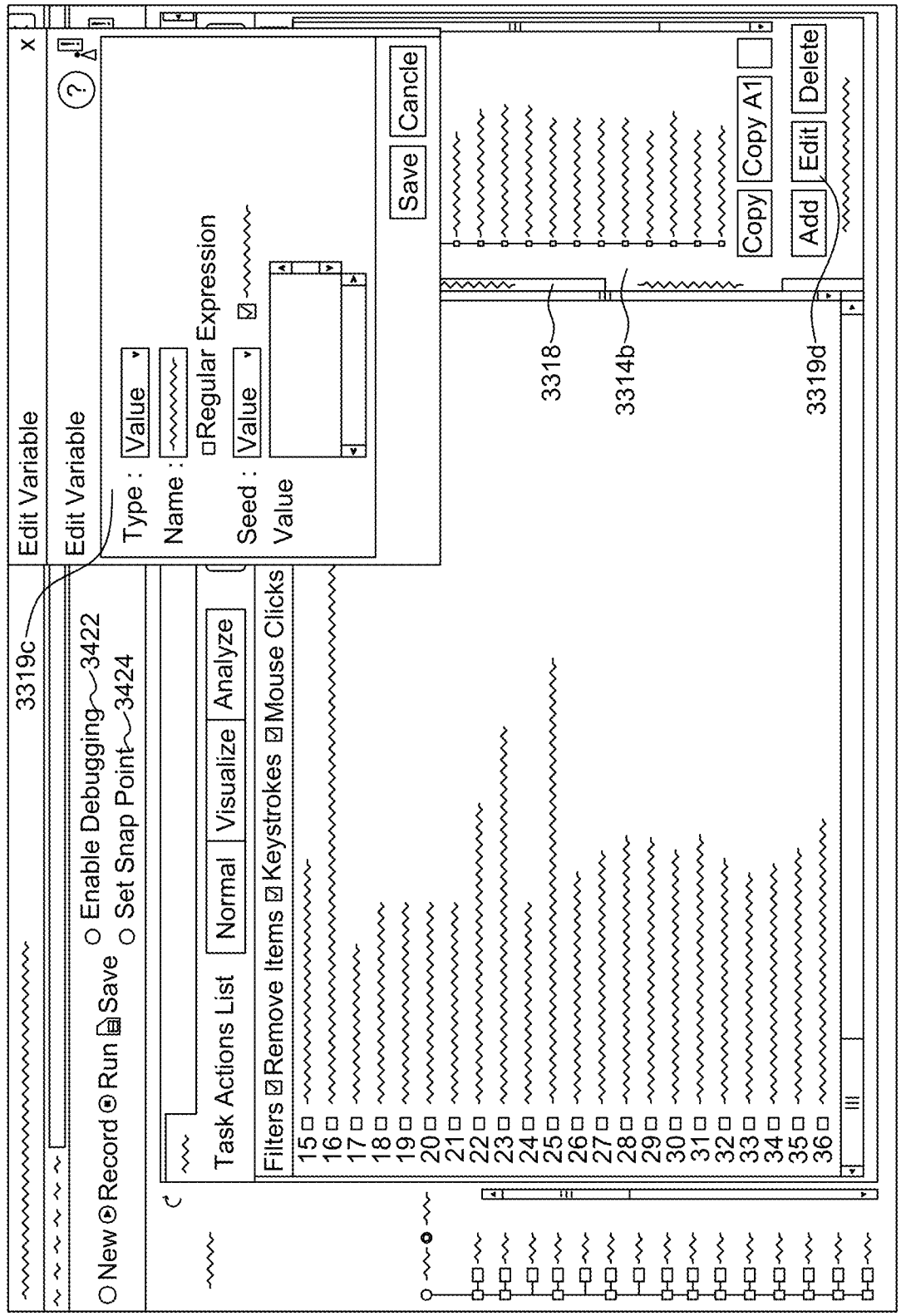
FIG. 34 shows a screen of an application for acquiring information from a data source for profiling, in accordance with an embodiment of the present invention.

Turning to FIG. 33 and FIG. 34, the variable manager window 3314b allows for the insertion of the data from such items as by way of example, invoices and inventory lists. The browser includes an error view 3318, and features, such as editing 3319d that enables a drop-down window 3319c, as well as an enable debugging 3422 and set snap point 3424 function.

When the automation process is executed, the data elements marked for analytics logging 3154 (FIG. 31) are logged and stored into an analytics database, such as database 807 (FIG. 8B) for that particular automation run. Upon click of the 'ANALYZE' button, the data logged is processed through the data elements profiler 3201, data rank classifier 3207, visualization widget generator 3203, dashboard generator 3209, date filter associator 3205, and auto generate the dashboard 3155, as shown in FIG. 31.

Dashboard 3155 (FIG. 31) may be customized for creating a visualization of the significance of the information based on such presentations as charts, graphs and other two-dimensional depictions of data relationships, e.g., tables, Venn diagrams, and maps. By way of example the data may be compiled into such information as contained in an invoice processing 3304. Such information typically by way of example is Balance Due, 3305, Line Item Amount 3307 and Quantity 3309. Other information may be found in the form of a donut chart 3305, by way of example, which segments various contributions to the whole as shown by segment 3211.

Figure 36:
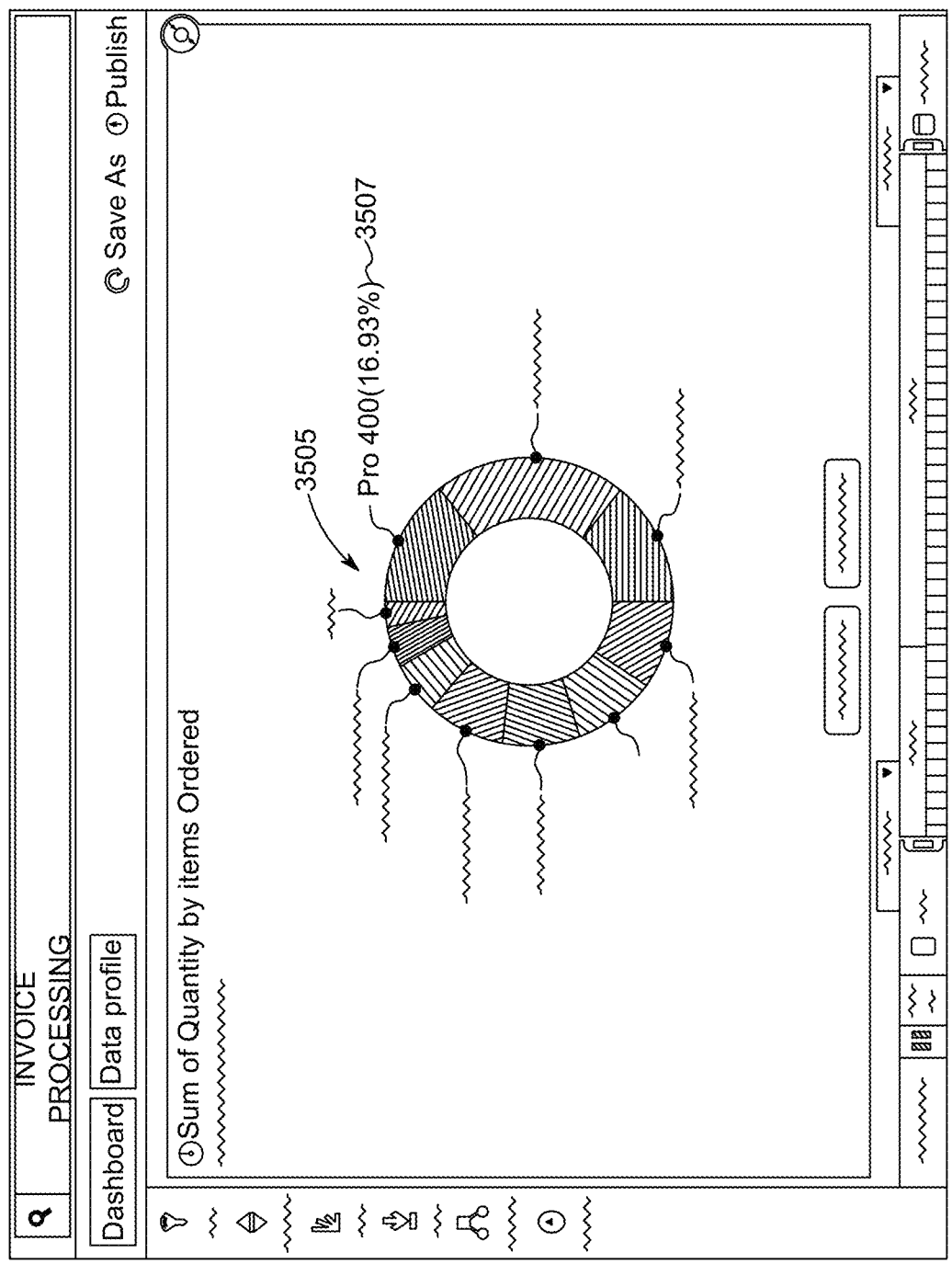
FIG. 36 shows a screen of a dashboard, where there has been expansion of a profile in accordance with an embodiment of the present invention.

Individual elements of data found inside, by way of example user interface 3504 illustrated in FIG. 35, as would appear in an invoice, such as Balance Due 3505, Line Item Amount 3507 and Quantity 3509, which are marked for analytics logging 3154 as illustrated (FIG. 31). In FIG. 35, an expansion of each widget producing information (e.g., sum of balance due detailed by graphic denoting particular items 3511), within the dashboard, is achieved by clicking on the corner (see, FIG. 35, 3502) of the section of widget 3501 to highlight the representation of the data as illustrated in FIG. 36. FIG. 36 further shows the ability to interactively analyze the data by clicking on Group or Size to choose any other metric to plot e.g., size, 3507, or analyze the same metric by another attribute, e.g., group.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer method for creating a portable unit on a first computer to be executed on one or more remote computers comprising the steps of:
   creating an execution file having one or more tasks for deployment, said tasks comprising application level tasks that can be performed by a user and the tasks having command line arguments recorded as key strokes to be executed as variables by the remote computer, assembled into a single execution file,
   validating the tasks and
   organizing nested tasks by
      collecting nested task information for each task and accounting for all dependencies to ensure that files, tasks, and environments for running on one or more remote computers are present in the portable unit,
   the step of creating an execution file further including,
      reading into an execution file, a task action list comprising a series of tasks that may be performed by a user;
      scanning the series of tasks in the execution file for execution event dependencies;
      embedding files and links needed for remote execution of the tasks in the execution file;
      storing the execution event dependencies in a dependency file;
      scanning the execution file for security; and
      verifying the execution file for proper formatting; and
   appending the dependency file to the execution file.

2. The computer method as in claim 1, further comprising, appending a play engine to the execution file.

3. The computer method as in claim 1, wherein the portable unit passes arguments from the first computer to the remote computers for execution of the execution file.

4. The computer method as in claim 1, further including a run script action.

5. The computer method as in claim 1, further including a script included in the execution file.

6. The computer method as in claim 5, wherein the script can have a non-existent script path so that the remote computer can run when tasks include external scripts.

7. The computer method as in claim 1 further comprising
   identifying one or more data relationships that exist between and utilized by one or more applications;
   determining for each data relationship a respective rank based on specific data that associates the two or more user applications;
   finding applications based on the degree a respective rank has to one or more user applications; categorizing each relationship based on a criteria of the interaction;
   creating an application wall containing status updates and links to and from other applications related to the one of the one or more user applications; and
   constructing an automation map from the links between the one or more user applications and other applications.

8. The computer method as in claim 1 further comprising
   employing in the first computer remote access technology to access and update software on one or more remote computers;
   determining a status of the one or more remote computers;
   utilizing the status to create one or more automation profiles for execution in one or more remote computers;
   negotiating between the first computer and the one or more remote computers, a highest level protocol for the one or more remote computer compliance boundaries required to access an automation controller in the one or more remote computers;
   creating in the first computer a set of execution files having one or more nested tasks for deployment;
   appending a light weight play engine to the execution files;
   delivering the executable files to the one or more remote computer automation controllers using a remote access technology;
   executing in the one or more remote computers the light weight play engine having appended execution files;
   reading the execution task files; and
   updating the one or more remote computers.

9. A non-transitory computer readable medium as in claim 8, further including code supporting one of TN3270 or TN5250 IBM Mainframe access in Terminal Emulator functionality.

10. A non-transitory computer readable medium having computer software code stored thereon for creating a portable unit on a first computer to be executed on one or more remote computers, the computer software code comprising code for:
    creating an execution file having one or more tasks for deployment, said tasks comprising application level tasks that can be performed by a user and the tasks having command line arguments recorded as key strokes to be executed as variables by the remote computer, assembled into a single execution file,
    validating the tasks and
    organizing nested tasks by
       collecting nested task information for each task and accounting for all dependencies to ensure that files, tasks, and environments for running on one or more remote computers are present in the portable unit,
    the step of creating an execution file further including,
       reading into an execution file, a task action list comprising a series of tasks that may be performed by a user;
       scanning the series of tasks in the execution file for execution event dependencies;
       embedding files and links needed for remote execution of the tasks in the execution file;
       storing the execution event dependencies in a dependency file;
       scanning the execution file for security; and
       verifying the execution file for proper formatting; and
    appending the dependency file to the execution file.

11. A non-transitory computer readable medium as in claim 10, wherein the portable unit includes code for a play engine.

12. A non-transitory computer readable medium as in claim 10, further including code for appending the play engine to the execution file.

13. A non-transitory computer readable medium as in claim 10, wherein the portable unit passes arguments from the first computer to the remote computers for execution of the execution.

14. A non-transitory computer readable medium as in claim 10, further including code for a running script action.

15. A non-transitory computer readable medium as in claim 14, further including code for inserting a script included in the execution file.

16. A non-transitory computer readable medium as in claim 15, wherein the script can have a non-existent script path so that the remote computer can run when tasks include external scripts.

17. A computer-implemented method for creating a portable unit on a first computer to be executed on one or more remote computers comprising the steps of:
  creating an execution file having one or more nested tasks for deployment, said tasks having command line arguments executable as variables by the remote computer, the tasks being assembled into a single execution file and the variables being stored in an array of memory with respective values, the step of creating the execution file further including:
  defining a new task file;
  starting the inputting into one or more files as key strokes into the new task file;
  converting the keystrokes to a variable;
  including the new task file into the execution file;
  validating the recorded new task file for event dependency, wherein validating comprises inserting a tag into the new task file, wherein the tag is automatically recognized as a data type in the file;
  stopping the recording of the inputting into the new task file;
  organizing the new task file into nested tasks, said organizing step including collecting nested task information for each new task file and accounting for presence of all dependencies in the portable unit including files, tasks, and environments for running the execution file on one or more remote computers;
  wherein the accounting of all dependencies in the nested tasks includes scanning the execution file for event dependencies to identify additional files and links needed for remote execution of the execution file and embedding the identified additional files and links into the execution file;
  storing the dependencies in one or more dependency files;
  appending to the execution file a light weight play engine, the one or more dependency files and support information; and
  closing the execution file.

18. The computer-implemented method of claim 17 further comprising reading the execution file having the one or more of nested tasks, wherein the reading comprises:
  initializing the execution file by making a local copy of the execution file;
  scanning the execution file for security, wherein the scanning includes checking any nested task for task calls to other tasks and backward compatibility;
  ascertaining existence of the play engine;
  creating a new instance of the execution file, wherein the new instance of the execution file comprises command line arguments creating the scan;
  verifying the new instance contains proper formatting and with respect to each action, collecting information and adding software to support one or more options that includes a scripting language;
  sending dynamically during execution of the new instance, a file of values for each of the variables or arguments associated with each command and passing values for the arguments dynamically at the time of the execution start at the remote location;
  checking for the presence of any command line arguments that require the insertion or incorporation of argument values and any errors;
  reading the files;
  checking the one or more errors and outputting each error;
  repeating sending, checking for the presence of any command line arguments and checking the one or more errors, until an end of file is detected; and
  closing the new instance.

* * * * *